(12) United States Patent
Yamamoto et al.

(10) Patent No.: US 8,941,586 B2
(45) Date of Patent: Jan. 27, 2015

(54) INPUT APPARATUS, CONTROL APPARATUS, CONTROL SYSTEM, AND CONTROL METHOD

(75) Inventors: Kazuyuki Yamamoto, Kanagawa (JP); Kenji Hachisu, Tokyo (JP); Hidetoshi Kabasawa, Tokyo (JP); Hideaki Kumagai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1037 days.

(21) Appl. No.: 12/530,991

(22) PCT Filed: Sep. 10, 2008

(86) PCT No.: PCT/JP2008/066346
§ 371 (c)(1),
(2), (4) Date: Sep. 11, 2009

(87) PCT Pub. No.: WO2009/035005
PCT Pub. Date: Mar. 19, 2009

(65) Prior Publication Data
US 2010/0103095 A1    Apr. 29, 2010

(30) Foreign Application Priority Data

Sep. 12, 2007 (JP) ................................ 2007-236907
Oct. 22, 2007 (JP) ................................ 2007-274485
Dec. 7, 2007 (JP) ................................ 2007-317714

(51) Int. Cl.
*G06F 3/033* (2013.01)
*G06F 3/0346* (2013.01)

(52) U.S. Cl.
CPC .................................. *G06F 3/0346* (2013.01)
USPC ............................ 345/158; 345/156; 345/157

(58) Field of Classification Search
CPC ......... G06F 3/0346; A63F 13/06; G09G 5/00; G09G 3/07; G09G 5/08
USPC ................................................ 345/156–172
See application file for complete search history.

(56) References Cited

U.S. PATENT DOCUMENTS 5,181,181 A * 1/1993 Glynn ........................... 702/141
5,453,758 A   9/1995 Sato (Continued)

FOREIGN PATENT DOCUMENTS

| JP | 08-021732 | 1/1996 |
| JP | 10-333815 | 12/1998 |

(Continued)

OTHER PUBLICATIONS

Japanese Office Action issued Feb. 12, 2013 in corresponding Japanese Patent Application No. 2090-532201.

(Continued)

*Primary Examiner* — Tony N Ngo
(74) *Attorney, Agent, or Firm* — K&L Gates LLP

(57) ABSTRACT

An input apparatus, a control apparatus, a control system, and a control method that are capable of making a movement of a pointer on a screen a natural movement that matches an intuition of a user are provided. An input apparatus includes a casing, an acceleration sensor, and an angular velocity sensor. The acceleration sensor detects an acceleration value of the casing in a first direction. The angular velocity sensor detects an angular velocity about an axis in a second direction different from the first direction. Instead of calculating a velocity value of the casing by simply integrating the detected acceleration value, the velocity value of the casing in the first direction is calculated based on the acceleration value and the angular velocity value that have been detected. As a result, a highly-accurate calculation of the velocity value of the casing becomes possible, and a movement of a pointer on a screen becomes a natural movement that matches a sense of a user based on a displacement corresponding to the velocity value.

7 Claims, 41 Drawing Sheets

(56) References Cited

U.S. PATENT DOCUMENTS

2005/0243062 A1  11/2005  Liberty
2006/0274032 A1* 12/2006  Mao et al. ..................... 345/156

FOREIGN PATENT DOCUMENTS

| JP | 11-085387 | 3/1999 |
| JP | 2000-242407 | 9/2000 |
| JP | 2001-056743 | 2/2001 |
| JP | 2005-056409 | 3/2005 |

OTHER PUBLICATIONS

European Search Report issued May 13, 2007 in corresponding European Patent Application No. 08830588.3.

* cited by examiner

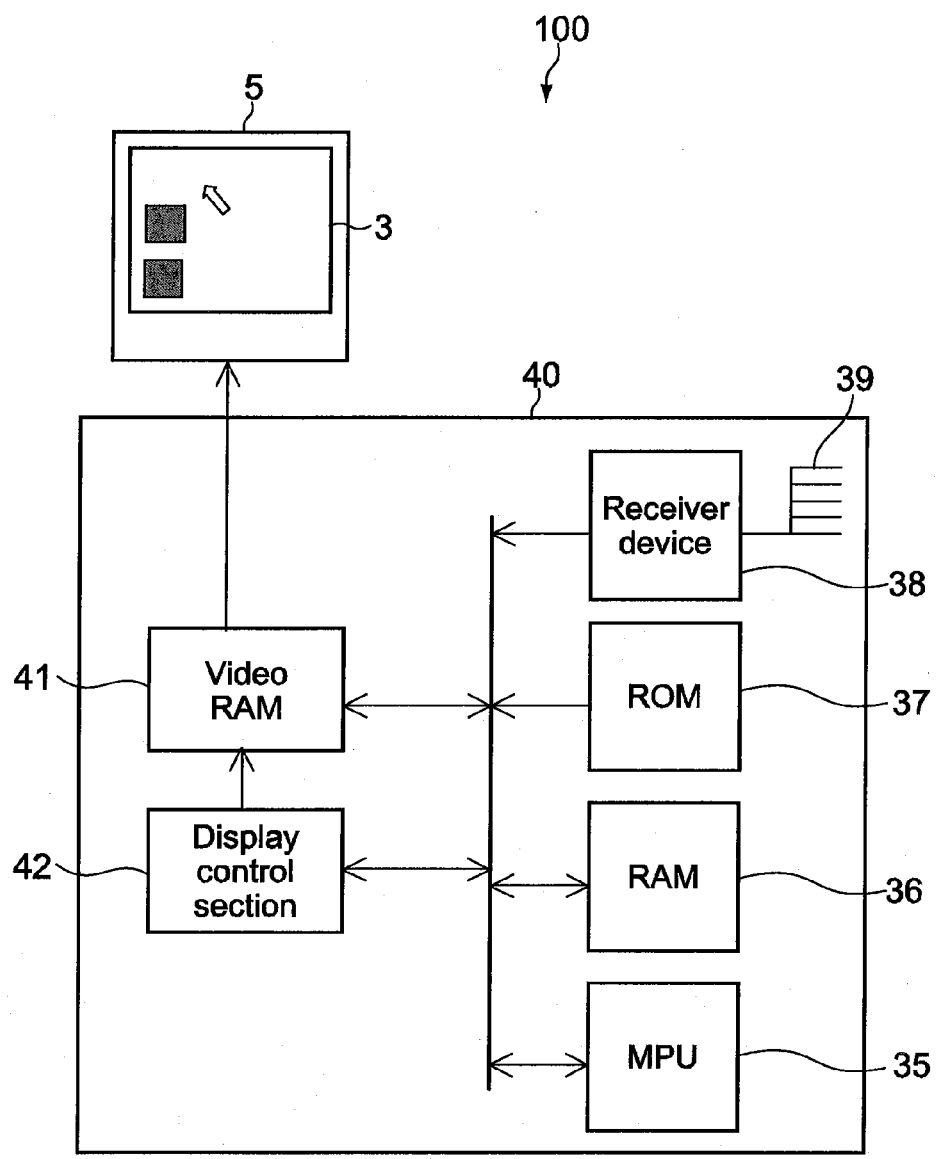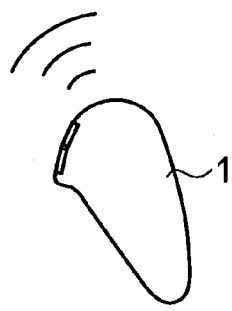
FIG.1

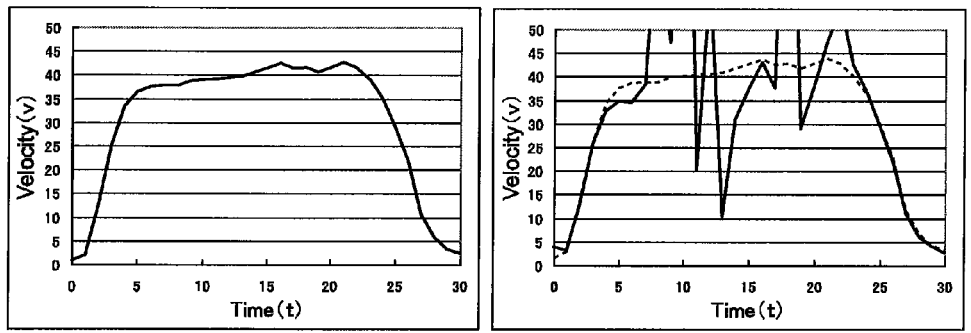

(A) No noise, no gravitational effect due to tilt,
R(t) = acceleration/angular acceleration,
no threshold-value judgment, and no lowpass filter (B) With noise, no gravitational effect due to tilt,
R(t) = acceleration/angular acceleration,
no threshold-value judgment, and no lowpass filter (C) With noise, no gravitational effect due to tilt,
R(t) = acceleration/angular acceleration,
with threshold-value judgment, and with lowpass filter (D) With noise, with gravitational effect due to tilt,
R(t) = acceleration/angular acceleration,
with threshold-value judgment, and with lowpass filter (E) With noise, with gravitational effect due to tilt,
R(t) = acceleration change rate/angular acceleration change rate,
with threshold-value judgment, and with lowpass filter

FIG.22

| Pattern No. | Means for detecting acceleration | Means for detecting acceleration | Dimension of pointer movement | Total sensor structure |
|---|---|---|---|---|
| 1 | Uniaxial acceleration sensor | Uniaxial gyro sensor | Conversion into 1-dimensional movement of pointer | Uniaxial acceleration sensor<br>Uniaxial gyro sensor |
| 2 | Biaxial acceleration sensor | Biaxial gyro sensor | Conversion into 2-dimensional movement of pointer | Biaxial acceleration sensor<br>Biaxial gyro sensor |
| 3 | Uniaxial acceleration sensor | Biaxial acceleration sensor (acceleration sensor in which one axis out of two axes is used as means for detecting acceleration is used) | Conversion into 1-dimensional movement of pointer (pitch direction) | Biaxial acceleration sensor |
| 4 | Biaxial acceleration sensor | Biaxial acceleration sensor (pitch angle) (acceleration sensor in which one axis out of two axes is used as means for detecting acceleration is used)<br>Uniaxial gyro sensor (yaw angle) | Conversion into 2-dimensional movement of pointer | Triaxial acceleration sensor<br>Uniaxial gyro sensor |
| 5 | Uniaxial acceleration sensor | Angular acceleration calculated by two uniaxial acceleration sensors, and angular velocity calculated by integrating angular acceleration (acceleration sensors in which one or two axis/axes out of two axes is/are used as means for detecting acceleration are used) | Conversion into 1-dimensional movement of pointer | Uniaxial acceleration sensor × 2 |
| 6 | Biaxial acceleration sensor | Angular acceleration calculated by two biaxial acceleration sensors, and angular velocity calculated by integrating angular acceleration (acceleration sensors in which one or two axis/axes of one biaxial acceleration sensor is/are used as means for detecting acceleration are used) | Conversion into 2-dimensional movement of pointer | Biaxial acceleration sensor × 2 |
| 7 | Biaxial acceleration sensor | Angle calculated by triaxial geomagnetic sensor, and angular velocity calculated by differentiating angle | Conversion into 2-dimensional movement of pointer | Biaxial acceleration sensor<br>Triaxial geomagnetic sensor |

FIG.25

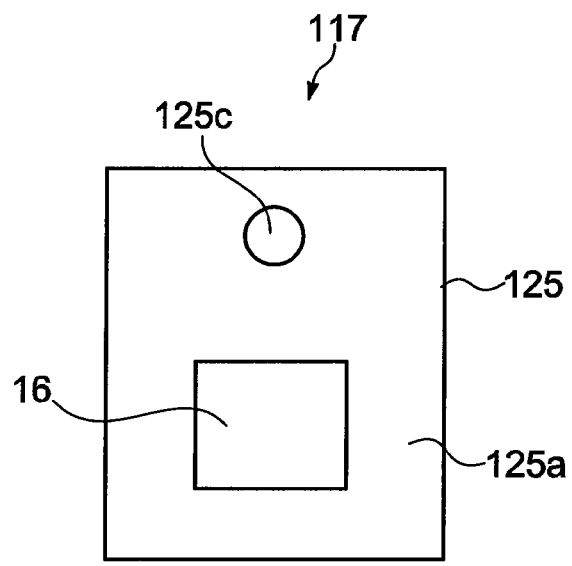
(A)
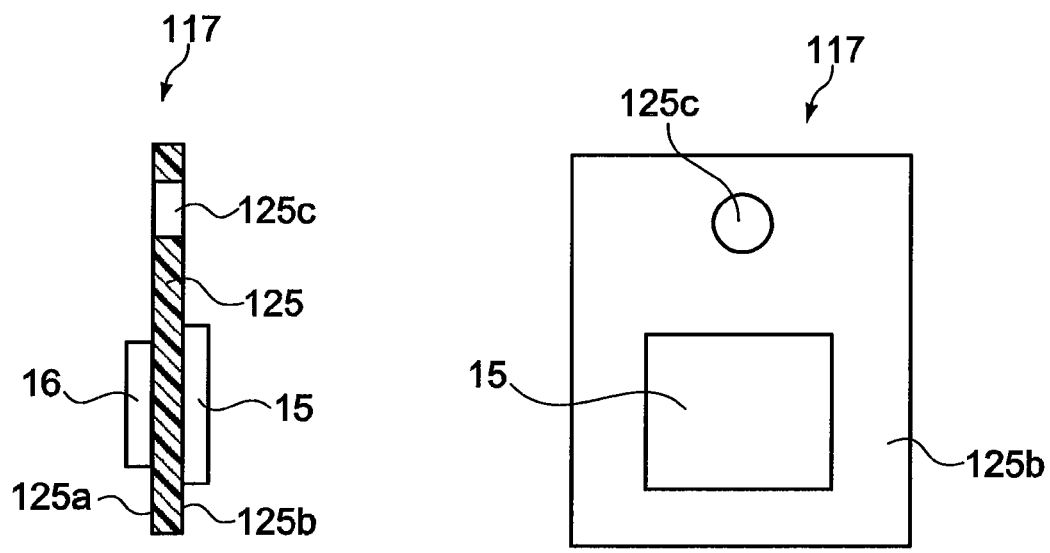
(B)          (C)
FIG.36

INPUT APPARATUS, CONTROL APPARATUS, CONTROL SYSTEM, AND CONTROL METHOD

CROSS REFERENCE TO RELATED APPLICATIONS

The present application is a National Stage of International Application No. PCT/JP2008/066346 filed on Feb. 16, 2009 and which claims priority to Japanese Patent Application No. 2007-317714 filed on Dec. 7, 2007, Japanese Patent Application No. 2007-274485 filed on Oct. 22, 2007 and Japanese Patent Application No. 2007-236907 filed on Sep. 12, 2007, the entire contents of which are being incorporated herein by reference.

BACKGROUND

The present disclosure relates to a 3-dimensional operation input apparatus for operating a GUI (Graphical User Interface), a control apparatus for controlling the GUI in accordance with operational information, a control system including those apparatuses, and a control method.

Pointing devices, particularly a mouse and a touchpad, are used as controllers for GUIs widely used in PCs (Personal Computers). Not just as HIs (Human Interfaces) of PCs as in related art, the GUIs are now starting to be used as an interface for AV equipment and game devices used in living rooms etc. with, for example, televisions as image media. Various pointing devices that a user is capable of operating 3-dimensionally are proposed as controllers for the GUIs of this type (see, for example, Patent Documents 1 and 2).

Patent Document 1 discloses an input apparatus including angular velocity gyroscopes of two axes, that is, two angular velocity sensors. When a user holds the input apparatus in hand and swings it vertically and laterally, for example, the angular velocity sensors detect angular velocities about two orthogonal axes, and a signal as positional information of a cursor or the like displayed by a display means is generated in accordance with the angular velocities. The signal is transmitted to a control apparatus, and the control apparatus controls display so that the cursor moves on a screen in response to the signal.

In addition, Patent Document 2 discloses a technique of detecting accelerations of a pen-type input apparatus using two acceleration sensors, and calculating movement amounts of the pen-type input apparatus by integrating the accelerations.

Patent Document 1: Japanese Patent Application Laid-open No. 2001-56743 (paragraphs [0030] and [0031], FIG. 3)

Patent Document 2: Japanese Patent Application Laid-open No. 2005-56409 (paragraphs [0018], [0021], and [0022], FIGS. 1 and 2)

As described above, in the input apparatus disclosed in Patent Document 1, the movement of the cursor displayed on the screen is controlled in accordance with the angular velocities detected by the two angular velocity sensors. In other words, a movement amount of the cursor displayed on the screen depends on the angular velocities detected by the two angular velocity sensors.

Therefore, if the user imparts a large angular velocity to the input apparatus, the cursor displayed on the screen moves at a high velocity in accordance therewith. For example, when the user operates the input apparatus using a turn of a hand, even when the actual movement amount of the input apparatus is small, the cursor moves at a high velocity.

However, in a case where the user operates the input apparatus while imparting only a small angular velocity, even when the actual movement amount of the input apparatus is large, the cursor on the screen moves only slightly. For example, in a case where the user operates the input apparatus by swinging an entire arm with a shoulder as an axis, the cursor moves only slightly in spite of the actual movement amount of the input apparatus. As described above, there are cases where the movement of the cursor does not match a sense of the user.

On the other hand, the pen-type input apparatus described in Patent Document 2 calculates the movement amount of the pen-type input apparatus using the acceleration sensors. In this case, since the movement amount of the cursor is calculated in accordance with the accelerations detected by the acceleration sensors, a movement amount of a cursor displayed on a screen increases in proportion to the movement amount of the pen-type input apparatus. However, because an integration error is caused when calculating the movement amount of the cursor by integrating the accelerations detected in the input apparatus, precise control cannot be performed. Therefore, the movement of the cursor becomes a movement that does not match the sense of the user.

Therefore, there is a desire to provide an input apparatus, a control apparatus, a control system, and a control method that are capable of making a movement of a UI on a screen a natural movement that matches an intuition of a user.

SUMMARY

According to an embodiment, there is provided an input apparatus including a casing, a first acceleration detection section, a first angle-related value detection section, and a calculation means.

The first acceleration detection section detects a first acceleration value of the casing in a first direction.

The first angle-related value detection section detects a first angle-related value as a value related to an angle about an axis in a second direction different from the first direction. The calculation means calculates a first velocity value of the casing in the first direction based on the first acceleration value and the first angle-related value that have been detected. Because the first velocity value is calculated based on the first acceleration value and the first angle-related value instead of being calculated by simply integrating the first acceleration value, an integration error is eliminated, thus making it possible to highly accurately calculate the velocity value of the casing.

The calculation means calculates, based on the first acceleration value and the first angle-related value that have been detected, a radius gyration of the casing about the axis in the second direction, the radius gyration being a distance between a first center axis of a rotation whose position changes with time and the first acceleration detection section, and calculates the first velocity value based on a first angular velocity value calculated from the first angle-related value and the calculated radius gyration.

When the user operates the UI displayed on the screen using a rotation of at least one of a shoulder, an elbow, a wrist, a hand, or the like, a radius gyration that changes with time generally exists in the input apparatus. In the input apparatus according to the present invention, the velocity value of the input apparatus can be calculated by calculating, for example, a radius gyration of the input apparatus about an axis in a vertical direction, and multiplying the radius gyration by the angular velocity value. By thus calculating the velocity value based on the radius gyration, even when the user operates the input apparatus by swinging the entire arm with the shoulder as an axis, a sufficient output (velocity value) can be obtained. As a whole, the movement of the UI on the screen becomes a natural movement with respect to the movement of the input apparatus, with the result that operability of the input apparatus for the user is improved.

The calculation means can calculate an acceleration change rate as a time change rate of the first acceleration value, and calculate an angular acceleration change rate as a time change rate of an angular acceleration about the axis in the second direction based on the detected first angle-related value. Further, the calculation means may calculate a ratio of the calculated acceleration change rate to the calculated angular acceleration change rate as the radius gyration.

The acceleration change rate is obtained by subjecting the first acceleration value to a temporal differentiation operation. Similarly, the angular acceleration change rate is obtained by subjecting the first angle-related value to the temporal differentiation operation. Particularly when detecting the first acceleration value, a gravity acceleration is detected while being biased by a constant value or biased in terms of a low frequency. Therefore, even when a change in component force of the gravity acceleration due to a tilt of the input apparatus is caused by differentiating the first acceleration value, the radius gyration can be calculated appropriately, and an appropriate velocity value can be calculated from the radius gyration.

The calculation means may calculate an angular acceleration value based on the detected first angle-related value, and calculate a ratio of the first acceleration value to the angular acceleration value as the radius gyration. Accordingly, power consumption of the input apparatus as well as a calculation amount can be reduced. The input apparatus may further include a storage means, a judgment means, and an update means.

The storage means stores the radius gyration calculated as the ratio of the acceleration change rate to the angular acceleration change rate.

The judgment means judges whether the angular acceleration change rate is larger than a threshold value.

The update means updates the stored radius gyration when the angular acceleration change rate is larger than the threshold value.

The calculation means calculates, when the angular acceleration change rate is smaller than the threshold value, the first velocity value by multiplying the radius gyration stored in the storage means by the first angular velocity value. For example, when the angular acceleration change rate can be obtained as a second-order differentiation value of the detected angular velocity value by the first angle-related value detection section, high-frequency noises are enlarged by the calculation. As a result, the radius gyration calculated based on the angular acceleration change rate and the velocity value calculated based on the radius gyration are affected by the noises, and accurate radius gyration and velocity value may thus not be calculated. The effect of noises on the velocity value relatively increases as an absolute value of the angular acceleration change rate decreases. As a countermeasure for this problem, when the absolute value of the angular acceleration change rate is small and the effect of noises on the velocity value is thus large, the velocity value is calculated based on the radius gyration stored in the storage means. Accordingly, it is possible to suppress the effect of noises on the velocity value.

Alternatively, the judgment means may judge whether the angular acceleration value is larger than a threshold value, and the update means may update the stored radius gyration when the angular acceleration value is larger than the threshold value. In this case, the calculation means calculates, when the angular acceleration value is smaller than the threshold value, the first velocity value by multiplying the radius gyration stored in the storage means by the first angular velocity value.

The calculation means may calculate an angular acceleration change rate as a time change rate of an angular acceleration about the axis in the second direction based on the detected first angle-related value, calculate a value obtained by removing, from the first acceleration value, a low-frequency component containing at least a component value of a gravity acceleration, that acts on the first acceleration detection section, in the first direction, calculate an acceleration change rate as a time change rate of the value from which the low-frequency component has been removed, and calculate a ratio of the calculated acceleration change rate to the calculated angular acceleration change rate as the radius gyration.

Accordingly, even when the first acceleration detection section is affected by the gravity and the change in component force of the gravity acceleration due to the tilt of the input apparatus, the radius gyration can be calculated appropriately. Therefore, an appropriate velocity value can be calculated from the radius gyration.

The input apparatus may further include a lowpass filter through which a component of a predetermined frequency band within a signal of the radius gyration passes. Accordingly, the effect of noises on the velocity value can be suppressed.

The calculation means may calculate an acceleration change rate as a time change rate of the first acceleration value, calculate an angular acceleration change rate as a time change rate of an angular acceleration about the axis in the second direction based on the detected first angle-related value, and calculate a tilt of a regression line of the acceleration change rate and the angular acceleration change rate that have been calculated, as the radius gyration. Alternatively, the calculation means may calculate a tilt of a regression line of the first acceleration value and the angular acceleration value as the radius gyration. Accordingly, an accurate radius gyration can be obtained, and an accurate velocity value can thus be calculated from the radius gyration.

The input apparatus may further include a second acceleration detection section and a second angle-related value detection section.

The second acceleration detection section detects a second acceleration value of the casing in the second direction.

The second angle-related value detection section detects a second angle-related value as a value related to an angle about an axis in the first direction.

In this case, the calculation means can calculate a second velocity value of the casing in the second direction based on the second acceleration value and the second angle-related value that have been detected.

The calculation means may calculate, based on the second acceleration value and the second angle-related value that have been detected, a second radius gyration of the casing about the axis in the first direction, the second radius gyration being a distance between a center axis of a rotation whose position changes with time and the second acceleration detection section, and calculate the second velocity value based on a second angular velocity value calculated from the second angle-related value and the calculated second radius gyration.

The input apparatus may further include a third acceleration detection section to detect a third acceleration of the casing in a third direction different from both the first direction and the second direction.

The first angle-related value detection section may detect a first angle value of the casing about the axis in the second direction. The angular velocity value can be obtained by subjecting the angle value to the temporal differentiation operation.

Alternatively, the first angle-related value detection section may detect a second angle value about the axis in the first direction.

The first angle-related value detection section may include a biaxial or triaxial angle detection means (e.g., geomagnetic sensor). By differentiating the angle values about the axes in the second and first directions, the angular velocity values can be calculated. Since a gravity direction can be recognized when the input apparatus includes a triaxial acceleration detection section as described above, it is possible to detect biaxial angle values.

The calculation means may include a processing unit to carry out operational processing for calculating the first velocity value. In this case, the input apparatus may further include a first substrate on which the processing unit is mounted and a second substrate on which the first acceleration detection section is mounted.

For example, as compared to a case where the processing unit and the first acceleration detection section are mounted on a single substrate, the second substrate can be made smaller in size than that one substrate. When the size of the second substrate is small, rigidity enhances that much, with the result that it is possible to suppress an occurrence of a distortion caused by a mechanical stress applied to the second substrate or a distortion caused by an inertial force that acts on the second substrate when the input apparatus is moved. This is because, when those distortions are caused, noises are incorporated in the detection value of the first acceleration detection section to thus degrade the detection value. Moreover, because the first and second substrates are provided separately, a degree of freedom in arrangement thereof inside the casing increases.

In addition to the first acceleration detection section, at least one of the second acceleration detection section, the first angle-related value detection section (e.g., angular velocity sensor), and the geomagnetic sensor may be mounted on the second substrate. Alternatively, the second substrate by be provided plurally, and the second acceleration detection section, the angular velocity sensor, and the like may be mounted on different second substrates.

The processing unit may include an A/D converter or may be provided separate from the A/D converter. When the A/D converter is provided separate from the processing unit, the A/D converter may be mounted on the second substrate.

The input apparatus may further include a connection means for connecting the second substrate to the casing or the first substrate in a cantilever state.

Accordingly, as compared to a case where the second substrate is connected to the casing on both sides thereof, a stress applied to the second substrate can be reduced. In addition, with such a structure, even when the user holds the casing firmly and the casing is thus deformed, a force caused by the deformation is prevented from being transferred to the second substrate as much as possible. Thus, an occurrence of a distortion of the second substrate can be suppressed.

For example, the connection means may include a protrusion portion provided in the casing, for connecting the second substrate to the casing or the first substrate in the cantilever state.

The input apparatus may further include an elastic body and a coupling member to couple the second substrate to the casing via the elastic body.

Accordingly, the stress applied to the second substrate when coupled by the coupling member can be reduced.

The connection means may include a conductive wire to electrically connect the first substrate and the second substrate.

The conductive wire may be a soft strand wire or a conductive wire having adequate rigidity. When a conductive wire such as a soft strand wire is used, adequate rigidity can be obtained by resin-molding the conductive wire.

The first angle-related value detection section may include a first angular velocity sensor to detect a first angular velocity value of the casing. In this case, the second substrate may include a first surface on which the first acceleration detection section is mounted and a second surface opposed to the first surface, on which the first angular velocity sensor is mounted.

Accordingly, the size of the second substrate can be made smaller than that in a case where both the first acceleration detection section and the first angle-related value detection section (e.g., angular velocity sensor) (hereinafter, referred to as sensors) are mounted on one surface of the second substrate. Moreover, with such a structure, a distortion caused by a temperature change in the surrounding environment and heat generated by the sensors, that is, a distortion due to a difference in linear expansion coefficients of the substrate and the sensors (mainly a package material of the sensors) is canceled out. Because of the transfer to the second substrate from both surfaces thereof, a balance of transferred heat becomes uniform, with the result that the deformation of the second substrate due to thermal expansion is suppressed.

Instead of the first angle-related value detection section (e.g., angular velocity sensor) (or in addition to the angular velocity sensor), at least one of the second acceleration detection section and the geomagnetic sensor described above may be mounted on the second surface. Alternatively, in addition to the first acceleration detection section, at least one of the second acceleration detection section and the geomagnetic sensor may be mounted on the first surface.

The input apparatus may further include a connection means for connecting at least two positions of the second substrate to the casing.

Connecting at least two positions of the second substrate to the casing means "not in the cantilever state". In this case, rigidity of the second substrate with respect to the casing (unity of casing and second substrate) is enhanced. Therefore, a distortion of the second substrate due to generation of a moment in the second substrate when the input apparatus is rotated is suppressed.

Also in this case, it is possible for the elastic body and the coupling member to be provided at the two positions. In this case, an effect that, when the user holds the casing firmly and the casing is thus deformed, the elastic body absorbs the deformation can be particularly enhanced.

The second substrate may include a circumferential portion, and a clearance may be provided between the circumferential portion and an inner surface of the casing.

Accordingly, even when the casing is similarly deformed, it is possible to prevent the force of the deformation from being transferred to the second substrate as much as possible.

The input apparatus may further include an electromagnetic shield member to cover at least the first acceleration detection section.

Accordingly, the first acceleration detection section can be prevented from being adversely affected by electromagnetic waves. For example, when a transmission unit for transmitting information using electromagnetic waves is mounted on the first substrate described above, the first acceleration detection section can be prevented from being adversely affected by radio waves generated by the transmission unit or external electromagnetic wave noises. For example, the electromagnetic shield member may be of a configuration that covers the surface of the second substrate on which the first acceleration detection section is mounted, or of a configuration that practically covers the entire second substrate.

The input apparatus may further include a transmission unit to transmit information on the first velocity value, a first substrate on which the transmission unit is mounted, and a second substrate on which the first acceleration detection section is mounted.

Since the first and second substrates are provided separately, the first acceleration detection section can be prevented from being adversely affected by the transmission radio waves generated by the transmission unit or external electromagnetic wave noises that enter via the transmission unit. In this case, the processing unit (and/or A/D converter) may be mounted on the first substrate, or may be mounted on the second substrate.

The first substrate may include a first end portion on a side closer to the second substrate and a second end portion opposed to the first end portion, the second end portion being farther away from the second substrate and mounted with the transmission unit. From viewpoints of the transmission radio waves and external electromagnetic wave noises, it is better for the transmission unit to be far from the first substrate on the second substrate as much as possible.

The first substrate may be formed with a first thickness, and the second substrate may be formed with a second thickness larger than the first thickness.

Accordingly, rigidity of the second substrate is enhanced, thus making it possible to solve the problems described above.

The second substrate described heretofore may include a connection area to be connected with the casing using a connection means, an area where the first acceleration detection section is arranged, and an opening provided between the connection area and the arrangement area. When the input apparatus is moved, a stress caused by the inertial force is applied to the second substrate. The provision of the opening can prevent the stress from being transferred from the connection means side of the second substrate to a side thereof on which the sensors are arranged as much as possible. Further, due to the provision of the opening, the weight of the second substrate becomes lighter than that in a case where an opening is not formed on a second substrate having the same size as the second substrate. Thus, the inertial force can be suppressed that much.

In a control method according to an embodiment, a first acceleration of a casing of an input apparatus in a first direction is detected.

A first angle-related value as a value related to an angle of the casing about an axis in a second direction different from the first direction is detected.

A first velocity value of the casing in the first direction is calculated based on the first acceleration value and the first angle-related value that have been detected.

According to another embodiment, there is provided an input apparatus to which operational information is input when a user moves the input apparatus 3-dimensionally, including a distance calculation means and a velocity calculation means.

The distance calculation means calculates a distance from an instant center within a virtual plane including an axis along a first direction to the input apparatus.

The velocity calculation means calculates a velocity value of the input apparatus in the first direction based on the calculated distance and an angle-related value as a value related to an angle of the input apparatus about the instant center within the virtual plane.

The input apparatus may further include a first acceleration detection section to detect an acceleration value of the input apparatus in the first direction. In this case, the distance calculation means may calculate, as the distance, a distance from the instant center to the first acceleration detection section based on the acceleration value and the angle-related value.

The distance calculation means may calculate the distance based on an acceleration value in the first direction within the virtual plane, at two positions apart from each other by a predetermined distance.

In this case, the angular acceleration value can be calculated based on acceleration values in substantially the same direction, that are obtained by the detection by the acceleration sensors disposed apart from each other by a predetermined distance, and the predetermined distance. The angular velocity value can be calculated by integrating the angular acceleration value.

On the other hand, by calculating the angular acceleration value based on the acceleration values and the predetermined distance, a distance from the instant center to the input apparatus can be calculated. For example, the velocity value in the first direction can be calculated by multiplying the calculated distance by the calculated angular velocity value.

According to an embodiment, there is provided a control apparatus controlling display of a pointer displayed on a screen in accordance with information transmitted from an input apparatus, including a reception means, a calculation means, and a coordinate information generation means.

The input apparatus includes a casing, a first acceleration detection section to detect a first acceleration value of the casing in a first direction, a first angle-related value detection section to detect a first angle-related value as a value related to an angle of the casing about an axis in a second direction different from the first direction, and a transmission means for transmitting the information on the first acceleration value and the first angle-related value.

The reception means receives the transmitted information on the first acceleration value and the first angle-related value.

The calculation means calculates a first velocity value of the casing in the first direction based on the first acceleration value and the first angle-related value that have been received.

The coordinate information generation means generates coordinate information of the pointer on the screen, that corresponds to the calculated first velocity value. According to an embodiment, there is provided a control system including an input apparatus and a control apparatus.

The input apparatus includes a casing, a first acceleration detection section, a first angle-related value detection section, a calculation means, and a transmission means.

The first acceleration detection section detects a first acceleration value of the casing in a first direction.

The first angle-related value detection section detects a first angle-related value as a value related to an angle of the casing about an axis in a second direction different from the first direction.

The calculation means calculates a first velocity value of the casing in the first direction based on the first acceleration value and the first angle-related value that have been detected.

The transmission means transmits information on the calculated first velocity value.

The control apparatus includes a reception means and a coordinate information generation means.

The reception means receives the transmitted information on the first velocity value.

The coordinate information generation means generates coordinate information of a pointer on a screen, that corresponds to the received first velocity value.

According to another embodiment, there is provided a control system including an input apparatus and a control apparatus.

The input apparatus includes a casing, a first acceleration detection section, a first angle-related value detection section, and a transmission means.

The first acceleration detection section detects a first acceleration value of the casing in a first direction.

The first angle-related value as a value related to an angle of the casing about an axis in a second direction different from the first direction.

The transmission means transmits information on the first acceleration value and the first angle-related value.

The control apparatus includes a reception means, a calculation means, and a coordinate information generation means.

The reception means receives the transmitted information on the first acceleration value and the first angle-related value.

The calculation means calculates a first velocity value of the casing in the first direction based on the first acceleration value and the first angle-related value that have been received.

The coordinate information generation means generates coordinate information of a pointer on a screen, that corresponds to the calculated first velocity value.

As described above, an input apparatus, a control apparatus, a control system, and a control method that are capable of making a movement of a UI on a screen a natural movement that matches an intuition of a user are provided.

Additional features and advantages are described herein, and will be apparent from, the following Detailed Description and the figures.

BRIEF DESCRIPTION OF THE FIGURES

FIG. 1 A diagram showing a control system according to an embodiment.

FIG. 22 Graphs obtained by simulating velocity values calculated by the input apparatus and actual velocities at a sensor arrangement portion of the input apparatus under different conditions.

FIG. 25 A table showing several examples of combination patterns of sensors necessary for deriving the radius gyrations.

FIG. 35 A cross-sectional diagram of the sensor unit shown in FIG. 34, a casing, and the like.

FIG. 36 A front view showing a sensor unit according to another embodiment. Diagrams showing a configuration in which the acceleration sensor unit and the angular velocity sensor unit are respectively provided on front and back surfaces of a circuit board.

DETAILED DESCRIPTION

Hereinafter, embodiments will be described with reference to the drawings.

FIG. 1 is a diagram showing a control system according to an embodiment. A control system 100 includes a display apparatus 5, a control apparatus 40, and an input apparatus 1.

Figure 2:
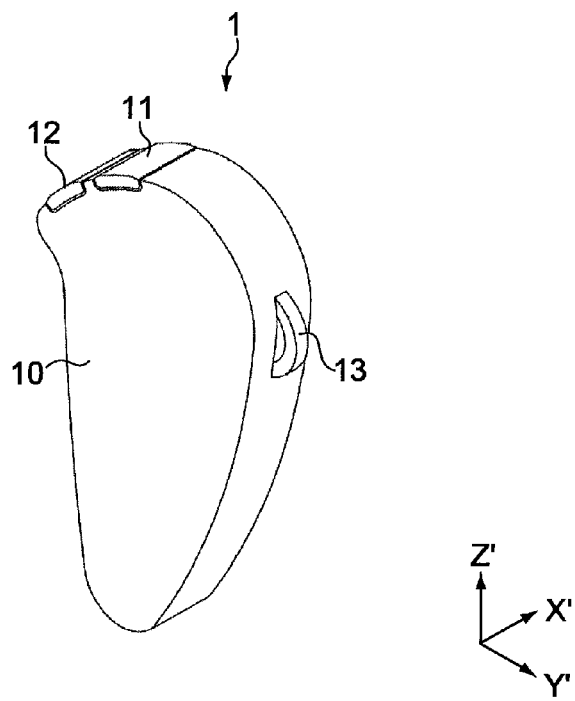
FIG. 2 A perspective diagram showing an input apparatus.

FIG. 2 is a perspective diagram showing the input apparatus 1. The input apparatus 1 is of a size that a user is capable of holding. The input apparatus 1 includes a casing 10 and operation sections including two buttons 11 and 12 provided at an upper portion of the casing 10, a rotary wheel button 13, and the like, for example. The button 11 disposed closer to the center of the upper portion of the casing 10 functions as a left button of a mouse as an input device for a PC, for example, and the button 12 adjacent to the button 11 functions as a right button of a mouse.

For example, a "drag and drop" operation may be executed by moving the input apparatus 1 while pressing the button 11, a file may be opened by double-clicking the button 11, and a screen 3 may be scrolled by the wheel button 13. Locations of the buttons 11 and 12 and the wheel button 13, a content of a command issued, and the like can arbitrarily be changed.

Figure 3:
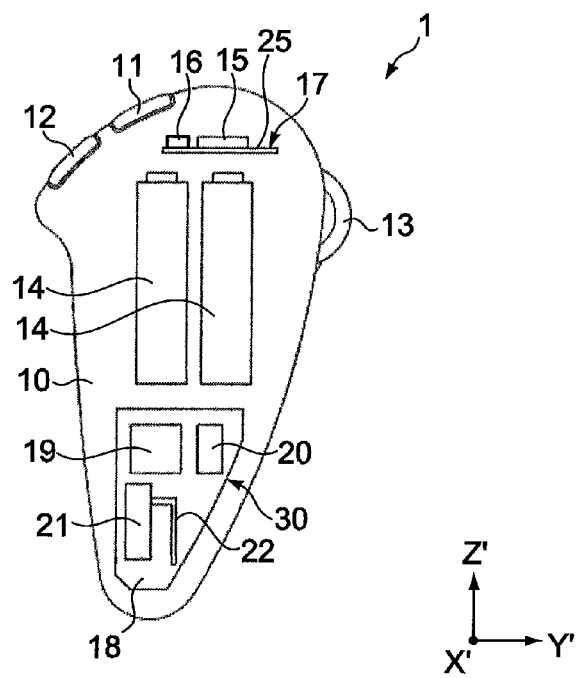
FIG. 3 A diagram schematically showing an internal structure of the input apparatus.
Figure 4:
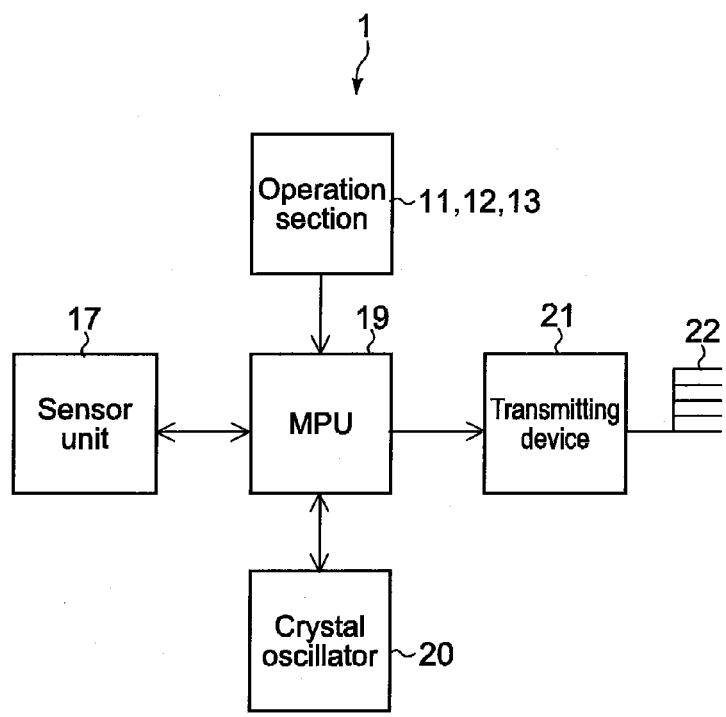
FIG. 4 A block diagram showing an electrical structure of the input apparatus.

FIG. 3 is a diagram schematically showing an internal structure of the input apparatus 1. FIG. 4 is a block diagram showing an electrical structure of the input apparatus 1.

The input apparatus 1 includes a sensor unit 17, a control unit 30, and batteries 14.

Figure 8:
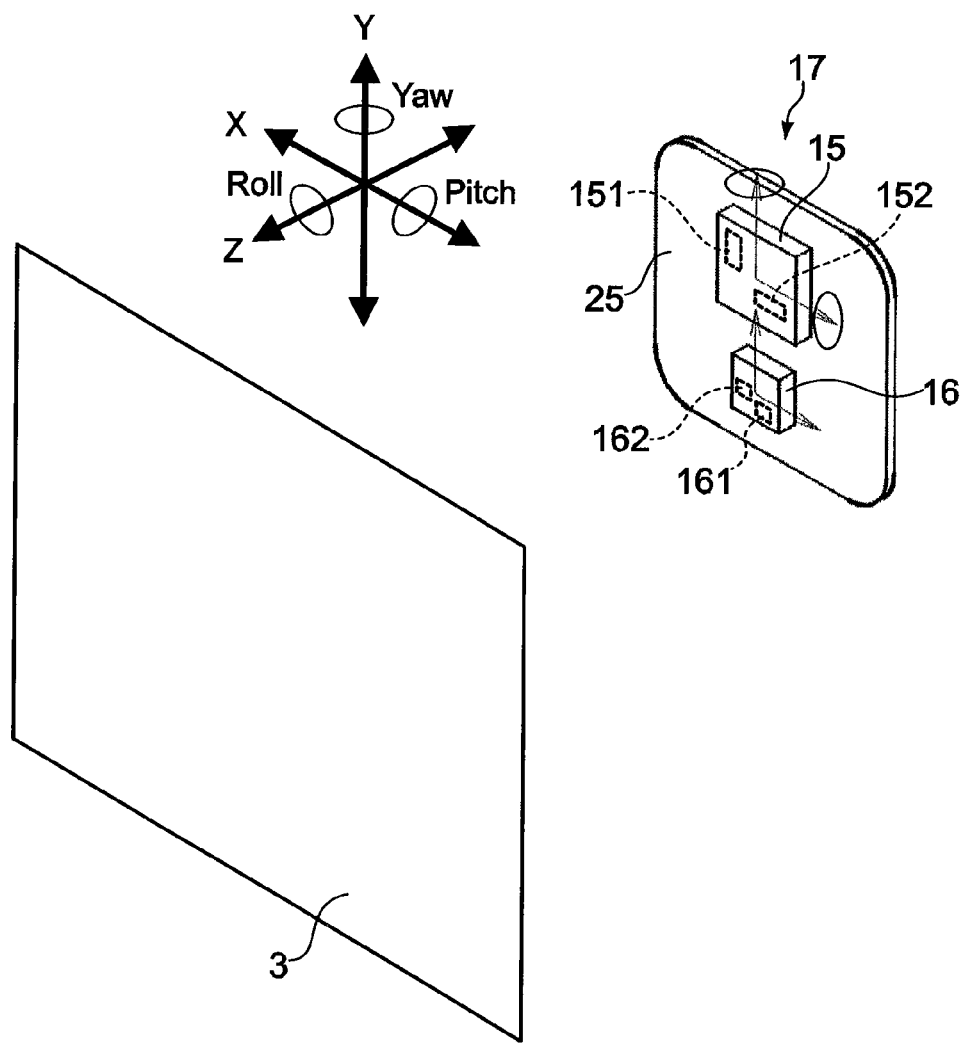
FIG. 8 A perspective diagram showing a sensor unit.

FIG. 8 is a perspective diagram showing the sensor unit 17.

The sensor unit 17 includes an acceleration sensor unit 16 for detecting accelerations in different angles such as along two orthogonal axes (X axis and Y axis). Specifically, the acceleration sensor unit 16 includes two sensors, that is, an acceleration sensor 161 (first acceleration sensor or second acceleration sensor) for an X-axis direction and an acceleration sensor 162 (second acceleration sensor or first acceleration sensor) for a Y-axis direction.

The sensor unit 17 further includes an angular velocity sensor unit 15 for detecting angular accelerations about the two orthogonal axes. Specifically, the angular velocity sensor unit 15 includes two sensors, that is, an angular velocity sensor 151 for a yaw direction and an angular velocity sensor 152 for a pitch direction. The acceleration sensor unit 16 and the angular velocity sensor unit 15 are packaged and mounted on a circuit board 25.

As each of the angular velocity sensors 151 and 152 for the yaw and pitch directions, respectively, a vibration gyro sensor for detecting Coriolis force in proportion to an angular velocity is used. As each of the acceleration sensors 161 and 162 for the X- and Y-axis directions, respectively, any sensor such as a piezoresistive sensor, a piezoelectric sensor, or a capacitance sensor may be used. The angular velocity sensor 151 or 152 is not limited to the vibration gyro sensor, and a rotary top gyro sensor, a ring laser gyro sensor, a gas rate gyro sensor, and the like may also be used.

In descriptions on FIGS. 2 and 3, a longitudinal direction of the casing 10 is referred to as Z' direction, a thickness direction of the casing 10 is referred to as X' direction, and a width direction of the casing 10 is referred to as Y' direction for convenience. In this case, the sensor unit 17 is incorporated into the casing 10 such that a surface of the circuit board 25 on which the acceleration sensor unit 16 and the angular velocity sensor unit 15 are mounted becomes substantially parallel to an X'-Y' plane. As described above, the sensor units 16 and 15 each detect physical amounts with respect to the two axes, that is, the X axis and the Y axis. In descriptions below, with regard to a movement of the input apparatus 1, a rotational direction about the X' axis is sometimes referred to as pitch direction, a rotational direction about the Y' axis is sometimes referred to as yaw direction, and a rotational direction about the Z' axis (roll axis) is sometimes referred to as roll direction.

The control unit 30 includes a main substrate 18, an MPU 19 (Micro Processing Unit) (or CPU) mounted on the main substrate 18, a crystal oscillator 20, a transmitting device 21, and an antenna 22 printed on the main substrate 18.

The MPU 19 includes a built-in volatile or nonvolatile memory requisite therefor. The MPU 19 is input with a detection signal from the sensor unit 17, an operation signal from the operation section, and the like, and executes various kinds of operational processing in order to generate predetermined control signals in response to those input signals. The memory may be provided separate from the MPU 19.

Typically, the sensor unit 17 outputs analog signals. In this case, the MPU 19 includes an A/D (Analog/Digital) converter. Alternatively, the sensor unit 17 may be a unit that includes the A/D converter.

The MPU 19 alone or the MPU 19 and the crystal oscillator 20 constitutes/constitute a processing unit.

The transmitting device 21 (transmission means) transmits, as RF radio signals, the control signals (input information) generated in the MPU 19 to the control apparatus 40 via the antenna 22. At least one of the transmitting device 21 and the antenna 22 constitutes a transmission unit.

The crystal oscillator 20 generates clocks and supplies them to the MPU 19. As the batteries 14, dry cell batteries, rechargeable batteries, and the like are used.

The control apparatus 40 is a computer and includes an MPU 35 (or CPU), a display control section 42, a RAM 36, a ROM 37, a video RAM 41, an antenna 39, and a receiver device 38.

The receiver device 38 receives the control signal transmitted from the input apparatus 1 via the antenna 39. The MPU 35 analyzes the control signal and executes various kinds of operational processing. The display control section 42 mainly generates screen data to be displayed on the screen 3 of the display apparatus 5 under control of the MPU 35. The video RAM 41 as a working area of the display control section 42 temporarily stores the generated screen data.

The control apparatus 40 may be an apparatus dedicated to the input apparatus 1, or may be a PC or the like. The control apparatus 40 is not limited to the PC, and may be a computer integrally formed with the display apparatus 5, audiovisual equipment, a projector, a game device, a car navigation system, or the like.

Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like.

Figure 5:
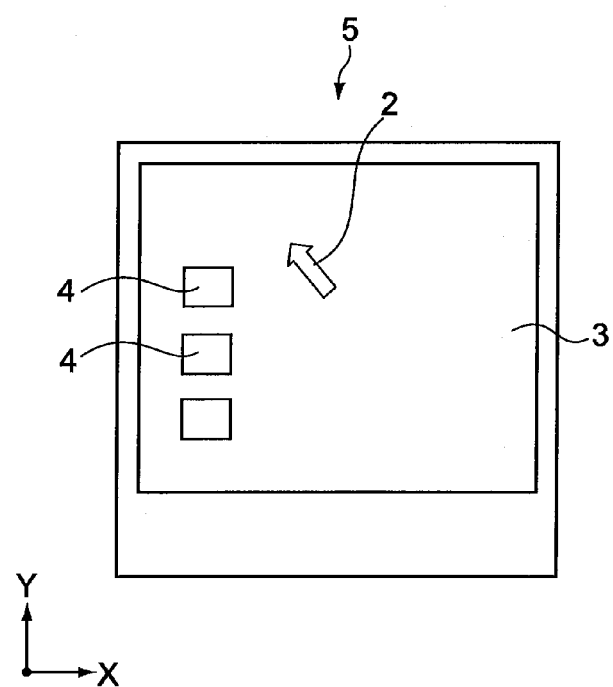
FIG. 5 A diagram showing an example of a screen displayed on a display apparatus.

FIG. 5 is a diagram showing an example of the screen 3 displayed on the display apparatus 5. UIs such as icons 4 and a pointer 2 are displayed on the screen 3. The icons are images on the screen 3 representing functions of programs, execution commands, file contents, and the like of the computer. It should be noted that on the screen 3, the horizontal direction is referred to as X-axis direction and the vertical direction is referred to as Y-axis direction. Unless stated otherwise, to help understand descriptions below, the UI as an operation target of the input apparatus 1 will be described as being the pointer 2 (so-called cursor).

Figure 6:
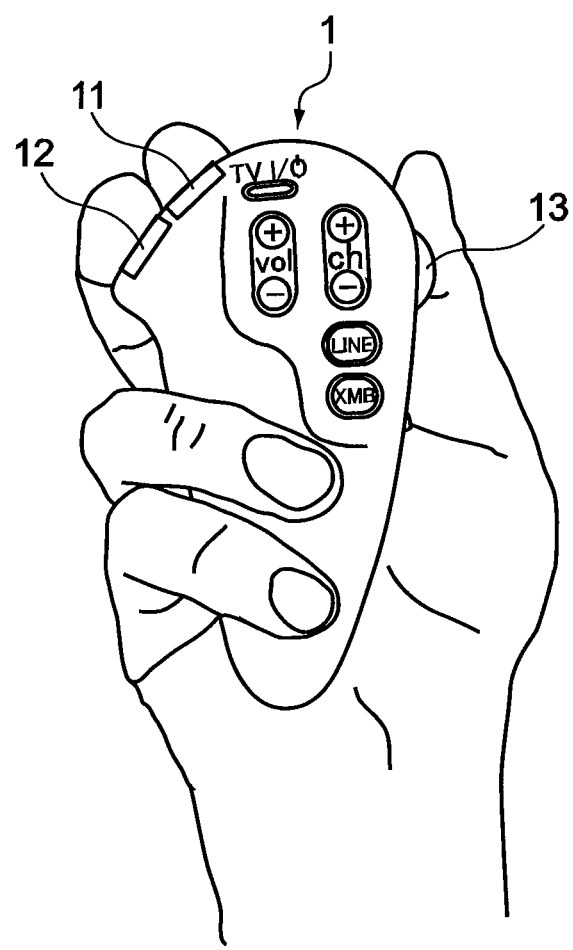
FIG. 6 A diagram showing a state where a user is holding the input apparatus.

FIG. 6 is a diagram showing a state where a user is holding the input apparatus 1. As shown in FIG. 6, the input apparatus 1 may include, in addition to the buttons 11, 12, and 13, operation sections including various operation buttons such as those provided to a remote controller for operating a television or the like and a power supply switch, for example. When the user moves the input apparatus 1 in the air or operates the operation sections while holding the input apparatus 1 as shown in the figure, input information thereof is output to the control apparatus 40, and the control apparatus 40 controls the UI.

Figure 7:
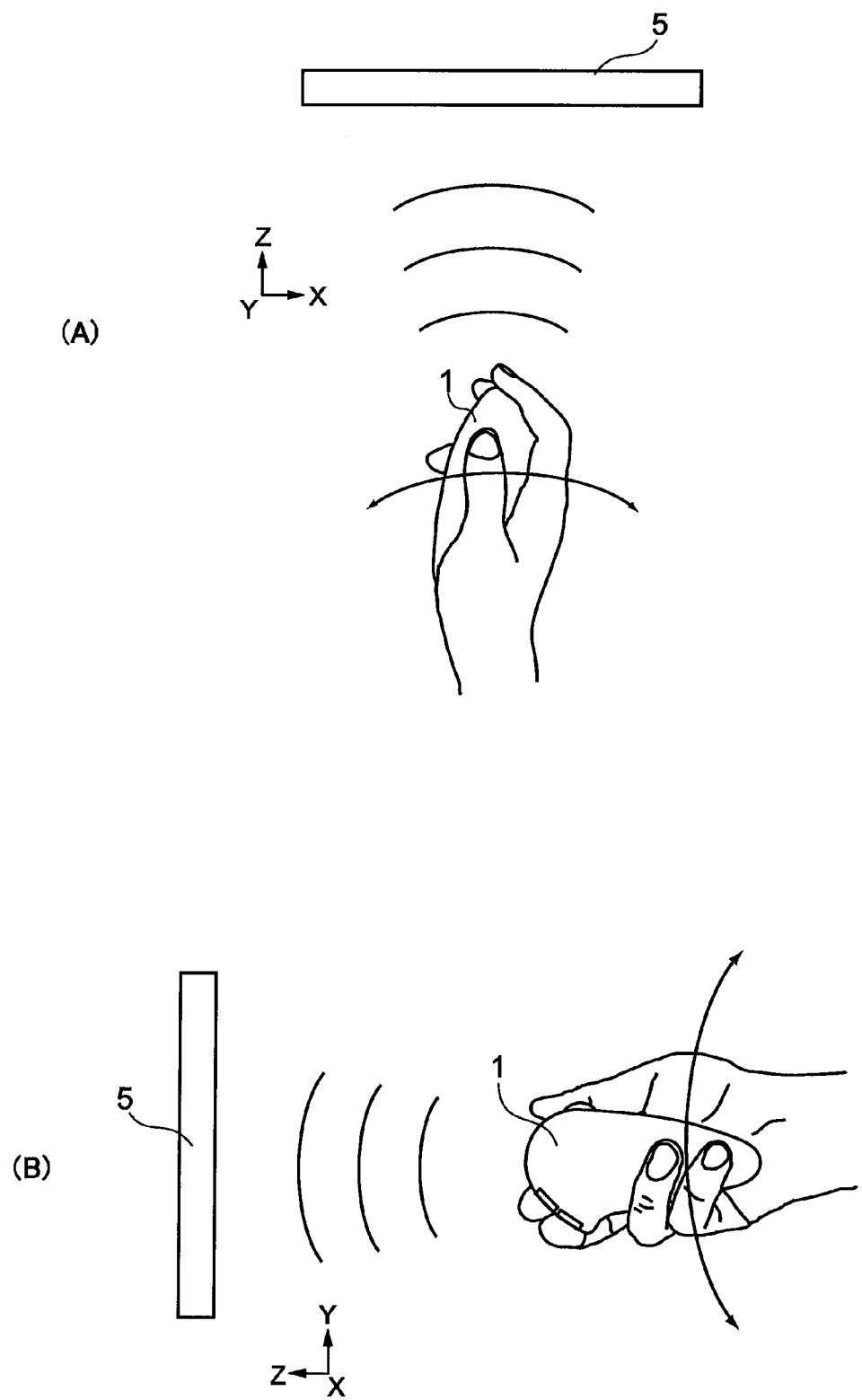
FIG. 7 Explanatory diagrams showing typical examples of ways of moving the input apparatus and ways a pointer moves on the screen accordingly.

Next, a description will be given on typical examples of ways of moving the input apparatus 1 and ways the pointer 2 moves on the screen 3 accordingly. FIGS. 7 are explanatory diagrams therefor.

As shown in FIGS. 7A and 7B, the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 of the sensor unit 17 (see FIG. 8) is close to being in parallel with the screen 3 of the display apparatus 5, and the two axes as detection axes of the sensor unit 17 respectively correspond to the horizontal axis (X axis) and the vertical axis (Y axis) on the screen 3. Hereinafter, the position of the input apparatus 1 as shown in FIGS. 7A and 7B will be referred to as reference position.

In descriptions below, a coordinate system stationary on earth, that is, an inertial coordinate system is expressed using the X axis, the Y axis, and the Z axis, whereas a coordinate system that moves integrally with the input apparatus 1 (coordinate system of input apparatus 1) is expressed using the X' axis, the Y' axis, and the Z' axis.

As shown in FIG. 7A, in the reference position, the user swings a hand or an arm in the lateral direction, that is, the yaw direction. At this time, the acceleration sensor 161 for the X'-axis direction detects an acceleration $a_x$ in the X'-axis direction (first acceleration value or second acceleration value), and the angular velocity sensor 151 for the yaw direction detects an angular velocity $\omega_\psi$ about the Y' axis (first angular velocity value or second angular velocity value).

Based on those detection values, the control apparatus 40 controls display of the pointer 2 so that the pointer 2 moves in the X-axis direction.

Meanwhile, as shown in FIG. 7B, in the reference position, the user swings the hand or the arm in the vertical direction, that is, the pitch direction. At this time, the acceleration sensor 162 for the Y'-axis direction detects an acceleration $a_y$ in the Y'-axis direction (second acceleration value or first acceleration value), and the angular velocity sensor 152 for the pitch direction detects an angular velocity $\omega_\theta$ about the X' axis (second angular velocity or first angular velocity). Based on those detection values, the control apparatus 40 controls display of the pointer 2 so that the pointer 2 moves in the Y-axis direction.

Although descriptions will be given later, in one embodiment, the MPU 19 of the input apparatus 1 calculates velocity values in the X- and Y-axis directions based on the detection values detected by the sensor unit 17, in accordance with programs stored in the built-in nonvolatile memory. The input apparatus 1 transmits the velocity values to the control apparatus 40.

The control apparatus 40 converts a displacement in the X-axis direction per unit time into a displacement amount of the pointer 2 on the X axis on the screen 3, and converts a displacement in the Y-axis direction per unit time into a displacement amount of the pointer 2 on the Y axis on the screen 3, to thus move the pointer 2.

Typically, regarding the velocity values supplied every predetermined number of clocks, the MPU 35 of the control apparatus 40 adds an n-th velocity value that has been supplied to a (n-1)-th velocity value that has been supplied. Accordingly, the n-th velocity value that has been supplied corresponds to the displacement amount of the pointer 2, and coordinate information of the pointer 2 on the screen 3 is generated.

In another embodiment, the input apparatus 1 transmits physical amounts detected by the sensor unit 17 to the control apparatus 40. In this case, the MPU 35 of the control apparatus 40 calculates the velocity values in the X- and Y-axis directions based on the received input information in accordance with the program stored in the ROM 37, and controls display so that the pointer 2 moves in accordance with the velocity values (see FIGS. 17 and 23).

Figure 11:
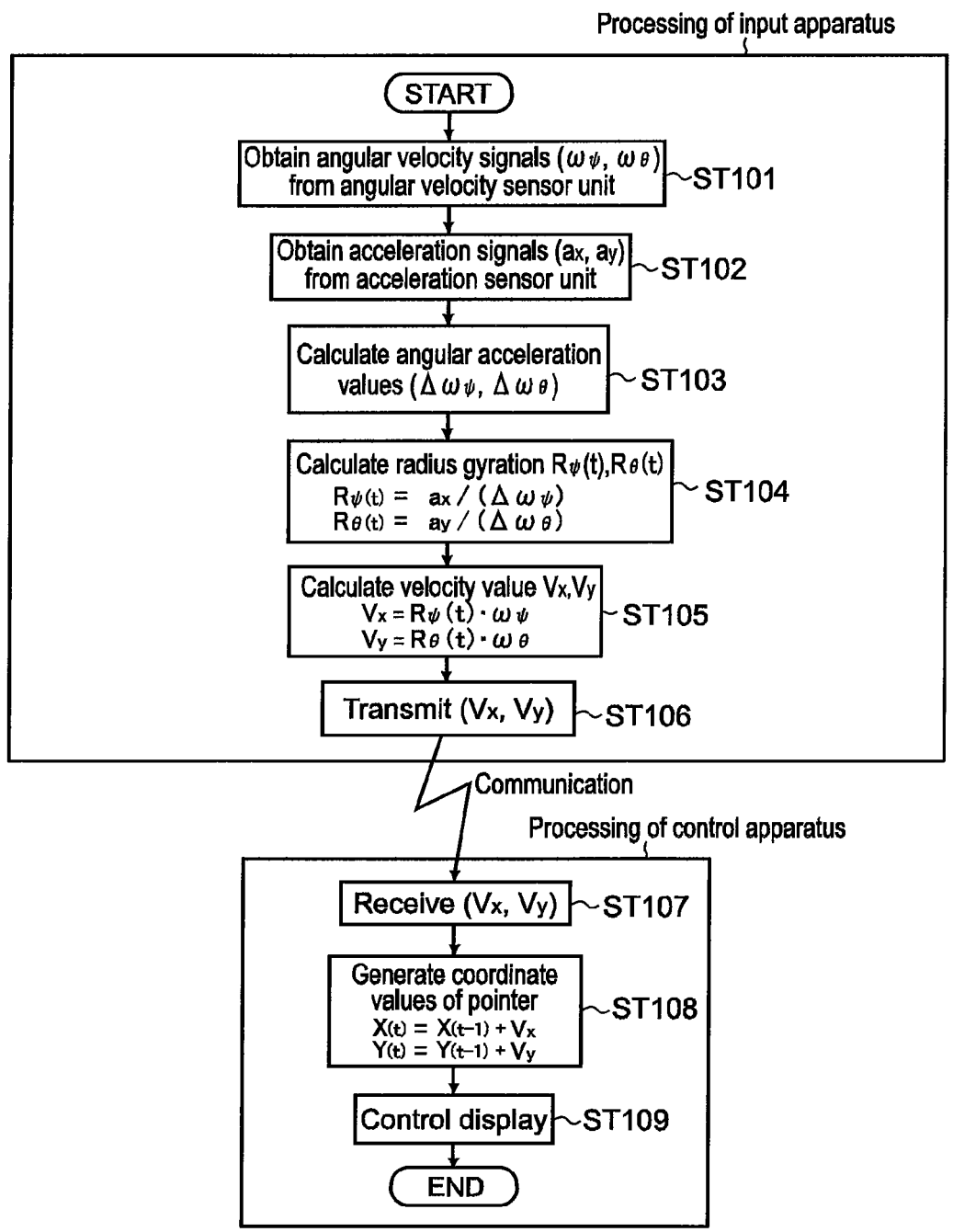
FIG. 11 A flowchart showing an operation of the control system.
Figure 12:
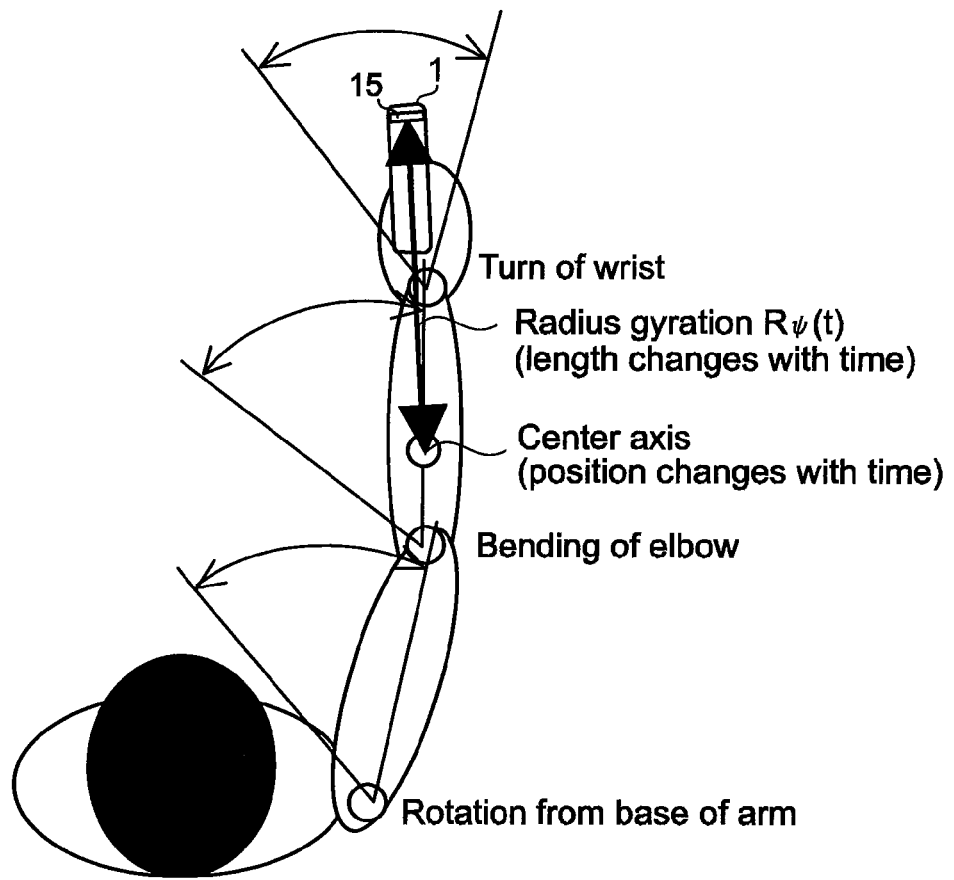
FIG. 12 A diagram for illustrating radius gyrations, the diagram showing a top view of the user operating the input apparatus by swinging it in a lateral direction (yaw direction).

An operation of the control system 100 structured as described above will be described. FIG. 11 is a flowchart showing the operation. FIG. 12 is a diagram for illustrating a basic idea of a method of calculating the velocity values of the casing 10 input to the input apparatus 1 in the flowchart.

It should be noted that in FIG. 11 and the like, a form in which acceleration signals are obtained by the acceleration sensor unit after the angular velocity signals are obtained by the angular velocity sensor unit is shown. However, the present invention is not limited to this order, and a form in which the angular velocity signals are obtained after the acceleration signals or a form in which the acceleration signals and the angular velocity signals are obtained in parallel (simultaneously) is also possible (hereinafter, the same holds true in FIGS. 17, 19, 21, 23, and 24).

FIG. 12 is a top view of the user operating the input apparatus 1 by swinging it in, for example, the lateral direction (yaw direction). As shown in FIG. 12, when the user operates the input apparatus 1 naturally, an operation is made by using at least one of a turn of a wrist (or hand), a bending of an elbow, and a rotation from a base of an arm.

Specifically, the input apparatus 1 is operated by a rotational movement in which a movement of the entire body of the user is added to three rotations including the rotation about a base of an arm (shoulder) (see FIG. 13A), the rotation about an elbow (see FIG. 13B), and the rotation about a hand (or wrist) (see FIG. 13C). In other words, the hand, elbow, shoulder, and the like each become a rotational axis, and the rotational axes move successively or simultaneously. Specifically, the rotational movement of the input apparatus 1 at one instant is obtained by combining the rotational movements of the shoulder, elbow, hand, and the like, and a position of a center axis of the thus-combined rotation changes with time, and a radius gyration R also changes with time.

Therefore, a comparison between the movement of the input apparatus 1 and the rotations of a shoulder, elbow, and hand shows that there exist relationships of 1 and 2 below.

1. The angular velocity value $\omega_\psi$ of the input apparatus 1 about the Y' axis is a combined value of an angular velocity obtained by the rotation about a shoulder, an angular velocity obtained by the bending of an elbow, an angular velocity obtained by the turn of a wrist, and an angular velocity obtained by a turn of a hand or the like.

2. The velocity value $V_x$ of the input apparatus 1 in the X-axis direction is a combined value of values obtained by respectively multiplying the angular velocities of the shoulder, elbow, hand, and the like by a distance between the shoulder and the input apparatus 1, a distance between the elbow and the input apparatus 1, a distance between the hand and the input apparatus 1, and the like.

Figure 14:
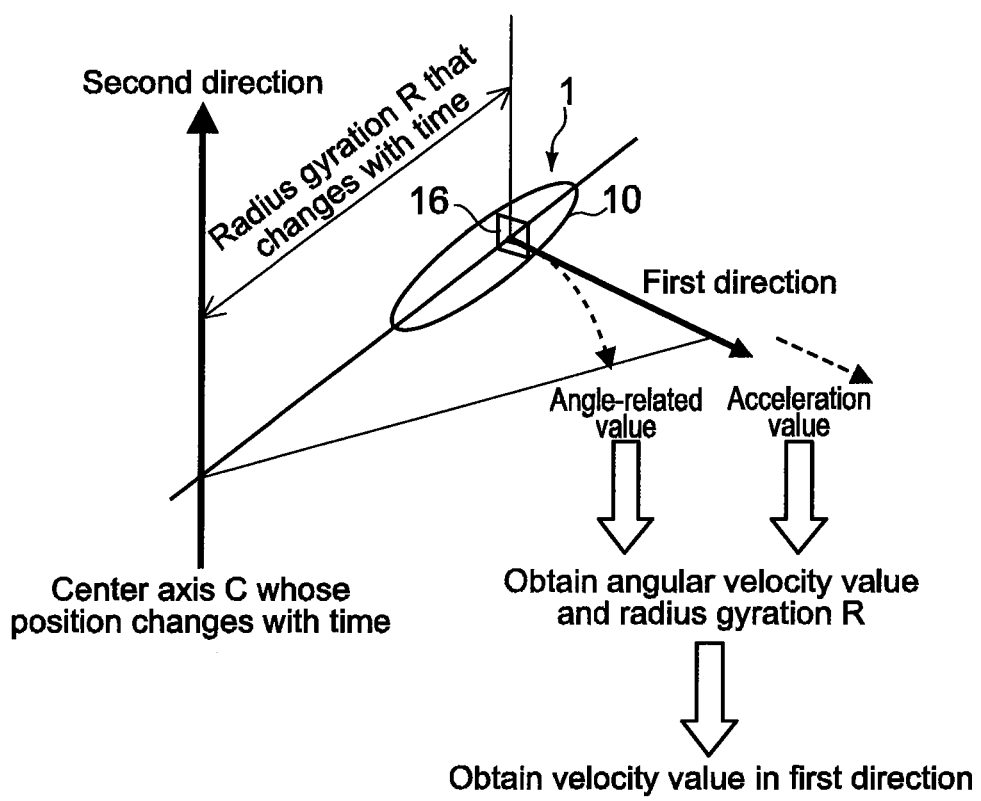
FIG. 14 A diagram showing a principle of a method of calculating velocity values.

FIG. 14 is a diagram showing a principle of the velocity value calculation method that uses such an idea.

FIG. 14 shows a state at an instant when the user has moved the input apparatus 1 at a predetermined angular velocity in a direction in which a first direction is a tangent direction, for example. Based on an acceleration value a in the first direction obtained by the acceleration sensor unit 16 and an angle-related value (e.g., angular velocity value ω) of the input apparatus 1 about a center axis C at that instant, the input apparatus 1 can calculate the radius gyration R as a distance from the center axis C to the input apparatus 1. In addition, the input apparatus 1 can calculate a velocity value V of the casing 10 in the first direction based on the calculated radius gyration R.

As described above, a position of the rotational center axis C and the radius gyration R change with time. Further, the angular velocity value w is an angular velocity value about a second direction orthogonal to the first direction, that is, the center axis C. With the first direction as the X'-axis direction, the angular velocity value ω is typically an angular velocity value about the Y'-axis direction obtained by the angular velocity sensor unit 15 provided inside the casing 10.

Specifically, when a radius gyration about the center axis C is represented by $R_\psi(t)$, a relationship between the velocity value $V_x$ of the input apparatus 1 and the angular velocity value $\omega_\psi$ about the direction of the center axis C can be expressed by Equation (1) below. In other words, the velocity value $V_x$ in the X-axis direction becomes a value obtained by multiplying the angular velocity value $\omega_\psi$ about the Y'-axis direction by the distance $R_\psi(t)$ between the center axis C and the input apparatus 1.

$$V_x = R_\psi(t) * \omega_\psi \quad (1)$$

Figure 15:
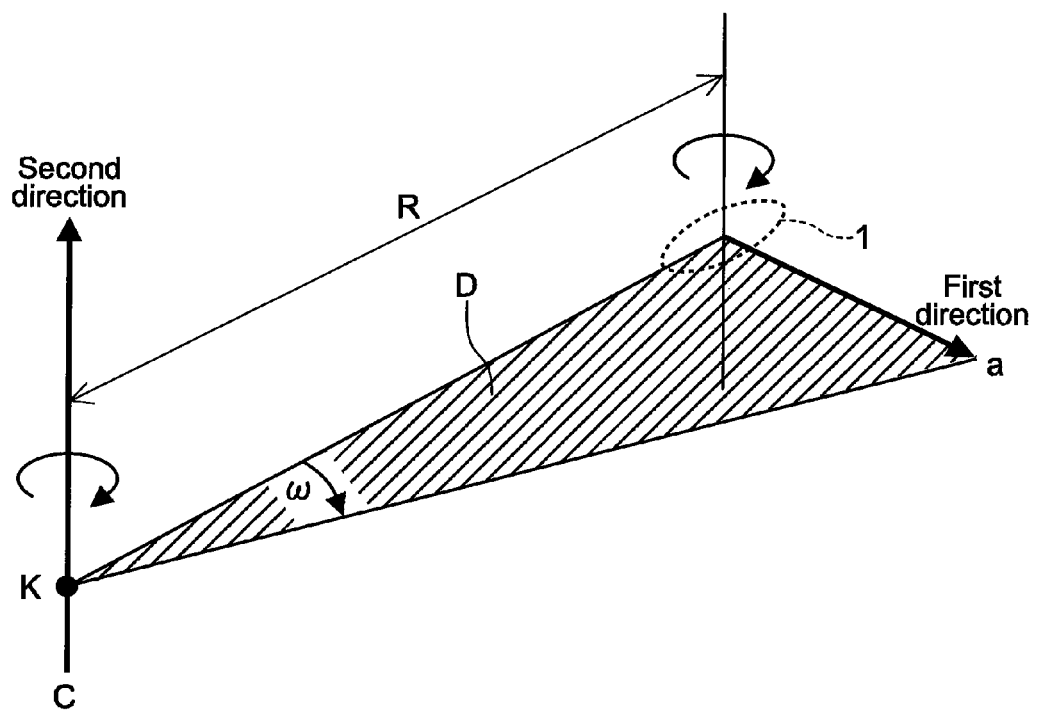
FIG. 15 A principle diagram showing the principle of the method of calculating velocity values shown in FIG. 14 from a different viewpoint.

FIG. 15 is a principle diagram showing the principle of the velocity value calculation method shown in FIG. 14 from a different viewpoint.

A virtual plane D including an axis along a predetermined direction (e.g., first direction) and an instant center K about which the input apparatus 1 rotates with the first direction as the tangent direction will be discussed. The input apparatus 1 rotationally moves about an axis vertical to the virtual plane D (e.g., axis along second direction). Specifically, the rotational movement of the input apparatus 1 about the instant center K is obtained by combining the rotational movements of the shoulder, elbow, hand, and the like of the user.

A position of a center of the thus-combined rotation, that is, the instant center K changes with time, and the radius gyration R included in the virtual plane D also changes with time.

The input apparatus 1 calculates the radius gyration R and calculates the velocity value V of the input apparatus 1 in the first direction based on the calculated radius gyration R and the angular velocity value ω about the axis vertical to the virtual plane D. Here, the first direction can be set as the X'-axis direction and the second direction can be set as the Y'-axis direction, and the velocity value $V_x$ in the X'-axis direction can be calculated using Equation (1) above also in the principle shown in FIG. 15.

It should be noted that in this embodiment, the acceleration sensor unit 16 and the angular velocity sensor unit 15 are provided integrally on the circuit board 25 of the sensor unit 17. Therefore, in formality, the radius gyration R(t) becomes a distance from the center axis C to the sensor unit 17. However, in a case where the acceleration sensor unit 16 and the angular velocity sensor unit 15 are provided apart from each other inside the casing 10, a distance from the center axis C to a portion of the input apparatus 1 at which the acceleration sensor unit 16 is disposed (hereinafter, referred to as sensor arrangement portion) becomes the radius gyration R(t).

As expressed in Equation (1), the relationship between the velocity value and the angular velocity value at the sensor arrangement portion of the input apparatus 1 is a proportional relationship, that is, a correlation with R(t) as a proportional constant.

Equation (1) above is modified to obtain Equation (2).

$$R_\psi(t) = V_x / \omega_\psi \quad (2)$$

$V_x$ and $\omega_\psi$ on the right-hand side of Equation (2) is a velocity dimension. Even when the velocity value and the angular velocity value represented on the right-hand side of Equation (2) are differentiated to obtain a dimension of the acceleration or acceleration time change rate, the correlation is not lost. Similarly, even when the velocity value and the angular velocity value are integrated to obtain a displacement dimension, the correlation is not lost.

Therefore, with the velocity and the angular velocity represented on the right-hand side of Equation (2) as a dimension of the displacement, acceleration, and acceleration time change rate, Equations (3), (4), and (5) below can be obtained.

$$R_\psi(t) = x/\psi \quad (3)$$

$$R_\omega(t) = a_x/\Delta\omega_\psi \quad (4)$$

$$R_\psi(t) = \Delta a_x \Delta(\Delta\omega_\psi) \quad (5)$$

Focusing on Equation (4) out of Equations (2), (3), (4), and (5) above, for example, it can be seen that the radius gyration $R_\psi(t)$ can be obtained if the acceleration value $a_x$ and the angular acceleration value $\Delta\omega_\psi$ are known. As described above, the acceleration sensor 161 detects the acceleration value $a_x$ in the X'-axis direction, and the angular velocity sensor 151 detects the angular velocity value w about the Y' axis. Therefore, if the angular velocity value $\omega_\psi$ about the Y' axis is differentiated and the angular acceleration value $\Delta\omega_\psi$ about the Y' axis is thus calculated, the radius gyration $R_\psi(t)$ about the Y' axis can be obtained.

If the radius gyration $R_\psi(t)$ about the Y' axis is known, the velocity value $V_x$ of the input apparatus 1 in the X'-axis direction can be obtained by multiplying the radius gyration $R_\psi(t)$ by the angular velocity value $\omega_\psi$ about the Y' axis detected by the angular velocity sensor 151 (see Equation (1)). Specifically, a rotational amount of rotational parts of a body of the user is converted into a linear velocity value in the X'-axis direction.

As described above, when the user operates the input apparatus, the rotational center of the apparatus corresponds to a position obtained by combining the rotational movements of the user and that changes with time (instant center). Therefore, when the entire arm is swung with the shoulder as an axis and the input apparatus is thus operated, the angular velocity to be detected becomes a relatively-small value. According to the present invention in which the velocity value $V_x$ is obtained by multiplying the radius gyration $R_\psi(t)$ by the angular velocity value $\omega_\psi$, because the radius gyration $R_\psi(t)$ is detected as a relatively-large value even in the case of the example above (the entire arm is swung with the shoulder as an axis to thus operate the input apparatus), it becomes possible to obtain a sufficient velocity value $V_x$ that corresponds to the operational amount of the user. By controlling the movement of the pointer 2 using the velocity value $V_x$, the movement of the pointer becomes a movement that matches the intuition of the user operating the input apparatus. In fact, in a method of controlling a pointer using an output value of a rotation sensor of the related art, in the case of the example above (the entire arm is swung with the shoulder as an axis to thus operate the input apparatus), the movement of the pointer has not been satisfactory with respect to the operation of the user (did not move according to operational amount), and the movement of the pointer has not matched the sense of the user. According to the present invention, however, such a problem can be solved. In addition, because it is unnecessary to calculate the velocity value by integrating the output value of the acceleration sensor, an integration error of the output value of the acceleration sensor can be suppressed, thus making it possible to perform accurate control.

Therefore, since the movement of the pointer 2 becomes a natural movement with respect to the movement of the input apparatus 1, operability of the input apparatus 1 for the user is improved.

The velocity value calculation method can also be applied to a case where the user operates the input apparatus 1 by swinging it in the vertical direction (pitch direction).

It should be noted that regarding the sensor unit 17, the case where the detection axes of the X' axis and the Y' axis of the angular velocity sensor unit 15 and the detection axes of the X' axis and the Y' axis of the acceleration sensor unit 16 respectively match each other has been described as a typical example. In other words, the acceleration value $a_x$ in the first direction (e.g., X'-axis direction) is detected by the acceleration sensor 161 for X' axis detection, and the angular velocity value $\omega_\psi$ is detected by the angular velocity sensor 151 for yaw direction detection that has a detection axis that matches the direction of the Y' axis that is orthogonal to the X' axis and is a detection axis of the acceleration sensor 162.

However, the detection axes of the angular velocity sensor unit 15 and the detection axes of the acceleration sensor unit 16 do not necessarily need to match. For example, in a case where the angular velocity sensor unit 15 and the acceleration sensor unit 16 are mounted on a substrate, the angular velocity sensor unit 15 and the acceleration sensor unit 16 may be mounted while being deviated a predetermined rotation angle within a main surface of the substrate so that the detection axes of the angular velocity sensor unit 15 and the acceleration sensor unit 16 do not match. In this case, the accelerations and angular velocities with respect to the respective axes can be obtained by a calculation that uses a trigonometric function.

Moreover, the detection axes of each of the angular velocity sensor unit 15 and the acceleration sensor unit 16 of the sensor unit 17 do not necessarily need to be mutually orthogonal like the X' axis and the Y' axis described above. In this case, the accelerations respectively projected in the mutually-orthogonal axial directions can be obtained by a calculation that uses the trigonometric function. Similarly, the angular velocities about the mutually-orthogonal axes can be obtained by the calculation that uses the trigonometric function.

Figure 16:
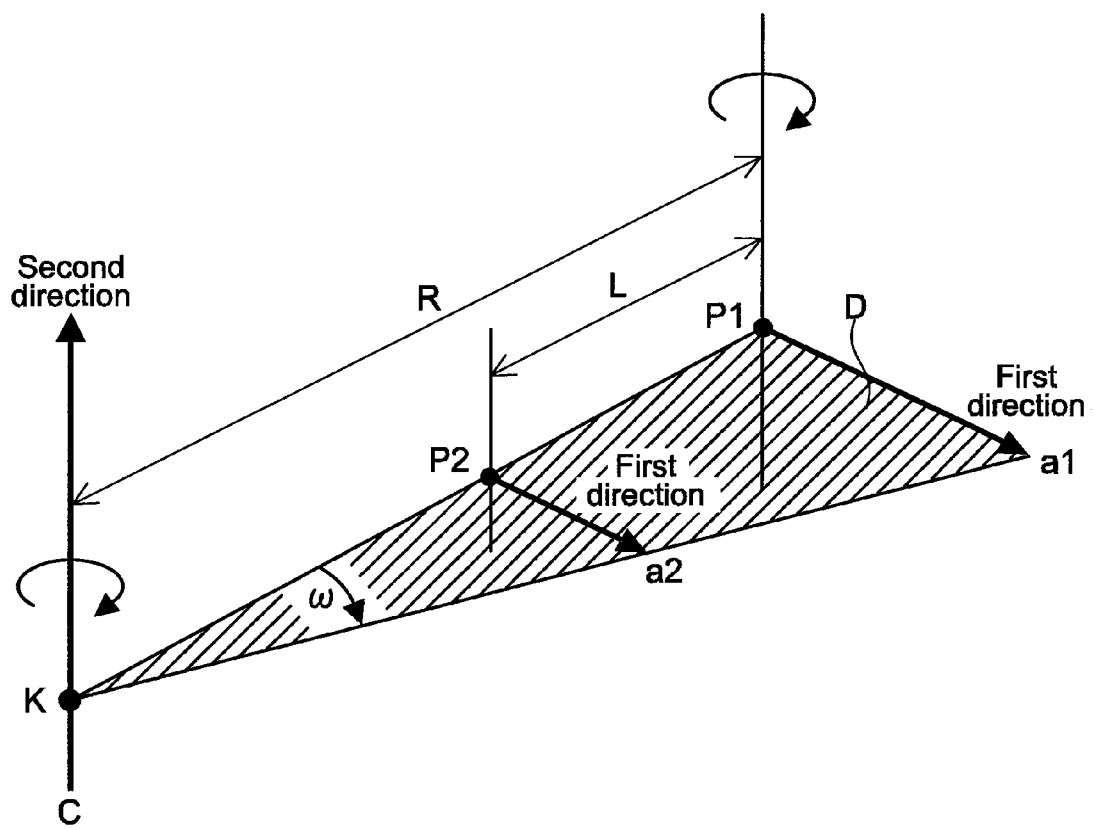
FIG. 16 A principle diagram for illustrating another embodiment of the method of calculating velocity values of the input apparatus.

FIG. 16 is a principle diagram for illustrating another embodiment of the method of calculating the velocity values of the input apparatus. FIGS. 14 and 15 have shown the case where the velocity values are calculated based on the detection values obtained by the acceleration sensors and the angular velocity sensors. However, in the method shown in FIG. 16, the velocity values are calculated based on the detection values obtained by two acceleration sensors disposed apart from each other by a predetermined distance.

FIG. 16 shows an example where two acceleration sensors for detecting accelerations in the first direction are disposed inside the casing of the input apparatus at positions apart by a predetermined distance practically along a direction of an extended line from a user's arm in a state where the user is operating the input apparatus while holding it in hand.

FIG. 16 is a principle diagram showing a principle for calculating the velocity values, the principle diagram assuming a state at an instant when the user has moved the input apparatus in the first direction at a predetermined angular velocity.

Acceleration vectors a1 and a2 parallel to a predetermined direction (first direction), at two points P1 and P2 as arrangement positions of the respective acceleration sensors apart by a predetermined distance L as shown in FIG. 16 will be discussed. Further, a straight line that connects the two points P1 and P2 and is orthogonal to the acceleration vectors a1 and a2 will be discussed. An intersection of the straight line and a straight line that connects tip ends of the acceleration vectors a1 and a2 is represented by K, and a distance between the intersection K and the point P1 is represented by R.

Under such conditions, the input apparatus 1 is considered to be rotationally moving with the intersection K as the instant center, and thus the distance between the instant center K and the point P1 can be considered as the radius gyration R. Moreover, a plane including the acceleration vectors a1 and a2 can be considered as the virtual plane D described above.

Based on a similarity relationship of a triangle within the virtual plane D, $(|a1|/R)=(|a2|/(R-L))$ is established, with the result that the radius gyration R can be calculated from $R=L/(1-(|a2|/|a1|))$. Further, since the angular acceleration of the rotation about the instant center K is $\Delta\omega=|a1|/R$ or $\Delta\omega=|a2|/(R-L)$, the angular acceleration $\Delta\omega$ can also be obtained. If the angular acceleration $\Delta\omega$ is obtained, the angular velocity w can be obtained by integrating it. Therefore, a velocity value $V_{P1}$ at the point P1 can be obtained from Equation (1) above.

The calculation above has been performed assuming that the instant center K is on the extended line of P1 and P2.

When the user actually operates the input apparatus 1, the position of the instant center K is not always on the extended line. However, since the two acceleration sensors are disposed at positions apart by a predetermined distance in practically the direction along the extended line from the arm in a state where the user is holding the input apparatus as described above, an error falls within an allowable range and is thus not a problem in this embodiment from a practical viewpoint.

When an acceleration sensor for detecting an acceleration in a third direction that is different from the first direction and orthogonal to the second direction is used, even when the instant center is not on the extended line of the acceleration sensor, a more accurate velocity value can be obtained by calculating a combined vector.

In calculating the velocity value of the input apparatus 1, the radius gyration may be the distance (R-L) between the instant center K and the point P2 instead of the distance R. In this case, a velocity value $V_{P2}$ at the point P2 is calculated. Either one of the velocity values $V_{P1}$ and $V_{p2}$ may be used as the velocity value of the input apparatus 1 for determining the movement of the pointer 2. Alternatively, a mean value of the velocity values $V_{P1}$ and $V_{p2}$ or a larger (or smaller) one of the values may be used, or a velocity value calculated based on an operational value of the velocity values $V_{P1}$ and $V_{p2}$ may be used.

The operation of the control system 100 that uses the velocity value calculation method described above will be described while referring to FIG. 11. In FIG. 11, a description will be given on a case where Equation (4) above, for example, is used.

Power of the input apparatus 1 is turned on. For example, the user turns on a power supply switch or the like provided to the input apparatus 1 or the control apparatus 40 to turn on the power of the input apparatus 1.

Figure 13:
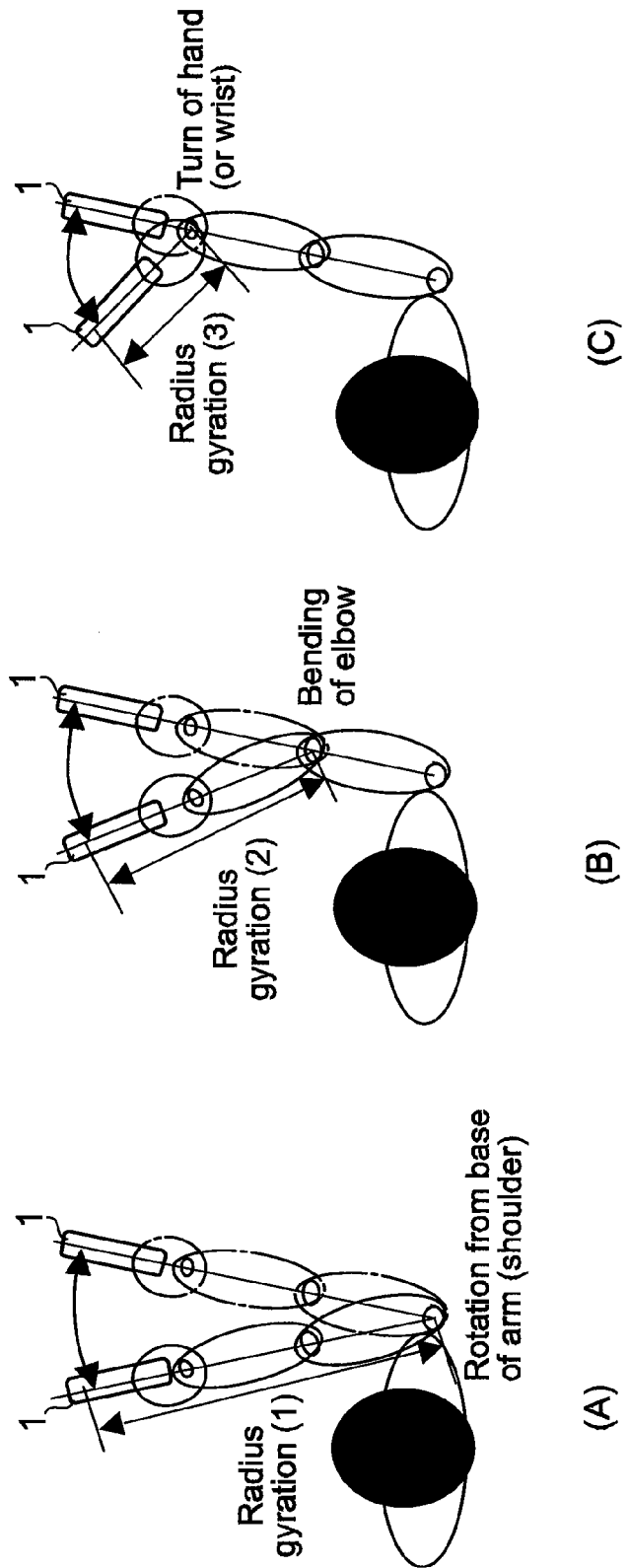
FIG. 13 Diagrams for illustrating the operations of the user shown in FIG. 12 in more detail.

Here, as shown in FIGS. 12 and 13, the user uses at least one of the rotations of a shoulder, an elbow, a hand, and the like to move the input apparatus 1. The rotational movement of the input apparatus 1 at one instant is obtained by combining the rotational movements of a shoulder, an elbow, a hand, and the like as described above. The position of the center axis of the thus-combined rotation changes with time, and the radius gyration R also changes with time. Descriptions below are given on an operation at that instant.

When the user moves the input apparatus 1 as described above, biaxial angular velocity signals are output from the angular velocity sensor unit 15. The MPU 19 obtains a first angular velocity value $\omega_\psi$ and a second angular velocity value $\omega_\theta$ from the biaxial angular velocity signals (Step 101).

Upon turning on the power of the input apparatus, biaxial acceleration signals are output from the acceleration sensor unit 16. The MPU 19 obtains a first acceleration value $a_x$ and a second acceleration value $a_y$ from the biaxial acceleration signals (Step 102). The acceleration signals are signals corresponding to the position of the input apparatus 1 at a point when the power is turned on.

The MPU 19 typically carries out Steps 101 and 102 in sync.

By differentiating the angular velocity values ($\omega_\psi$, $\omega_\theta$) obtained in Step 101, the MPU 19 calculates angular acceleration values ($\Delta\omega_\psi$, $\Delta\omega_\theta$) as angle-related values (Step 103). A differentiation filter or a highpass filter, for example, is used for the differentiation operation.

The MPU 19 uses the acceleration values ($a_x$, $a_y$) obtained in Step 102 and the angular acceleration values ($\Delta\omega_\psi$, $\Delta\omega_\theta$) to calculate radius gyrations ($R_\psi(t)$, $R_\theta(t)$) about the Y' axis and the X' axis, respectively, that is, the instant center using Equations (4) and (4') (Step 104).

$$R_\psi(t) = a_x / \Delta\omega_\psi \quad (4)$$

$$R_\theta(t) = a_y / \Delta\omega_\theta \quad (4')$$

Upon calculating the radius gyrations, the MPU 19 calculates the velocity values ($V_x$, $V_y$) using Equations (1) and (1') (Step 105).

$$V_x = R_\psi(t) * \omega_\psi \quad (1)$$

$$V_y = R_\theta(t) * \omega_\theta \quad (1')$$

The angular velocity values ($\omega_\psi$, $\omega_\theta$) used herein are typically angular velocity values ($\omega_\psi$, $\omega_\theta$) that have been subjected to the differentiation operation in Step 103. However, the angular velocity values $\omega_\psi$ and $\omega_\theta$ used in Step 105 may be an angular velocity value obtained by the MPU 19, that is temporally close to the angular velocity value that has been subjected to the differentiation operation.

Thus, because the rotational amounts of the rotational parts of the user's body obtained when the user is operating the input apparatus 1 are converted into linear velocity values in the X- and Y-axis directions, it becomes possible to obtain satisfactory linear velocity values that correspond to the actual operational amount of the user. As a result, the obtained velocity values match the intuition of the user.

The MPU 19 only needs to obtain ($a_x$, $a_y$) from the acceleration sensor unit 16 every predetermined clocks, and calculate the velocity values ($V_x$, $V_y$) in sync therewith, for example. Alternatively, the MPU 19 may calculate the velocity values ($V_x$, $V_y$) once every time a plurality of acceleration values ($a_x$, $a_y$) are sampled.

The MPU 19 transmits the calculated velocity values ($V_x$, $V_y$) to the control apparatus 40 via the transmitting device 21 (Step 106).

The MPU 35 of the control apparatus 40 receives information on the velocity values ($V_x$, $V_y$) (Step 107). The input apparatus 1 outputs the velocity values ($V_x$, $V_y$) every predetermined clocks, that is, per unit time, so the control apparatus 40 can receive this and obtain displacement amounts in the X- and Y-axis directions per unit time. The MPU 35 generates coordinate values (X(t), Y(t)) of the pointer 2 on the screen 3 that correspond to the obtained displacement amounts in the X- and Y-axis directions per unit time, using Equations (6) and (7) below (Step 108). Based on the generated coordinate values, the MPU 35 controls display so that the pointer 2 moves on the screen 3 (Step 109) (coordinate information generation means).

$$X(t) = X(t-1) + V_x \quad (6)$$

$$Y(t) = Y(t-1) + V_y \quad (7)$$

As described above, the input apparatus 1 according to this embodiment calculates the velocity values ($V_x$, $V_y$) based on the acceleration values and the angular velocity values. Typically, the input apparatus 1 calculates the radius gyrations ($R_\psi(t)$, $R_\theta(t)$) about the center axis C shown in FIG. 14 or the instant center K shown in FIG. 15, and calculates the velocity values ($V_x$, $V_y$) based on the radius gyrations R(t). Because the velocity values are thus calculated based on the radius gyrations, the input apparatus 1 of this embodiment can calculate accurate linear velocities (at the sensor arrangement portion) of the input apparatus 1. Furthermore, since the input apparatus 1 does not carry out the integration operation, an integration error is not caused. Accordingly, the movement of the pointer 2 that moves on the screen 3 in accordance with the displacements corresponding to the velocity values becomes a natural movement that matches the sense of the user.

A pitot tube as a velocity sensor may be used in the input apparatus 1, but since the pitot tube is unfit for the input apparatus 1, the acceleration sensor unit 16 is used.

In FIG. 11, the input apparatus 1 has carried out the main operations to calculate the velocity values ($V_x$, $V_y$). In an embodiment shown in FIG. 17, the control apparatus 40 carries out the main operations.

The input apparatus 1 transmits the biaxial acceleration values and the biaxial angular velocity values output from the sensor unit 17 to the control apparatus 40 as input information, for example (Step 203). The MPU 35 of the control apparatus 40 receives the input information (Step 204) and carries out processes the same as that of Steps 103 to 105, 108, and 109 (Steps 205 to 209).

Figure 9:
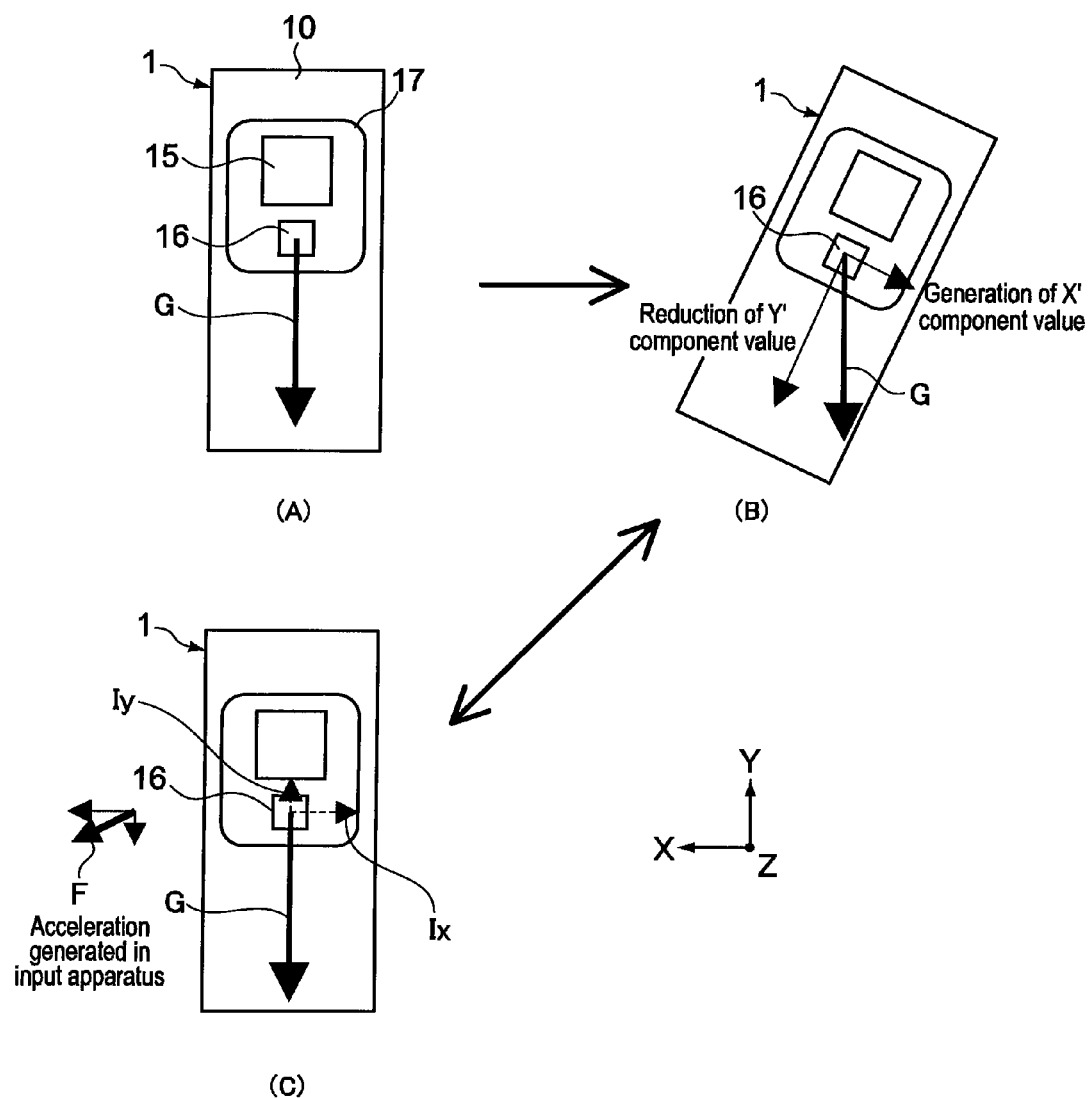
FIG. 9 Diagrams for illustrating a gravitational effect with respect to an acceleration sensor unit.
Figure 10:
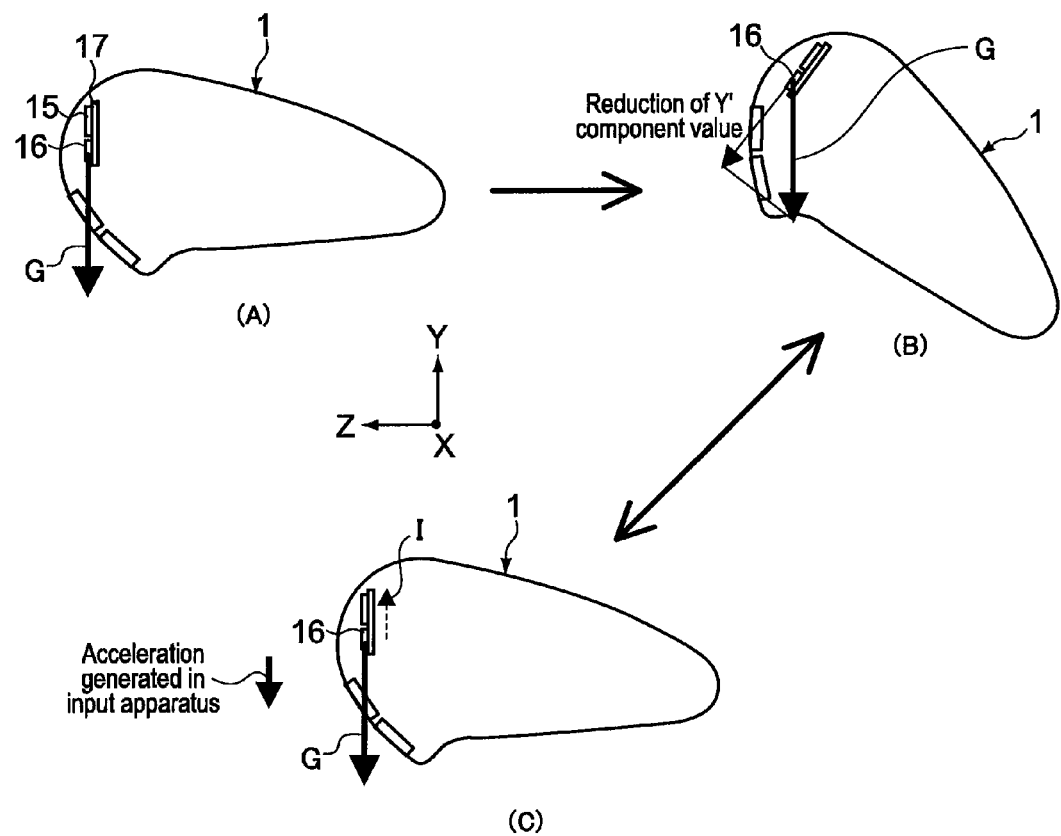
FIG. 10 Other diagrams for illustrating the gravitational effect with respect to the acceleration sensor unit.

Next, a description will be given on a gravitational effect with respect to the acceleration sensor unit 16. FIGS. 9 and 10 are explanatory diagrams therefor. FIG. 9 are diagrams showing the input apparatus 1 seen from the Z direction. FIG. 10 are diagrams showing the input apparatus 1 seen from the X direction.

In FIG. 9A, the input apparatus 1 is in the reference position and is held still. At this time, an output of the acceleration sensor 161 is substantially 0, and an output of the acceleration sensor 162 is an output corresponding to a gravity acceleration G. However, as shown in FIG. 9B, for example, in a state where the input apparatus 1 is tilted in the roll direction, the acceleration sensors 161 and 162 respectively detect acceleration values of tilt components of the gravity acceleration G.

In this case, the acceleration sensor 161 detects an acceleration in the X-axis direction even when the input apparatus 1 is not actually moved in the X-axis direction in particular. The state shown in FIG. 9B is equivalent to a state where, when the input apparatus 1 is in the reference position as shown in FIG. 9C, the acceleration sensor unit 16 has received inertial forces Ix and Iy as respectively indicated by arrows with broken lines, thus being undistinguishable by the acceleration sensor unit 16. As a result, the acceleration sensor unit 16 judges that an acceleration in a downward left-hand direction as indicated by an arrow F is applied to the input apparatus 1 and outputs a detection signal different from the actual movement of the input apparatus 1. In addition, because the gravity acceleration G constantly acts on the acceleration sensor unit 16, an integration value is increased and an amount by which the pointer 2 is displaced in the downward oblique direction is increased exponentially. When the state is shifted from that shown in FIG. 9A to that shown in FIG. 9B, it is considered that inhibition of the movement of the pointer 2 on the screen 3 is an operation that intrinsically matches the intuition of the user.

The same holds true also when the input apparatus 1 is rotated in the pitch direction from the reference position as shown in FIG. 10A to tilt as shown in FIG. 10B, for example. In such a case, because the gravity acceleration G detected by the acceleration sensor 162 at the time the input apparatus 1 is in the reference position decreases, it is difficult for the input apparatus 1 to make a distinguishment from the inertial force I in the Y-axis direction as shown in FIG. 10C.

Figure 18:
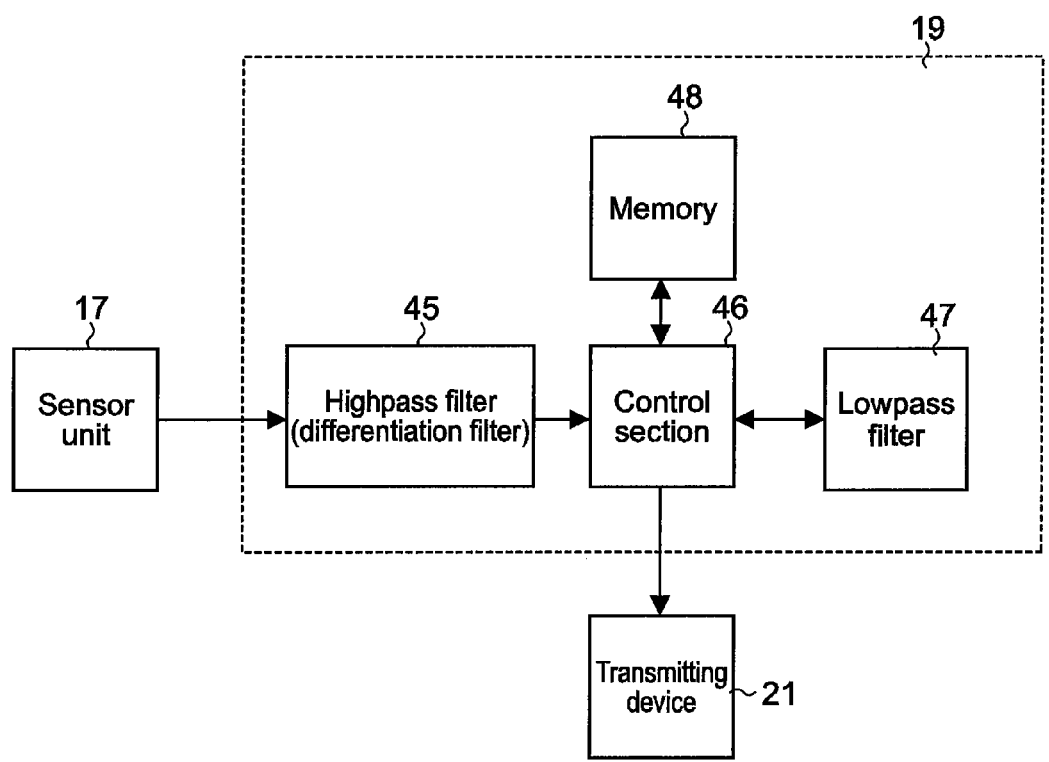
FIG. 18 A functional block diagram of the input apparatus for realizing an operation shown in FIG. 19.
Figure 19:
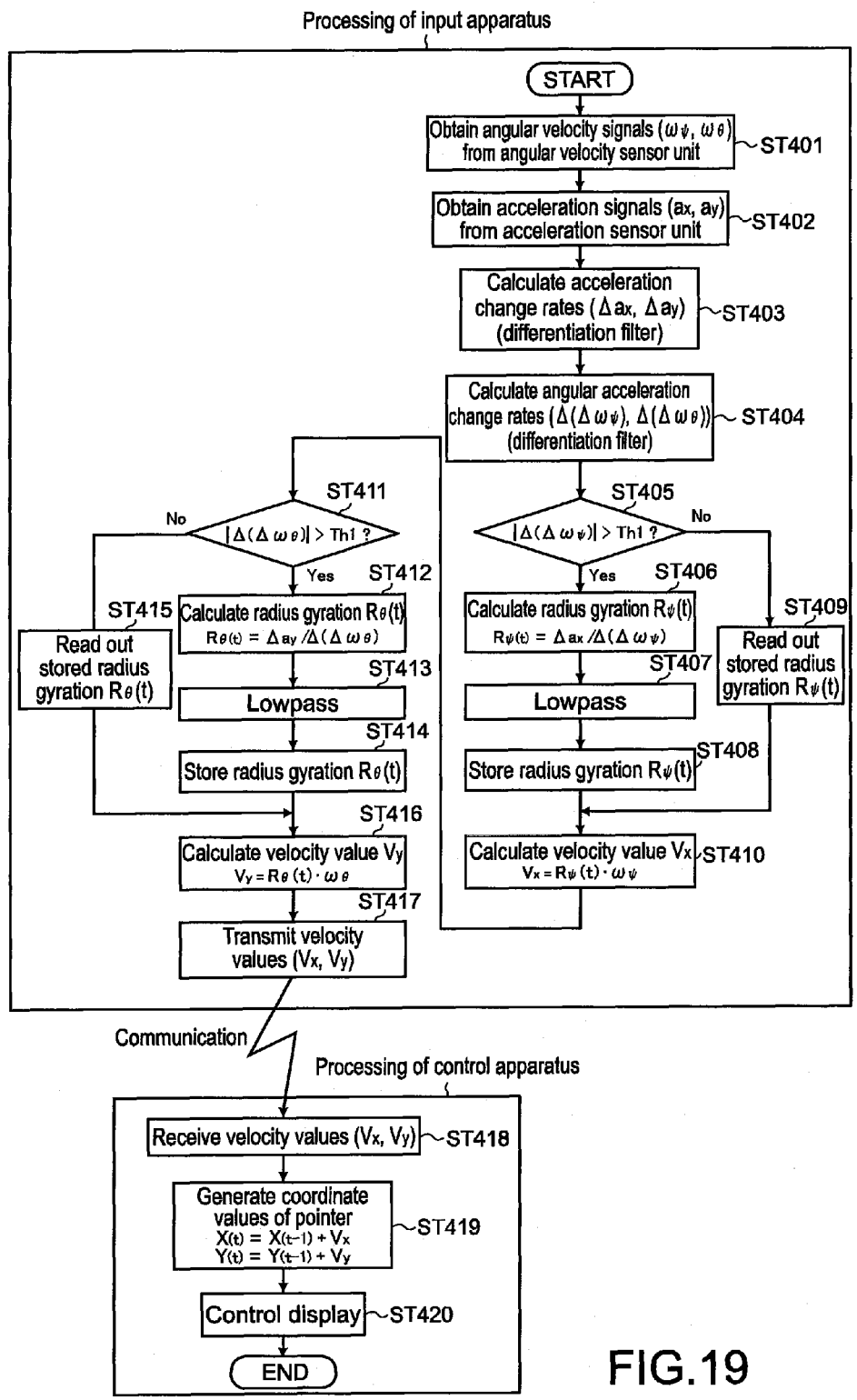
FIG. 19 A flowchart showing an operation of the control system according to another embodiment.

To reduce such a gravitational effect with respect to the acceleration sensor unit 16 as much as possible and reduce the inertial components caused by the accelerations generated when the input apparatus 1 is moved by the user (hereinafter, referred to as movement inertial component), the control system 100 executes processing as shown in FIG. 19. FIG. 19 describes an example that uses Equation (5). FIG. 18 is a functional block diagram of the input apparatus 1 for realizing the operation of the control system 100.

As shown in FIG. 18, a highpass filter 45 causes high-frequency detection signals to pass therethrough among the detection signals from the sensor unit 17, and attenuates low-frequency detection signals. As the highpass filter 45, any filter may be used as long as it has a highpass property. However, a differentiation filter is typically used. In descriptions below, the highpass filter 45 will be described as being the differentiation filter 45.

A lowpass filter 47 causes low-frequency signals as predetermined frequency components to pass therethrough among the signals subjected to an operation by a control section 46, and attenuates high-frequency signals. Further, a memory (storage means) 48 is a volatile or nonvolatile memory necessary for the various types of operational processing of the control section 46. The highpass filter 45, the control section 46, the lowpass filter 47, and the memory 48 are functions of the MPU 19, for example. Those functions may be realized by a DSP (Digital Signal Processor), an FPGA (Field Programmable Gate Array), and the like instead of the MPU 19.

When the power of the input apparatus 1 is turned on, the MPU 19 obtains the angular velocity values ($\omega_\psi$, $\omega_\theta$) (Step 401) and the acceleration values ($a_x$, $a_y$) (Step 402).

The MPU 19 of the input apparatus 1 obtains the acceleration signals ($a_x$, $a_y$) from the acceleration sensor unit 16 every predetermined number of clocks and causes the signals to pass through the differentiation filter 45, to thus differentiate the acceleration signals. Acceleration change rates ($\Delta a_x$, $\Delta a_y$) are calculated by the differentiation operation (Step 403).

Step 403 is executed for reducing the gravitational effect as will be described later, that is, for removing, from the acceleration values, signals of a certain value or signals of low-frequency components that are gravity acceleration component signals in the X'- and Y'-axis directions, and for using Equation (5). Similarly, by obtaining the angular velocity signals ($\omega_\psi$, $\omega_\theta$) supplied from the angular velocity sensor unit 15 every predetermined number of clocks and causing the signals to pass through the differentiation filter 45, the MPU 19 carries out a second-order differentiation operation to thus calculate angular acceleration time change rates ($\Delta(\Delta\omega_\psi)$, $\Delta(\Delta\omega_\theta)$) (Step 404).

A reason for calculating the angular acceleration change rates ($\Delta(\Delta_\psi)$, $\Delta(\Delta\omega_\theta)$) is to obtain the radius gyrations ($R_\psi(t)$, $R_\theta(t)$) in Steps 406 and 412 as in the above embodiment.

The acceleration change rates ($\Delta a_x$, $\Delta a_{ay}$) are calculated in Step 403 for the following two reasons as described above. One is to obtain the radius gyrations ($R_\psi(t)$, $R_\theta(t)$) in Steps 406 and 412 as in the above embodiment.

Second is to suppress the gravitational effect on the acceleration sensor unit 16 as described with reference to FIGS. 9 and 10. Therefore, when the user operates the input apparatus 1 in the yaw direction or the pitch direction, the acceleration values output by the acceleration sensor unit 16 become values obtained by respectively combining the gravity acceleration component values (hereinafter, referred to as acceleration values of tilt components) in the X- and Y-axis directions and an acceleration value of the inertial force I generated when the user applies a force to the input apparatus 1.

Figure 20:
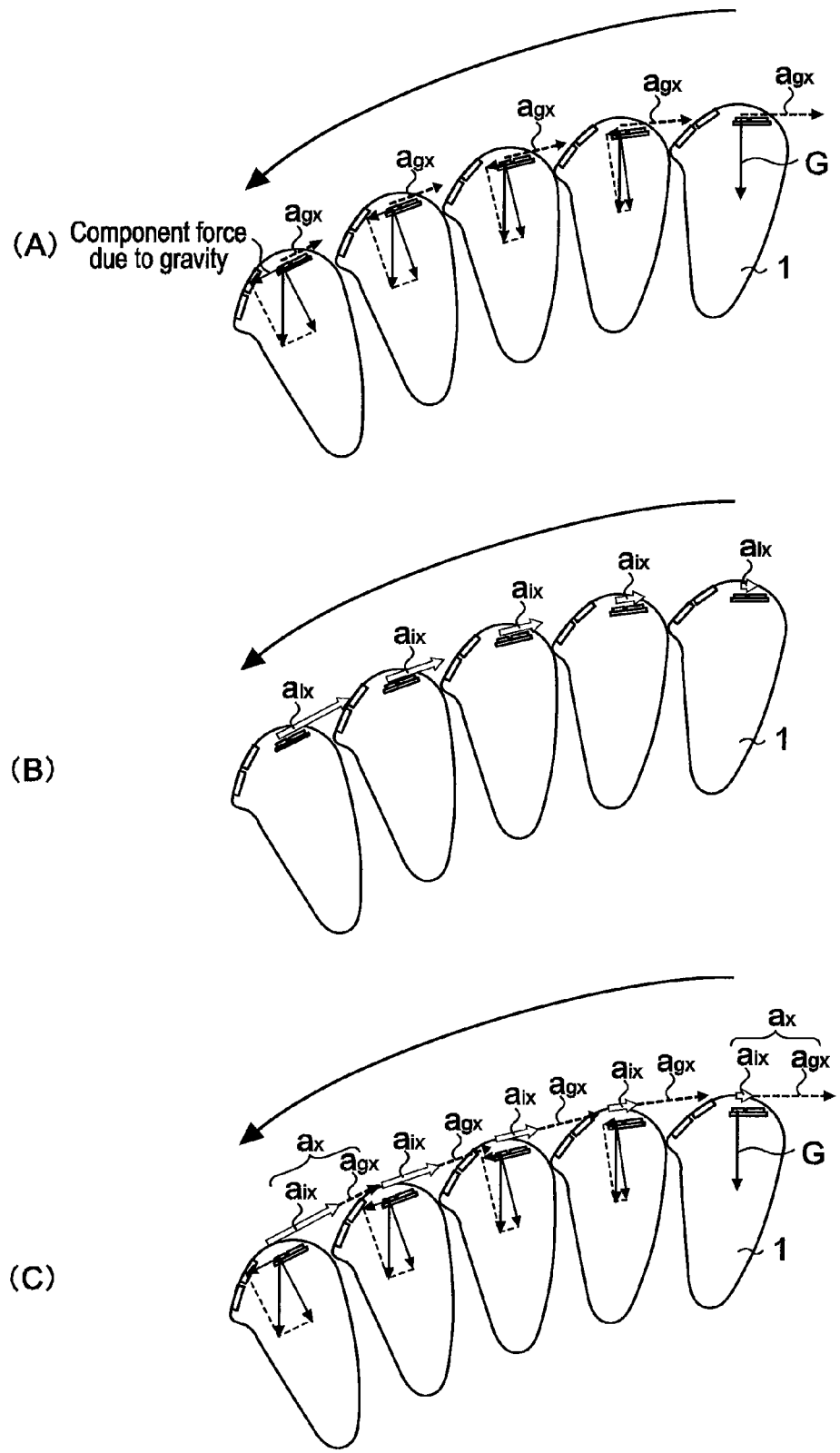
FIG. 20 Diagrams showing relationships among operations of the input apparatus and acceleration values thereof in a case where the user operates the input apparatus in a pitch direction.

FIG. 20 are explanatory diagrams therefor and are diagrams showing relationships among the operations of the input apparatus 1 and acceleration values thereof in a case where the user operates the input apparatus 1 in the pitch direction. It should be noted that the user is operating the input apparatus 1 in the pitch direction by swinging down the arm from the raised position.

FIG. 20A is a diagram comparing a relationship between the tilt of the input apparatus 1 and an acceleration value $a_{gx}$ of a tilt component without taking into account an acceleration value $a_{ix}$ of the inertial force I caused when the input apparatus 1 is operated by the user. FIG. 20B is a diagram showing the acceleration value $a_{ix}$ of the inertial force I of the input apparatus 1 that is generated when the user swings down the arm, without taking into account the acceleration value $a_{gx}$ of the tilt component. Further, FIG. 20C is a diagram showing a relationship among the acceleration value $a_x$ output from the input apparatus 1, the acceleration value $a_{gx}$ of the tilt component, and the acceleration value $a_{ix}$ of the inertial force I.

Here, comparing FIGS. 20A and 20B, a rate by which the acceleration value $a_{gx}$ of the tilt component changes is smaller than a rate by which the acceleration value $a_{ix}$ of the inertial force I changes. In actuality, a change rate of the acceleration value $a_{gx}$ of the tilt component is about 1/10 as that of the acceleration value $a_{ix}$ of the inertial force I in many cases. The same holds true also when the user operates the input apparatus 1 in the yaw direction.

In view of the above, it can be seen that signals of the acceleration value $a_{gx}$ of the tilt component of the input apparatus 1 and the acceleration value $a_{ix}$ of the inertial force I of the input apparatus 1 have different frequency components.

For splitting the acceleration values having different frequency components to thus reduce the gravitational effect, the MPU 19 differentiates the acceleration signals from the acceleration sensors to thus calculate the acceleration change rates ($\Delta a_x$, $\Delta a_y$).

Specifically, the signals of the acceleration values having different frequency components are passed through the differentiation filter in Step 403 to thus end up as signals of acceleration change rates. The differentiation filter has a highpass property, so a signal of an acceleration value having a larger frequency than a cutoff frequency, that is, the signal of the acceleration value $a_{ix}$ of the inertial force I passes through the differentiation filter. On the other hand, an acceleration signal having a smaller frequency than the cutoff frequency, that is, the signal of the acceleration value $a_{gx}$ of the tilt component is attenuated. Thus, the effect of the low-frequency component containing at least the gravity acceleration component value on the acceleration sensor unit 16 is suppressed.

As a result, the acceleration value $a_{gx}$ of the tilt component caused by the positional change of the input apparatus 1 is not reflected when calculating the radius gyrations ($R_\psi(t)$, $R_\theta(t)$). Therefore, the velocity values that are calculated based on the radius gyrations ($R_\psi(t)$, $R_\theta(t)$) are also unaffected by the acceleration value a of the tilt component caused by the positional change of the input apparatus 1. Accordingly, the gravitational effect due to the positional change of the input apparatus 1 is suppressed.

It should be noted that the cutoff frequency is set as appropriate while taking into account the frequency of the acceleration value $a_{gx}$ of the tilt component of the input apparatus 1 and the frequency of the acceleration value $a_{ix}$ of the inertial force I of the input apparatus 1. Moreover, it is also possible to set the cutoff frequency while taking into account the low-frequency component or a DC offset value due to a temperature drift of the acceleration sensor unit 16. In other words, the low-frequency component containing at least the gravity acceleration component value may include, in addition to the gravity acceleration component value, a low-frequency component or a DC offset component due to the temperature drift, for example.

Upon calculating the angular acceleration change rates ($\Delta(\Delta\omega_\psi)$, $\Delta(\Delta\omega_\theta)$), the MPU 19 judges whether an absolute value of the angular acceleration change rate about the Y' axis $|\Delta(\Delta\omega_\psi)|$ exceeds a threshold value Th1 (Step 405).

The threshold-value judgment is thus carried out because the angular acceleration change rates ($\Delta(\Delta\omega_\psi)$, $\Delta(\Delta\omega_\theta)$) are calculated by subjecting the angular velocity values ($\omega_\psi$, $\omega_\theta$) to the second-order differentiation operation. In other words, when noises are caused in the angular velocity values ($\omega_\psi$, $\omega_\theta$), high-frequency noises are enlarged due to the second-order differentiation operation, and the angular acceleration change rates are thus calculated in the state where the high-frequency noises are enlarged. As a result, the radius gyrations ($R_\psi(t)$, $R_\theta(t)$) that are calculated based on the angular acceleration change rates and the velocity values ($V_x$, $V_y$) that are calculated based on the radius gyrations are affected by the noises, with the result that accurate radius gyrations and velocity values cannot be calculated. The effect of noises on the signals of the radius gyrations and velocity values relatively increases as an absolute value of the angular acceleration change rates ($|\Delta(\Delta\omega_\psi)|$, $|\Delta(\Delta\omega_\theta)|$) becomes smaller.

For reducing the effect of noises, the MPU 19 calculates, when the absolute value of the angular acceleration change rate ($\Delta(\Delta\omega_\psi)$) is larger than the threshold value Th1, the radius gyration based on the angular acceleration change rate (Step 406), and updates and stores the radius gyration in the memory 48 (Step 408). After that, the MPU 19 calculates the velocity value based on the radius gyration (Step 410).

On the other hand, when the absolute value of the angular acceleration change rate is equal to or smaller than the threshold value, that is, when the effect of noises is large, the velocity value is calculated based on the previously-stored radius gyration read out in Step 409 instead of the small angular acceleration change rate that is equal to or smaller than the threshold value. Accordingly, the effect of noises on the velocity values can be suppressed. Considering operational features of human beings, since the radius gyrations do not change sharply, this can be considered an effective means.

Further, the radius gyration signals ($R_\psi(t)$, $R_\theta(t)$) are passed through the lowpass filter 47 (Step 407). Accordingly, the effect of high-frequency noises can be additionally suppressed. Although the lowpass filter 47 causes a delay of signals, since the radius gyrations do not change sharply, the suppression of the effect of noises as described above is also an effective means.

Because high-frequency noises may be caused by the operation carried out in Step 404 as described above, the cutoff frequency of the lowpass filter 47 is set as appropriate to a frequency at which the noises are attenuated or removed. Moreover, the lowpass filter 47 is designed so that a response delay at a time when the radius gyration signals pass therethrough becomes minimum.

Similarly, the MPU 19 judges whether the absolute value of the angular acceleration change rate about the X' axis $|\Delta(\Delta\omega_\theta)|$ exceeds the threshold value Th1 (Step 411), and when exceeding the threshold value (YES in Step 411), calculates the radius gyration $R_\theta(t)$ about the X' axis using the angular acceleration change rate (Step 412). After being passed through the lowpass filter 47 (Step 413), the signal of the radius gyration $R_\theta(t)$ is stored in the memory 48 (Step 414). When equal to or smaller than the threshold value Th1 (NO in Step 411), the stored radius gyration $R_\theta(t)$ is read out from the memory 48 (Step 415), and the velocity value $V_y$ in the Y'-axis direction is calculated based on the radius gyration $R_\theta(t)$ (Step 416).

Although the same threshold value Th1 is used in both the yaw direction and the pitch direction in this embodiment, different threshold values may be used for those directions.

The descriptions have been given on the cases where Equation (4) is used in the processing shown in FIG. 11 and Equation (5) is used in the processing shown in FIG. 19. However, it is also possible to use Equations (2) or (3) above to calculate the radius gyrations. Therefore, a ratio of the displacement to the angle, a ratio of the velocity to the angular velocity, or a ratio of the acceleration to the angular acceleration may be calculated as the radius gyration.

Figure 21:
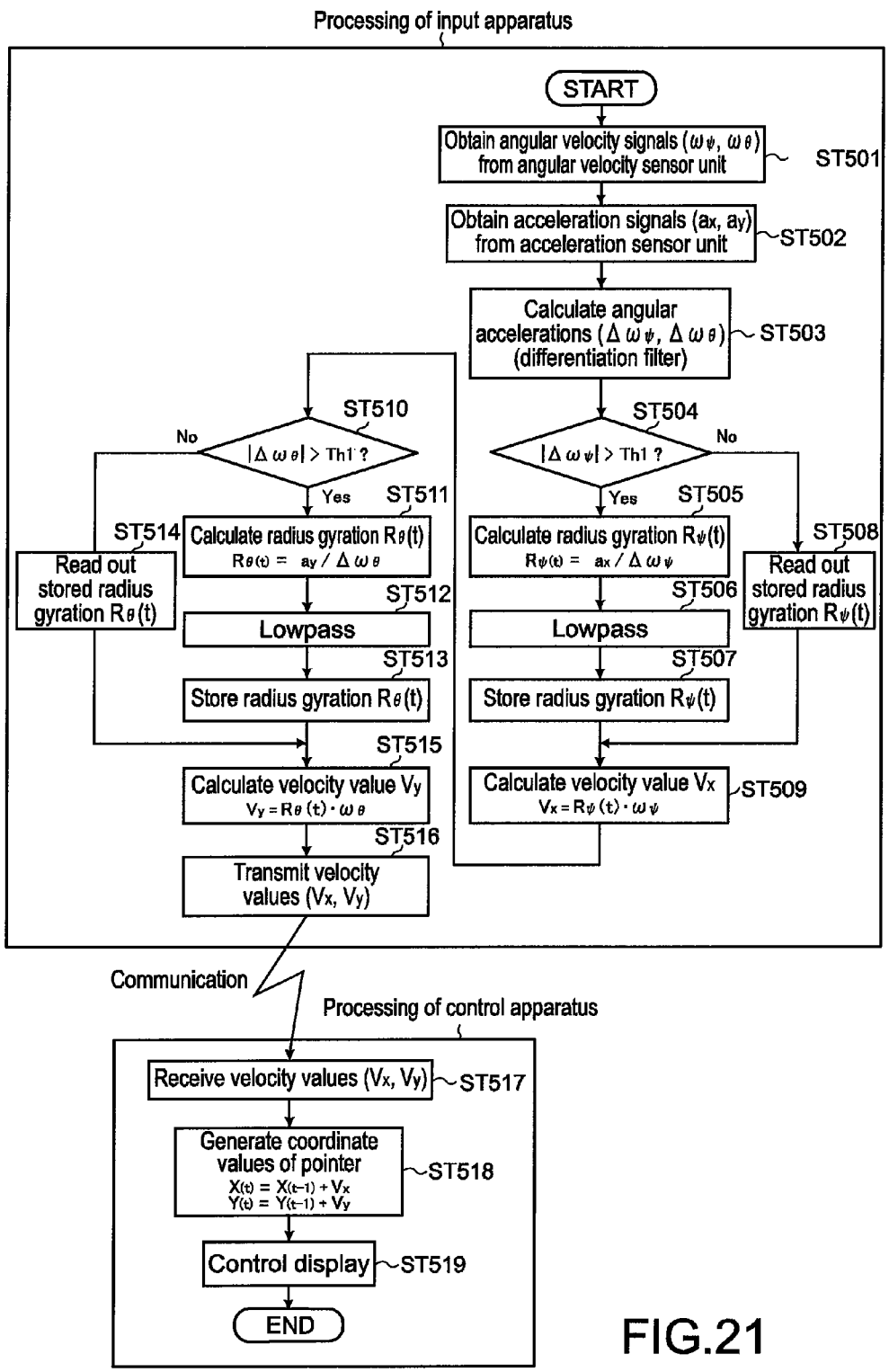
FIG. 21 A flowchart showing an operation of the control system according to still another embodiment.

FIG. 21 is a flowchart showing an operation of the control system 100 according to still another embodiment. This embodiment shows an example where Equation (4) is used and a threshold-value judgment is made on the angular acceleration values ($\Delta\omega_\psi$, $\Delta\omega_\theta$).

The MPU 19 differentiates the angular velocity values ($\omega_\psi$, $\omega_\theta$) from the angular velocity sensor unit 15 to thus calculate the angular acceleration values ($\Delta\omega_\psi$, $\Delta\omega_\theta$) (Step 503). In Steps 504 and 510, the threshold-value judgment is made on the angular acceleration values ($\Delta\omega_\psi$, $\Delta\omega_\theta$). When the absolute values of the angular acceleration values ($\Delta\omega_\psi$, $\Delta\omega_\theta$) are larger than the threshold value Th1, the MPU 19 calculates the radius gyrations ($R_\psi(t)$, $R_\theta(t)$) (Steps 505 and 511) and updates and stores the calculated radius gyrations ($R_\psi(t)$, $R_\theta(t)$) in the memory 48 (Steps 507 and 513). Then, the MPU 19 calculates the velocity values based on the stored radius gyrations (Steps 509 and 515).

On the other hand, when the absolute values of the angular acceleration values ($\Delta\omega_\psi$, $\Delta\omega_\theta$) are equal to or smaller than the threshold value Th1, that is, when the effect of noises is large, the velocity values are calculated based on the previously-stored radius gyrations read out in Steps 508 and 514 instead of the small angular acceleration values that are equal to or smaller than the threshold value Th1.

Because other details of FIG. 21 are the same as those of FIGS. 11 and 19, descriptions thereof will be omitted.

As shown in FIG. 21, when the radius gyrations ($R_\psi(t)$, $R_\theta(t)$) are calculated using the acceleration dimension, the radius gyrations can be calculated using the acceleration values ($a_x$, $a_y$) output from the acceleration sensor unit 16 as they are. The angular acceleration values ($\Delta\omega_\psi$, $\Delta\omega_\theta$) can also be calculated by subjecting the angular velocity values ($\omega_\psi$, $\omega_\theta$) from the angular velocity sensor unit 15 to a first-order differentiation operation. Therefore, a calculation amount for calculating the radius gyrations can be reduced, and power consumption of the input apparatus 1 can eventually be reduced. The same holds true for the processing of FIG. 11.

Figure 17:
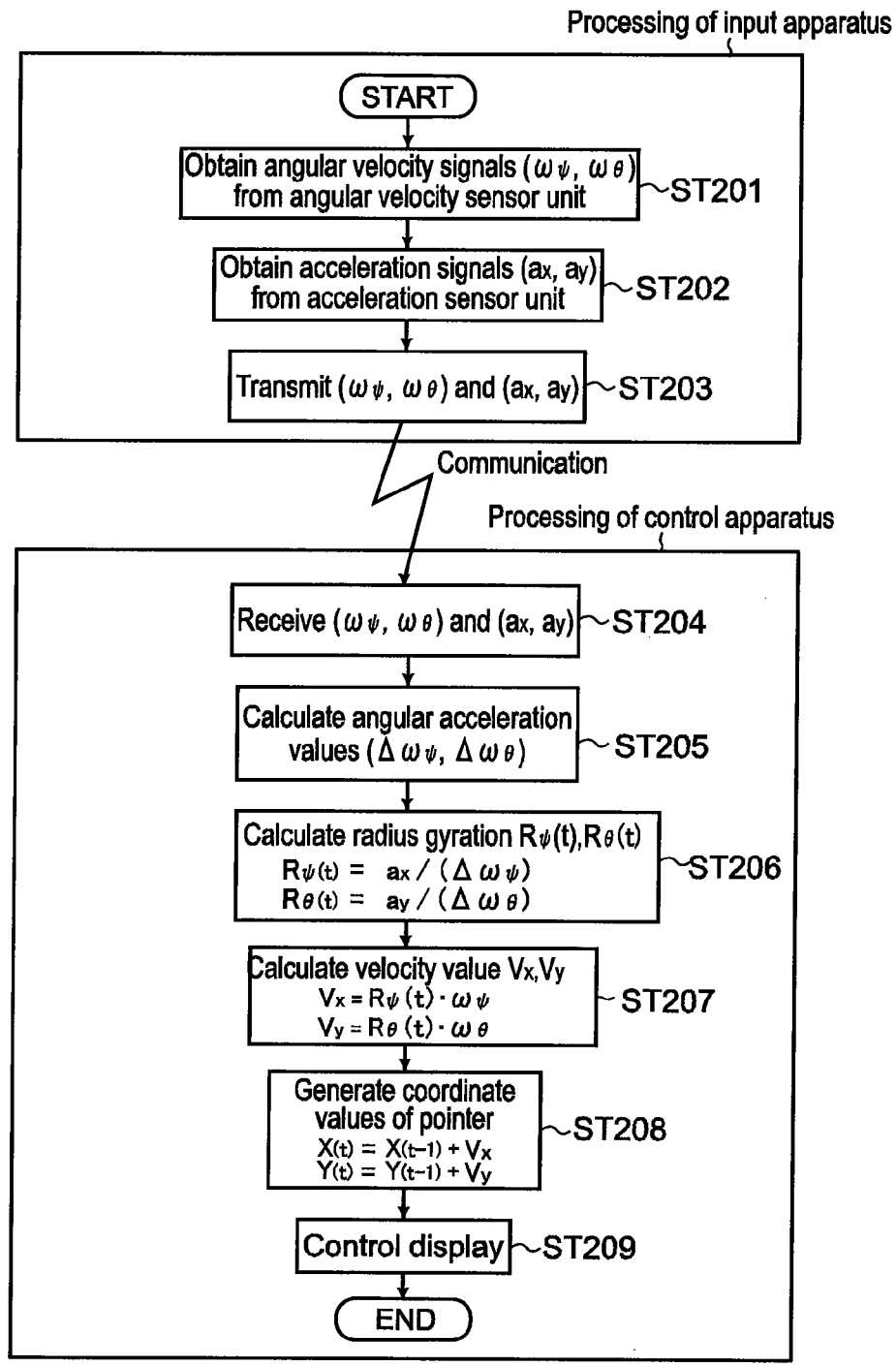
FIG. 17 A flowchart showing an operation corresponding to FIG. 11 in a case where a control apparatus carries out main operations.

For the same purpose as in the processing shown in FIG. 17, the processes of Steps 503 to 515 shown in FIG. 21 may be executed by the control apparatus 40.

FIG. 22 are graphs obtained by simulating velocity values calculated by the input apparatus 1 and actual velocities at the sensor arrangement portion of the input apparatus 1 under different conditions. In FIG. 22, solid lines each represent the velocity value calculated by the input apparatus 1, and broken lines each represent the actual velocity at the sensor arrangement portion of the input apparatus 1.

FIG. 22A is a diagram showing a simulation in a case where there is no effect of noises (hereinafter, simply referred to as noises) due to the differentiation operation in Step 404, for example, and no gravitational effect due to the tilt of the input apparatus 1. The radius gyrations ($R_\psi(t)$, $R_\theta(t)$) are ratios of the acceleration values to the angular acceleration values, and the threshold-value judgment on the angular velocities and the lowpass filter 47 have not been used.

As shown in FIG. 22A, when there are no noises and gravitational effect due to the tilt of the input apparatus 1, the graphs match. In other words, when there are no noises and gravitational effect, the input apparatus 1 can calculate the actual velocities of the input apparatus 1 as the velocity values.

FIG. 22B is a diagram showing a simulation in a case where there exists the effect of noises but no gravitational effect due to the tilt of the input apparatus 1. The radius gyrations ($R_\psi(t)$, $R_\theta(t)$) are ratios of the acceleration values to the angular acceleration values, and the threshold-value judgment on the angular accelerations and the lowpass filter 47 have not been used.

As shown in FIG. 22B, when noises are generated in the signals of the angular acceleration values, the velocity values calculated by the input apparatus 1 largely fluctuate. This is because, when the noises are generated in the angular accelerations, the radius gyrations ($R_\psi(t)$, $R_\theta(t)$) that are calculated based on the angular accelerations and the velocity values ($V_x$, $V_y$) that are calculated based on the radius gyrations are affected by the noises.

FIG. 22C is a diagram showing a simulation in a case where there exists the effect of noises but no gravitational effect due to the tilt of the input apparatus 1. The radius gyrations ($R_\psi(t)$, $R_\theta(t)$) are ratios of the acceleration values to the angular acceleration values, and the threshold-value judgment on the angular accelerations and the lowpass filter 47 have been used.

As shown in FIG. 22C, due to the threshold-value judgment and the lowpass filter, the effect of noises is suppressed to a negligible level.

It should be noted that the velocity values calculated by the input apparatus 1 are calculated later than the actual velocities of the input apparatus 1. This is because a response delay is caused when the radius gyration signals pass through the lowpass filter 47. For suppressing an effect of the delay, the lowpass filter 47 is designed so that the response delay becomes minimum at the time when the radius gyration signals pass therethrough.

FIG. 22D is a diagram showing a simulation in a case where both the effect of noises and the gravitational effect due to the tilt of the input apparatus 1 are caused. The radius gyrations ($R_\psi(t)$, $R_\theta(t)$) are ratios of the acceleration values to the angular acceleration values, and the threshold-value judgment on the angular accelerations and the lowpass filter 47 have been used.

A case where the acceleration sensor unit 16 receives the gravitational effect when the user operates the input apparatus 1 in the pitch direction by swinging down the arm from the raised position as in FIG. 20 is assumed.

When the user operates the input apparatus 1 by swinging down the arm from the raised position, the acceleration sensor unit 16 detects the acceleration value $a_{gx}$ of the tilt component in addition to the acceleration value $a_{ix}$ of the inertial force I. Because the acceleration value $a_{gx}$ of the tilt component is detected as an unnecessary acceleration, the velocity values calculated by the input apparatus 1 becomes larger than actual velocities. Therefore, as shown in FIG. 22D, the graph of the velocity values calculated by the input apparatus 1 shifts upward from the graph of the actual velocities.

On the other hand, when the user operates the input apparatus by swinging the arm upward from the lowered position, the graph of the velocity values calculated by the input apparatus 1 shifts downward from the graph of the actual velocities (not shown).

FIG. 22E is a graph showing a simulation in a case where both the effect of noises and the gravitational effect due to the tilt of the input apparatus 1 are caused. The radius gyrations ($R_\psi(t)$, $R_\theta(t)$) are ratios of the change rates of the acceleration values to the change rates of the angular acceleration values, and the threshold-value judgment on the angular accelerations and the lowpass filter 47 have been used. Moreover, a case where the user operates the input apparatus 1 in the pitch direction by swinging down the arm from the raised position has been assumed.

As shown in FIG. 22E, the graph of the velocity values calculated by the input apparatus 1 almost matches the graph of the actual velocities. This is because, by calculating the radius gyrations ($R_\psi(t)$, $R_\theta(t)$) as ratios of the change rates of the acceleration values to the change rates of the angular acceleration values, the signal of the acceleration value $a_{gx}$ of the tilt component detected as an unnecessary acceleration is attenuated by the differentiation filter 45.

Figure 23:
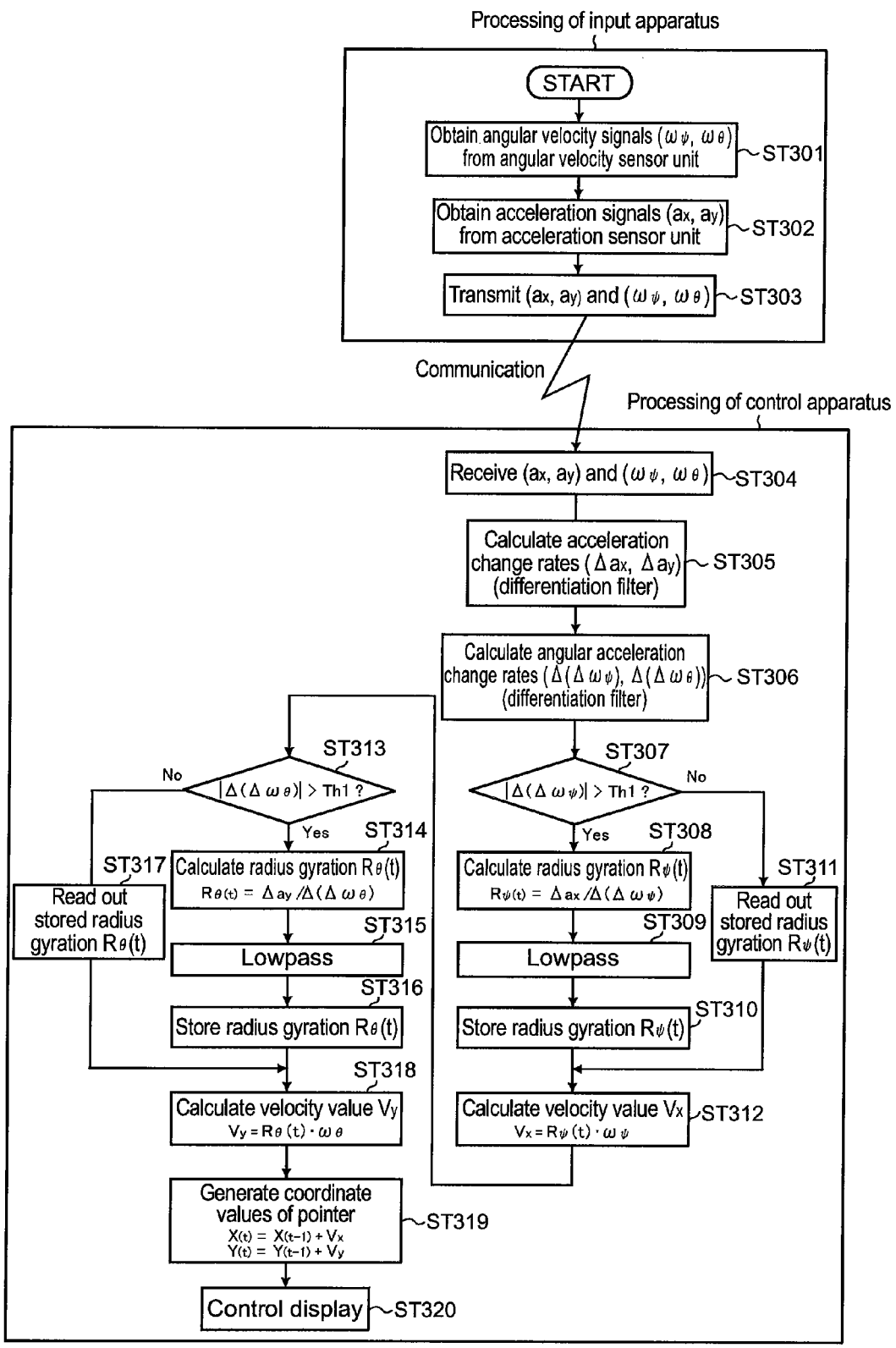
FIG. 23 A flowchart showing an operation of the control system in a case where the control apparatus carries out the main calculations in the whole processing of FIG. 19 as in the processing shown in FIG. 17.

FIG. 23 is a flowchart showing an operation of another embodiment described above. In processing shown in the flowchart, main operations in the whole processing of FIG. 19 are carried out by the control apparatus 40 as in the processing shown in FIG. 17. In other words, the input apparatus 1 transmits the biaxial acceleration signals and biaxial angular velocity signals output from the sensor unit 17 to the control apparatus 40 as input information. The MPU 35 of the control apparatus 40 executes Steps 403 to 416 shown in FIG. 19 in Steps 305 to 318. Since details are the same as those of FIG. 11, descriptions thereof will be omitted.

Next, still another embodiment of the present invention will be described.

In this embodiment, a tilt of a regression line is used to calculate the radius gyration. As described above, the radius gyration is a ratio of the acceleration change rate to the angular acceleration change rate. For calculating the ratio of the acceleration change rate to the angular acceleration change rate, this embodiment uses the tilt of the regression line.

Figure 24:
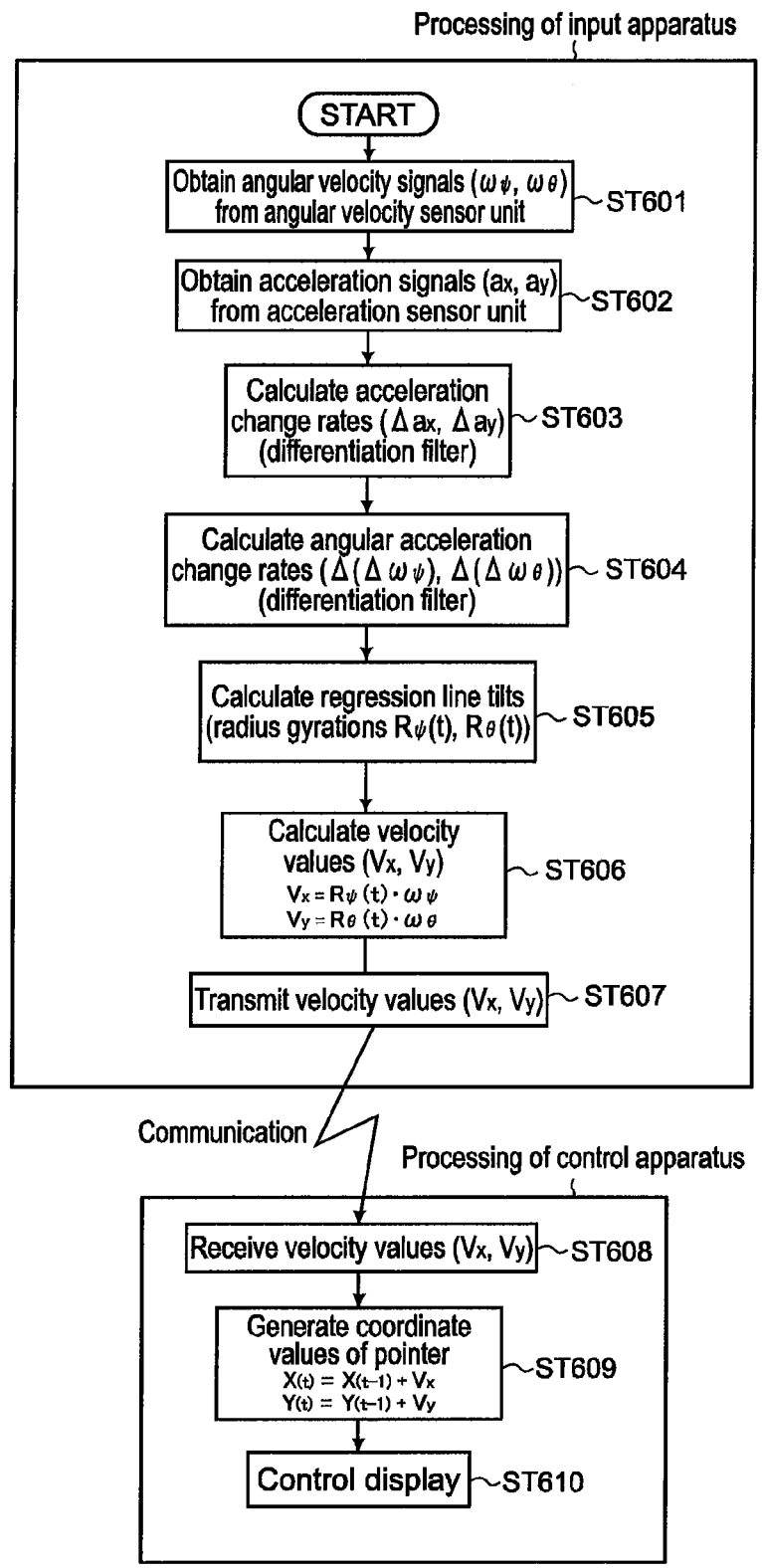
FIG. 24 A flowchart showing an operation of the control system in a case of using regression lines.

FIG. 24 is a flowchart showing an operation of the control system according to this embodiment. It should be noted that points different from those of the flowchart shown in FIG. 19 will mainly be described.

The MPU 19 subjects the acceleration values ($a_x$, $a_y$) and the angular velocity values ($\omega_\psi$, $\omega_\theta$) supplied respectively from the acceleration sensor unit 16 and the angular velocity sensor unit 15 every predetermined number of clocks to a first-order differentiation and second-order differentiation, to thus calculate the acceleration change rates ($\Delta a_x$, $\Delta a_y$) and the angular acceleration change rates ($\Delta(\Delta\omega_\psi)$, $\Delta(\Delta\omega_\theta)$) (Steps 601 to 604). A history of n pairs of acceleration change rates ($\Delta a_x$, $\Delta a_y$) and angular acceleration change rates ($\Delta(\Delta\omega_\psi)$, $\Delta(\Delta\omega_\theta)$) are stored in the memory 48, for example, and regression line tilts ($A_1$, $A_2$) are respectively calculated using Equations (8) and (9) below (Step 605). The regression line tilts are ratios of the acceleration change rates to the angular acceleration change rates, that is, the radius gyrations ($R_\psi(t)$, $R_\theta(t)$). It should be noted that as a reference, methods of calculating regression line segments ($B_1$, $B_2$) are respectively expressed by Equations (10) and (11).

$$A_1 = R_\theta(t) = [\{\Sigma(\Delta(\Delta\omega_{\theta j}))^2\} * \Sigma(\Delta a_{yj})^2\} - \{\Sigma\Delta(\Delta\omega_{\theta j}) * \Sigma\Delta(\Delta w_{\theta j}) * \Delta a_{yj}\}]/[n*\Sigma(\Delta(\Delta\omega_{\theta j}))^2 - \{\Sigma\Delta(\Delta\omega_{\theta j})\}^2] \quad (8)$$

$$A_2 = R_\psi(t) = [\{\Sigma(\Delta(\Delta\omega_{\psi j}))^2 * \Sigma(\Delta a_{xj})^2\} - \{\Sigma\Delta(\Delta\omega_{\psi j}) * \Sigma\Delta(\Delta\omega_{\psi j}) * \Delta a_{xj}\}]/[n*\Sigma(\Delta(\Delta\omega_{\psi j}))^2 - \{\Sigma\Delta(\Delta\omega_{\psi j})\}^2] \quad (9)$$

$$B_1 = [\{n*\Sigma\Delta(\Delta\omega_{\theta j}) * \Delta a_{yj}\} - \{\Sigma\Delta(\Delta\omega_{\theta j}) * \Sigma\Delta a_{yj}\}]/[n*\Sigma(\Delta(\Delta\omega_{\theta j}))^2 - \{\Sigma\Delta(\Delta\omega_{\theta j})\}^2] \quad (10)$$

$$B_2 = [\{n*\Sigma\Delta(\Delta\omega_{\psi j}) * \Delta a_{xj}\} - \{\Sigma\Delta(\Delta\omega_{\psi j}) * \Sigma\Delta a_{xj}\}]/[n*\Sigma(\Delta(\Delta\omega_{\psi j}))^2 - \{\Sigma\Delta(\Delta\omega_{\psi j})\}^2] \quad (11)$$

In Equations (8) to (11) above, n represents a sampling count of the acceleration change rates ($\Delta a_x$, $\Delta a_y$) and angular acceleration change rates ($\Delta(\Delta\omega)$, $\Delta(\Delta\omega_\theta)$). The sampling count n is set as appropriate so that operational errors are minimized.

Upon calculating the radius gyrations, the velocity values are calculated based on the radius gyrations, and display is controlled so that the pointer 2 moves on the screen 3 based on the displacement amounts corresponding to the velocity values (Steps 606 to 610). It should be noted that it is also possible to suppress the effect of high-frequency noises by subjecting the radius gyration signals or signals of the velocity values to the lowpass filter 47.

In this embodiment, by calculating the regression line tilts as the radius gyrations, more accurate radius gyrations and velocity values ($V_x$, $V_y$) can be calculated. Therefore, the movement of the pointer 2 displayed on the screen 3 can be made a more natural movement.

In the descriptions above, the method of calculating the regression line tilts in the dimension of the acceleration change rates has been described. However, the present invention is not limited thereto, and the regression line tilts may be calculated in the dimension of the displacements, velocities, and accelerations as in Equations (2), (3), and (4).

For the same purpose as in the processing shown in FIG. 17, the MPU 35 of the control apparatus 40 may execute Steps 603 to 606.

Next, descriptions will be given on the sensors necessary for deriving the radius gyration R(t), and a calculation method therefor.

FIG. 25 is a table showing several examples of combination patterns of the sensors. Typically, as the combination pattern of the sensors, 7 types of patterns are conceivable. Examples of the acceleration sensor in the following 7 types of patterns include a piezoresistive type, a piezoelectric type, a capacitance type, and a foam type that uses liquid heating, and examples of the angular velocity sensor (gyro sensor) include a vibration type, a rotary top type, a laser type, and a gas rate type.

[Pattern 1]

Pattern 1 is a pattern that uses a uniaxial acceleration sensor as means for detecting an acceleration and a uniaxial gyro sensor as means for obtaining an angular velocity. In this case, the movement of the input apparatus is converted only into a 1-dimensional movement of the pointer 2 on the screen 3. As an example where only the 1-dimensional movement is applied, there is a case where the movement of the pointer is restricted within a single dimension, or a volume adjustment using a GUI (not just volume adjustment but various level adjustments using a GUI), for example.

In Pattern 1, typically the acceleration sensor for the X'-axis direction and the gyro sensor about the Y' axis are used. Alternatively, the acceleration sensor for the Y'-axis direction and the gyro sensor about the X' axis are used.

Alternatively, an axis in the detection direction of the acceleration sensor and the axis of the gyro sensor do not need to be orthogonal, and it is also possible to obtain the acceleration component value and/or the angular velocity component value in mutually-orthogonal directions by an operation that uses a trigonometric function. The same holds true for Patterns 2 to 7 below.

[Pattern 2]

Pattern 2 is a typical example shown in FIG. 8 and a pattern that uses biaxial acceleration sensors as means for detecting accelerations and uses biaxial angular velocity sensors as means for obtaining angular velocities. Since Pattern 2 has been described in the above embodiments, descriptions thereof will be omitted.

[Pattern 3]

Pattern 3 is a pattern that uses a uniaxial acceleration sensor as means for detecting an acceleration and uses biaxial acceleration sensors as means for obtaining angular velocities. In this case, instead of using the gyro sensor, a uniaxial acceleration sensor out of the biaxial acceleration sensors that are used as the means for detecting angular velocities is used as the means for detecting an acceleration. Also in this case, only the movement of the input apparatus in the pitch direction is detected, and the movement of the input apparatus is converted only into the 1-dimensional movement of the pointer 2 on the screen 3 as in Pattern 1.

Figure 26:
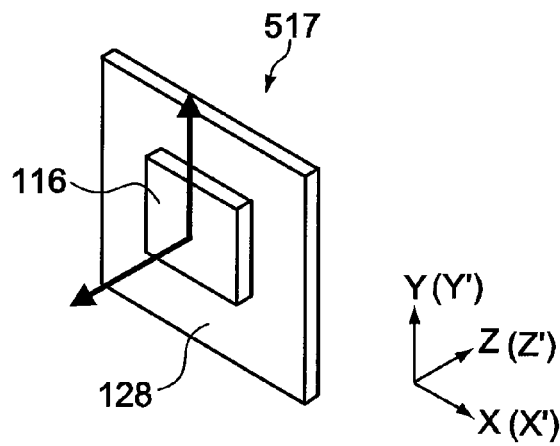
FIG. 26 A perspective diagram showing a sensor unit according to Pattern 3 of FIG. 25.
Figure 27:
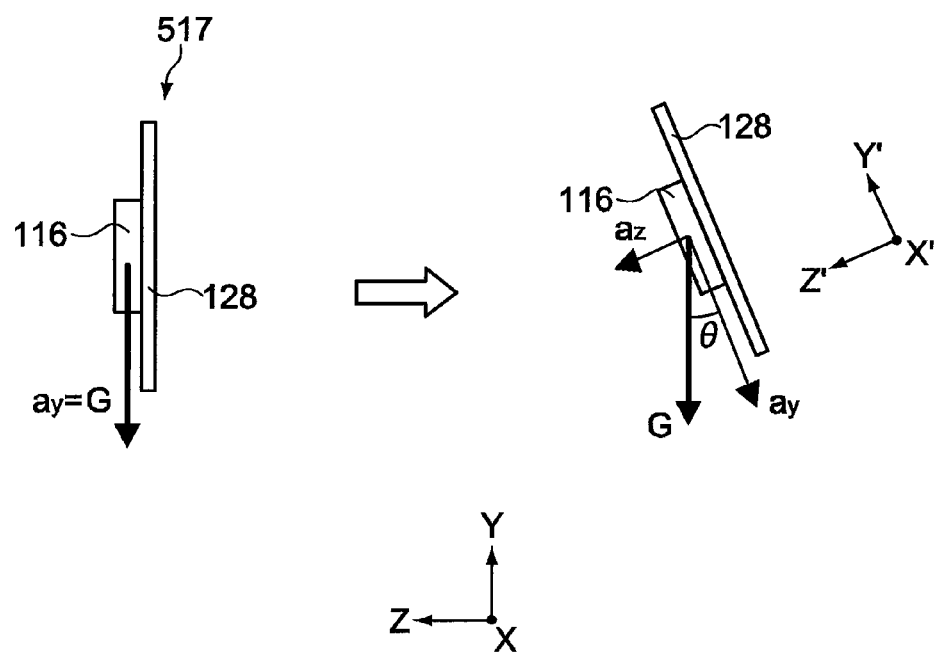
FIG. 27 A diagram showing a principle for calculating an angle about an X' axis (pitch angle θ) in Pattern 3.

FIG. 26 is a diagram showing a sensor unit according to Pattern 3. Biaxial acceleration sensors (acceleration sensor unit) 116 mounted on a circuit board 128 of a sensor unit 517 detect accelerations in the Z'- and Y'-axis directions. When the user tilts the input apparatus in the pitch direction from the reference position, gravity acceleration component values in the Z'- and Y'-axis directions are detected as shown in FIG. 27. Therefore, an angle about the X' axis (pitch angle θ) is obtained as the angle-related value using Equation (12).

$$\theta = \arctan(a_z/a_y) \qquad (12)$$

The MPU 19 can calculate the angular velocity value $\omega_\theta$ in the pitch direction by carrying out a first-order differentiation operation on the pitch angle θ. Therefore, the MPU 19 can calculate the velocity value $V_y$, in the Y-axis direction from the radius gyration $R_\theta(t)$ that is based on the acceleration value $a_y$ in the Y'-axis direction and the angular velocity value $\omega_\theta$ in the pitch direction.

As a merit of Pattern 3, because a hardware structure is simple, low costs can be realized. Since an absolute angle called pitch angle θ can be obtained, the problem that a low-frequency component or a DC offset due to a temperature drift is incorporated in the detection signal as in the case of detecting an angular velocity by the angular velocity sensor can be solved.

[Pattern 4]

Pattern 4 is a pattern that uses biaxial acceleration sensors as means for detecting accelerations and uses a uniaxial gyro sensor and the biaxial acceleration sensors as means for obtaining angular velocities.

Figure 28:
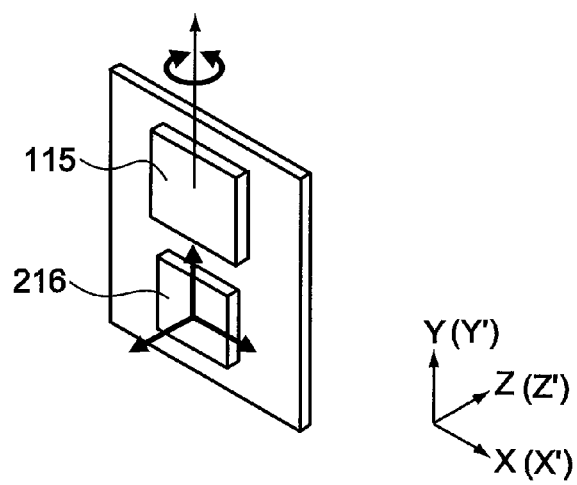
FIG. 28 A perspective diagram showing a sensor unit according to Pattern 4 of FIG. 25.

FIG. 28 is a diagram showing a sensor unit according to Pattern 4. A hardware structure of the sensor unit is constituted of triaxial acceleration sensors (acceleration sensor unit) 216 for the X'-, Y'-, and Z'-axis directions and a uniaxial gyro sensor 115 about the Y' axis.

The velocity value $V_x$ of the input apparatus in the X-axis direction is calculated from the radius gyration $R_\psi(t)$ that is based on the acceleration sensor in the X'-axis direction out of the triaxial acceleration sensors 216, and the gyro sensor 115. The velocity value $V_y$ of the input apparatus in the Y-axis direction is calculated similar to Pattern 3 using the acceleration sensors in the Y'- and Z'-axis directions out of the triaxial acceleration sensors 216.

As a merit of Pattern 4, due to the structure including inexpensive triaxial acceleration sensors 216 and uniaxial gyro sensor 115, low costs can be realized.

[Pattern 5]

Pattern 5 is a pattern that uses two coaxial acceleration sensors as means for detecting accelerations and uses two coaxial acceleration sensors also as means for obtaining angular velocities.

Figure 29:
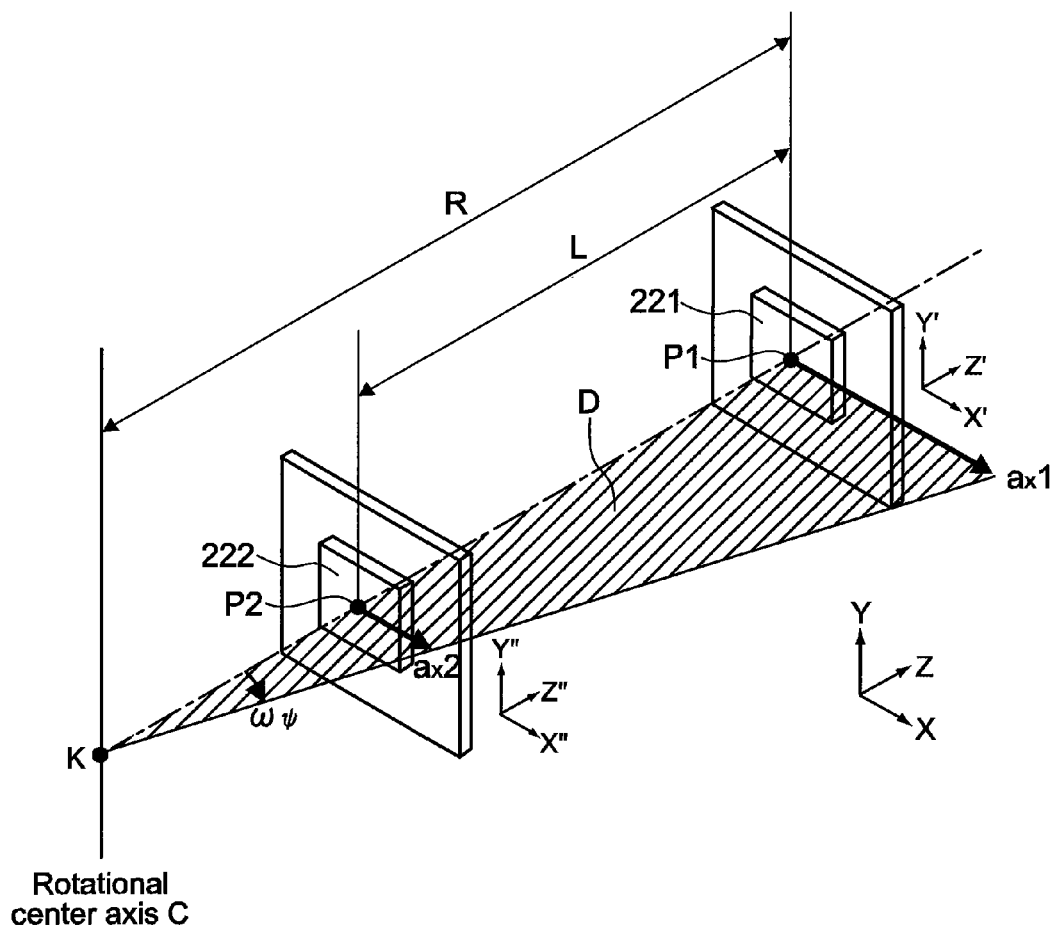
FIG. 29 A perspective diagram showing a sensor unit according to Pattern 5 of FIG. 25.

FIG. 29 is a diagram showing a sensor unit according to Pattern 5. For example, uniaxial acceleration sensors 221 and 222 for detecting accelerations in the X'-axis direction are provided. Here, for convenience, an orthogonal coordinate system fixed to the uniaxial acceleration sensor 222 is expressed using an X" axis, a Y" axis, and a Z" axis.

Directions of the X' axis and the X" axis are the same, directions of the Y' axis and the Y" axis are the same, and directions of the Z' axis and the Z" axis are the same.

The two uniaxial acceleration sensors 221 and 222 are apart by only a distance L and are disposed on the radius gyration $R_\psi(t)$ to be obtained. In this case, the movement of the input apparatus is converted only into the 1-dimensional movement (e.g., X-axis direction) of the pointer 2 on the screen 3. The detection axes of the uniaxial acceleration sensors 221 and 222 may be the Y' axis and the Y" axis, respectively.

In Pattern 5, the radius gyration R and the angular velocity value w are obtained by the principle described in FIG. 16. As described above, because $(|a_x1|/R) = (|a_x2|/(R-L))$ is established based on a similarity relationship of a triangle having the instant center K included in the virtual plane D as an apex, the radius gyration R can be calculated from $R = L/(1-(|a_x2|/|a_x1|))$. Further, since the angular acceleration $\Delta\omega_\psi$, in the yaw direction about the instant center K is $\Delta\omega_\psi = |a_x1|/R$ or $\Delta\omega_\psi = |a_x2|/(R-L)$, the angular acceleration $\Delta\omega_\psi$ can also be obtained. If the angular acceleration $\Delta\omega_\psi$ is obtained, the angular velocity w can be obtained by integrating it. Therefore, a velocity value at the point P1 can be calculated from Equation (1) above.

On the other hand, also by dividing a difference between the two accelerations by the distance L between the two uniaxial acceleration sensors, the angular acceleration value (angular acceleration value about the Y' axis) $\Delta\omega_\psi$, in the yaw direction can be obtained as the angle-related value. The MPU 19 can calculate the angular velocity value $\omega_\psi$ by integrating the angular acceleration value $\Delta\omega_\psi$. Further, the MPU 19 can calculate the angular acceleration change rate $\Delta(\Delta\omega_\psi)$ by differentiating the angular acceleration value $\Delta\omega_\psi$.

As a merit of Pattern 5, since $\omega_\psi$, $\Delta\omega_\psi$, and $\Delta(\Delta\omega_\psi)$ can be obtained based on the difference between the two acceleration values, the gravitational effect can be removed. Moreover, due to the structure including only the inexpensive uniaxial acceleration sensors 221 and 222, low costs can be realized.

Figure 30:
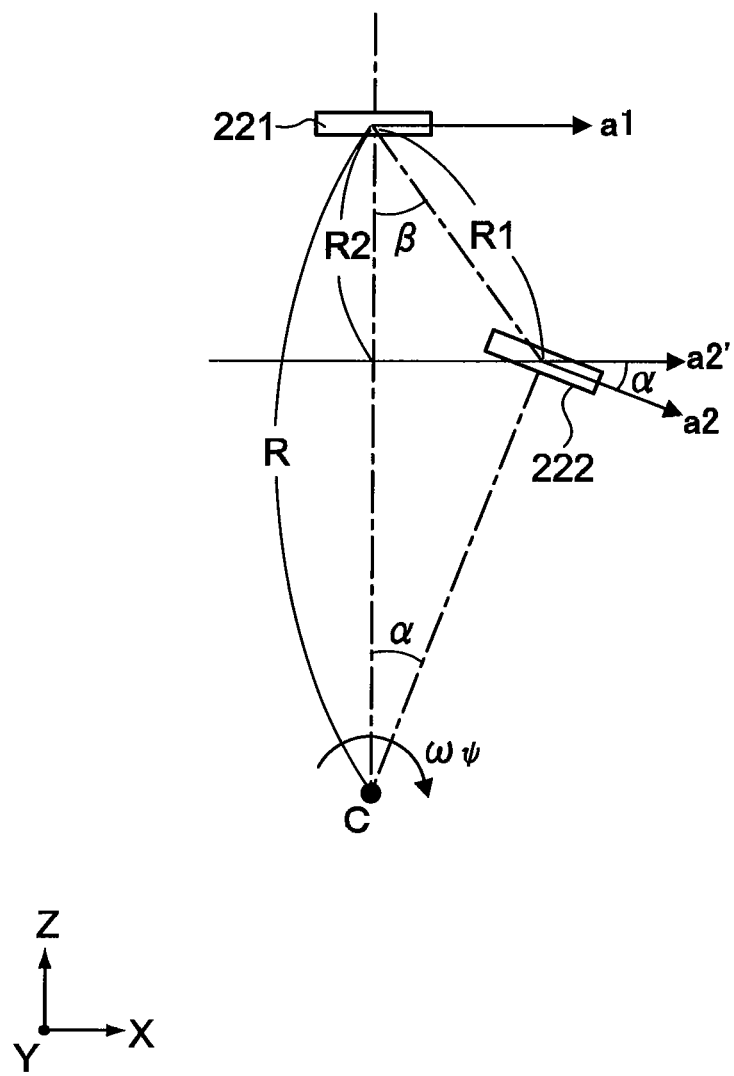
FIG. 30 A diagram showing a modified example of the sensor unit shown in FIG. 29.

In Pattern 5, the two uniaxial acceleration sensors 221 and 222 do not always have to be disposed on a straight line of the radius gyration $R_\psi(t)$ to be obtained. Specifically, as shown in FIG. 30, for example, a distance R1 between the two uniaxial acceleration sensors 221 and 222 does not have to be on the radius gyration R. In this case, if arrangement angles α and β of the uniaxial acceleration sensors 221 and 222 with respect to the center axis are known, the angular acceleration value $\Delta\omega_\psi$, and the angular velocity value $\omega_\psi$ obtained by integrating the angular acceleration value $\Delta\omega_\psi$, can be obtained. By obtaining a projection distance R2 of the distance R1 with respect to the straight line along the radius gyration R and a projection vector a2' of a vector a2 of the acceleration sensor 222 with respect to a line parallel to a vector a1 of the acceleration sensor 221, the angular acceleration value $\Delta\omega_\psi$, can be obtained from $\Delta\omega_\psi = (|a1|-|a2|)/R2$. If the acceleration value |a1| (or |a2|), the distance R2, and the angular velocity value w are obtained, the radius gyration R can be obtained based on the principle described in FIG. 16.

[Pattern 6]

Figure 31:
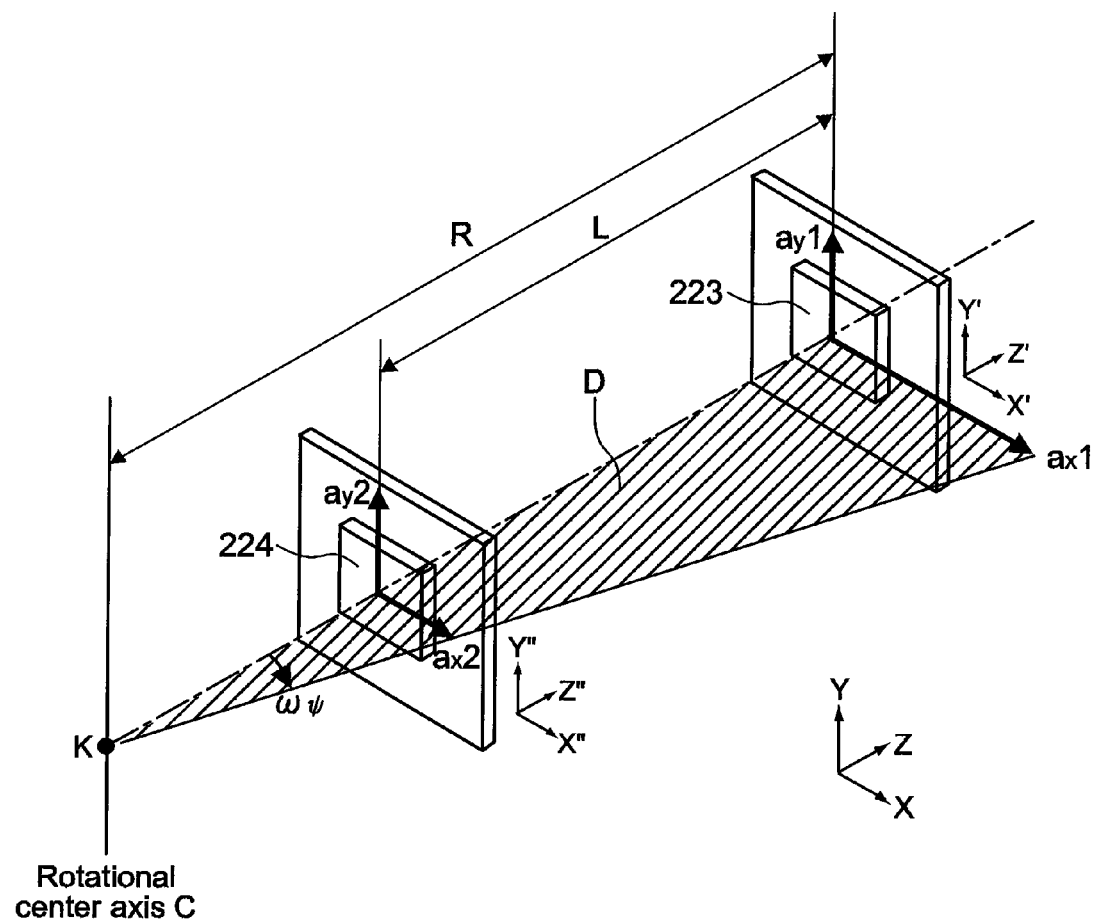
FIG. 31 A perspective diagram showing a sensor unit according to Pattern 6 of FIG. 25.

Pattern 6 is a pattern applying Pattern 5 above in not only the X'- and X'''-axis directions, but also the Y'- and Y'''-axis directions. Specifically, as shown in FIG. 31, biaxial acceleration sensors (acceleration sensor units) 223 and 224 are disposed apart from each other by only a distance L'. Accordingly, the movement of the input apparatus is converted into a 2-dimensional movement of the pointer 2 on the screen 3 in the X- and Y-axis directions.

As a merit of Pattern 6, since inexpensive biaxial acceleration sensors 223 and 224 are used, low costs can be realized.

Figure 32:
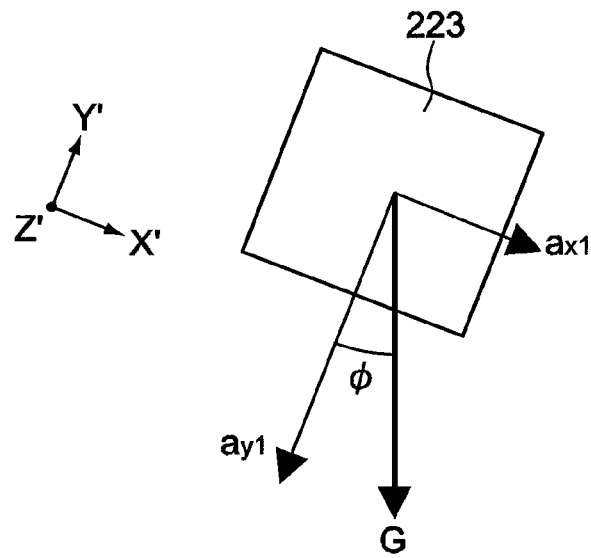
FIG. 32 A diagram showing a principle for calculating a roll angle cp obtained when the input apparatus is tilted about a Z' axis in Pattern 6.

Further, as shown in FIG. 32, when the input apparatus is tilted about the Z' axis, a roll angle φ can be obtained from Equation (13) or (14) below.

$$\phi = \arctan(a_{x1}/a_{y1}) \qquad (13)$$

$$\text{or } \phi = \arctan(a_{x2}/a_{y2}) \qquad (14)$$

By obtaining the roll angle φ, correction velocity values $(V_x', V_y')$ can be obtained by a coordinate conversion that uses a rotation matrix using Equations (15) and (16), thus making it possible to remove the gravitational effect due to the tilt.

$$V_x' = \cos\phi * V_x - \sin\phi * V_y \quad (15)$$

$$V_y' = \sin\phi * V_x - \cos\phi * V_y \quad (16)$$

Obtaining the roll angle cp and obtaining the correction velocity values $(V_x', V_y')$ by the coordinate conversion that uses the rotation matrix can also be applied to Pattern 4 above, and Pattern 7 below.

[Pattern 7]

Pattern 7 uses biaxial acceleration sensors as means for detecting accelerations and triaxial geomagnetic sensors as means for obtaining angular velocities.

Figure 33:
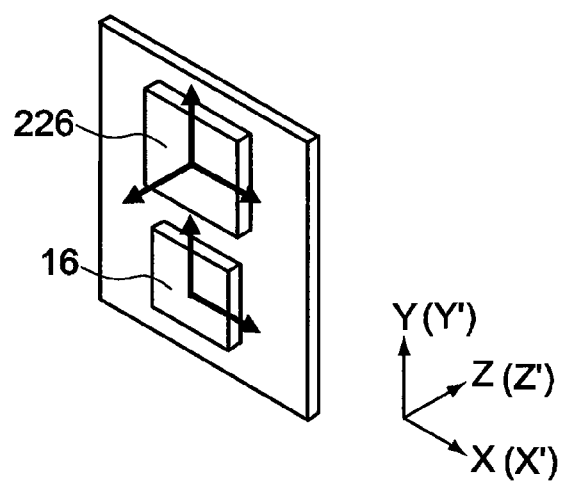
FIG. 33 A perspective diagram showing a sensor unit according to Pattern 7 in FIG. 25.

FIG. 33 is a diagram showing a sensor unit according to Pattern 7. Biaxial acceleration sensors (acceleration sensor unit) 16 detect accelerations in the X'- and Y'-axis directions, and triaxial geomagnetic sensors 226 detect an angle (yaw angle) ψ about the Y' axis and an angle (pitch angle) θ about the X' axis. By differentiating the yaw angle ψ and the pitch angle θ, the MPU 19 can calculate the angular velocity values $(\omega_\psi, \omega_\psi)$.

Accordingly, the velocity values $(V_x, V_y)$ in the X- and Y-axis directions can be calculated based on the radius gyrations $(R_\psi(t), R_\psi(t))$.

Alternatively, in Pattern 7, triaxial acceleration sensors including the Z' axis may be used instead of the biaxial acceleration sensors 16. In this case, because the detection in the gravity direction (i.e., absolute vertical direction) becomes possible by the triaxial acceleration sensors, an absolute angle (orientation) of the input apparatus is detected based on a direction of a vector of geomagnetism with respect to the gravity direction.

[Anther pattern]

As another pattern, there is a pattern that uses biaxial (X' axis and Y' axis) acceleration sensors as means for detecting accelerations and a uniaxial (about Y' or X' axis) gyro sensor as means for detecting an angular velocity. Alternatively, there is a pattern that uses a uniaxial (X' or Y' axis) acceleration sensor as means for detecting an acceleration and biaxial (about Y' axis and X' axis) gyro sensors as means for detecting angular velocities.

Next, an embodiment of an arrangement and fixation method of the sensor unit inside the casing 10 will be described.

Figure 34:
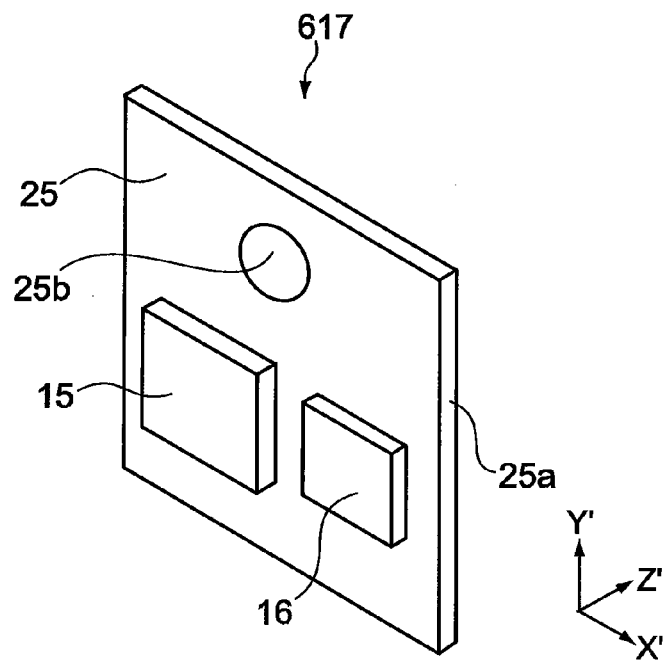
FIG. 34 A perspective diagram showing an arrangement and fixation method of a sensor unit according to an embodiment.
Figure 35:
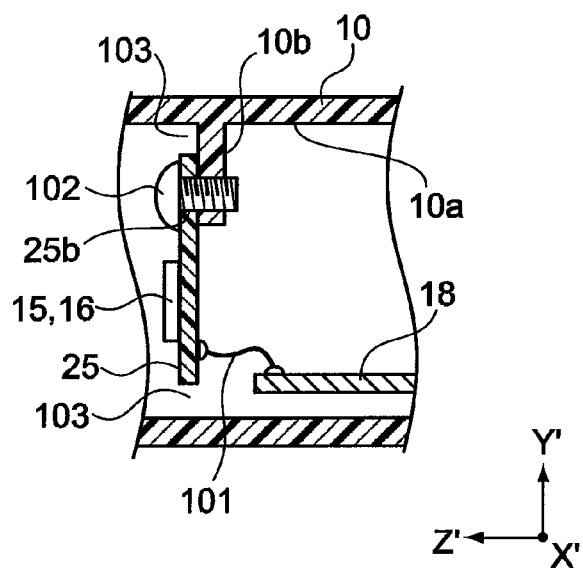

FIG. 34 is a perspective diagram showing the arrangement and fixation method of the sensor unit 617 according to the embodiment of the present invention. FIG. 35 is a cross-sectional diagram of the sensor unit 617 shown in FIG. 34, the casing 10, and the like.

As shown in FIG. 34, for example, when the input apparatus 1 is in the reference position (see FIGS. 7A and 7B), the angular velocity sensor unit 15 and the acceleration sensor unit 16 are aligned in the X-axis direction. The sensor unit 617 is connected to a protrusion portion 10b provided on an inner surface 10a of the casing 10 in a cantilever state so as to protrude inside the casing 10. Typically, via a hole 25b formed on the circuit board 25 (second substrate) of the sensor unit 617, the sensor unit 617 is fixed to the protrusion portion 10b in the cantilever state by a screw, a pin, or other connection members 102. As long as the cantilever state is kept, a plurality of screws, pins, and the like may be used.

The main substrate 18 (first substrate) (see FIG. 3) on which an operational processing unit such as the MPU 19 is mounted is disposed practically within a Z-X plane so as to be vertical to the circuit board 25 of the sensor unit 617. The main substrate 18 and the circuit board 25 are electrically connected via a flexible conductive wire 101. Examples of the flexible conductive wire 101 include an FFC (Flexible Flat Cable), an FPC (Flexible Printed Circuit), and a strand wire.

Thus, a size of the circuit board 25 of the sensor unit 617 can be made smaller than a size of a single substrate on which the MPU 19, the angular velocity sensor unit 15, and the acceleration sensor unit 16 are mounted, for example. When the size of the circuit board 25 is small, rigidity enhances that much, with the result that it is possible to suppress an occurrence of a distortion caused by a mechanical stress applied to the circuit board 25 or a distortion caused by an inertial force that acts on the circuit board 25 when the input apparatus is moved. The distortion caused in the circuit board 25 refers to a warpage of the circuit board 25 or a deformation thereof including a deflection. This is because, when those distortions are caused, there is a fear that noises are incorporated in the detection values of the angular velocity sensor unit 15 and the acceleration sensor unit 16, to thus degrade the detection values.

Moreover, because the main substrate 18 and the circuit board 25 are provided separately, a degree of freedom in arrangement thereof inside the casing 10 increases. Further, because the main substrate 18 and the circuit board are provided separately, a transmission unit including at least the transmitting device 21 and the antenna 22 mounted on the main substrate 18, and the circuit board 25 can be disposed distant from each other. Accordingly, it is possible to prevent the sensor unit 617 from being adversely affected by the transmission radio waves generated by the transmission unit and external electromagnetic wave noises that enter via the transmission unit.

In this embodiment, since the circuit board 25 is connected to the casing 10 in the cantilever state, the stress applied to the circuit board 25 can be reduced as compared to the case where the circuit board 25 is connected to the casing 10 on both sides thereof (center impeller state). With such a structure, even when the user holds the casing 10 firmly and the casing 10 is thus deformed, a force caused by the deformation is prevented from being transferred to the circuit board 25 as much as possible. As a result, an occurrence of a distortion in the circuit board 25 can be suppressed.

In this embodiment, since the circuit board 25 and the main substrate 18 are connected via the flexible conductive wire 101, even when the main substrate 18 is distorted due the stress, a force thereof is not transferred to the circuit board 25.

Further, in this embodiment, a clearance 103 is provided between a circumferential portion 25a of the circuit board 25 and the inner surface 10a of the casing. Accordingly, even when the user holds the casing 10 and the casing 10 is thus deformed, a force thereof can be prevented from being transferred to the circuit board 25.

Hereinafter, at least one of the angular velocity sensor unit 15 and the acceleration sensor unit 16 may be referred to as sensors.

FIG. 36A is a front view of a sensor unit according to another embodiment of the present invention. FIG. 36B is a cross-sectional diagram of a sensor unit 117, and FIG. 36C is a back view thereof.

In the sensor unit 117, the acceleration sensor unit 16 is mounted on a first surface 125a of a circuit board 125, and the angular velocity sensor unit 15 is mounted on a second surface 125b opposed thereto. Moreover, a hole 125c for connection using the connection member 102 is formed on one side of the circuit board.

Thus, a size of the circuit board 125 can be made smaller than that in the case where both the angular velocity sensor unit 15 and the acceleration sensor unit 16 are mounted on one surface of the circuit board 125. As a result, rigidity of the circuit board 125 can be enhanced.

Further, with such a structure, a distortion caused by a temperature change in the surrounding environment and heat generated by the sensors, that is, a distortion due to a difference in thermal expansion coefficients of the substrate and the sensors (mainly a package material of the sensors) is canceled out. Because the heat is transferred to the circuit board 125 from both surfaces thereof, a balance of transferred heat becomes uniform, with the result that the deformation of the circuit board 125 due to thermal expansion is suppressed. Particularly when the centers of the angular velocity sensor unit 15 and the acceleration sensor unit 16 match in a direction vertical to the main surface of the circuit board 125, the deformation of the circuit board 125 becomes minimum.

Figure 37:
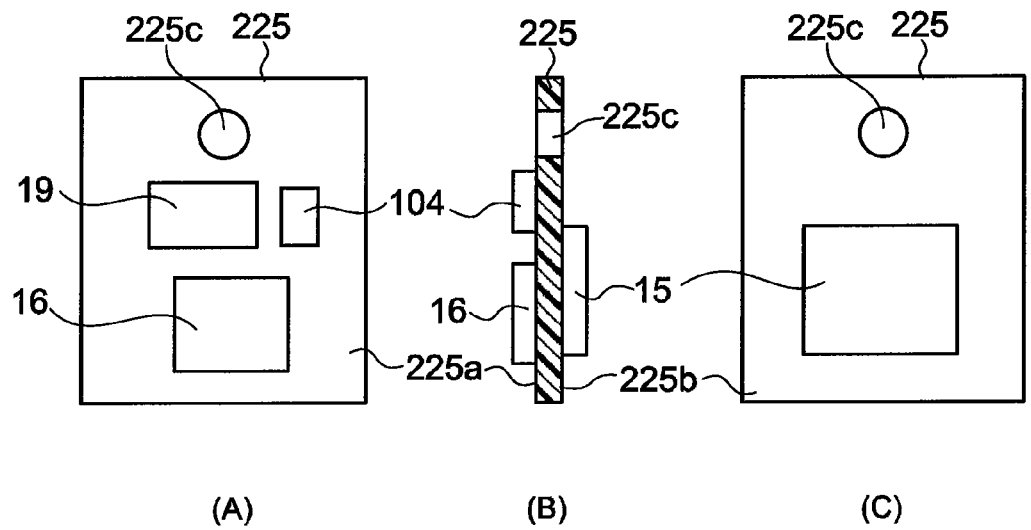
FIG. 37 Diagrams showing a sensor unit according to still another embodiment, the diagrams showing a configuration in which an A/D converter and an MPU are mounted on a circuit board in addition to sensors.

FIGS. 37A to 37C are diagrams showing a circuit board according to still another embodiment. The MPU 19, an A/D converter 104, and the acceleration sensor unit 16 are mounted on a first surface 225a of a circuit board 225. The angular velocity sensor unit 15 is mounted on a second surface 225b opposed to the first surface 225a. In this case, the A/D converter 104 may be incorporated in the MPU 19.

In this embodiment, the A/D converter 104 that carries out analog processing is mounted on the circuit board 225. Thus, a situation that minute output signals supplied to the MPU 19 from the sensors are affected by external electromagnetic wave noises and the like can be avoided.

It should be noted that also when the A/D converter is incorporated in the MPU 19, the MPU 19 only needs to be mounted on the first surface 225a or the second surface 225b. In this case, the sensors and the MPU 19 (e.g., A/D converter 104 and memory (not shown)) (hereinafter, referred to as processing units) may be provided on the first surface 225a and the second surface 225b so that a weight balance of the sensors and the processing units becomes uniform.

Figure 38:
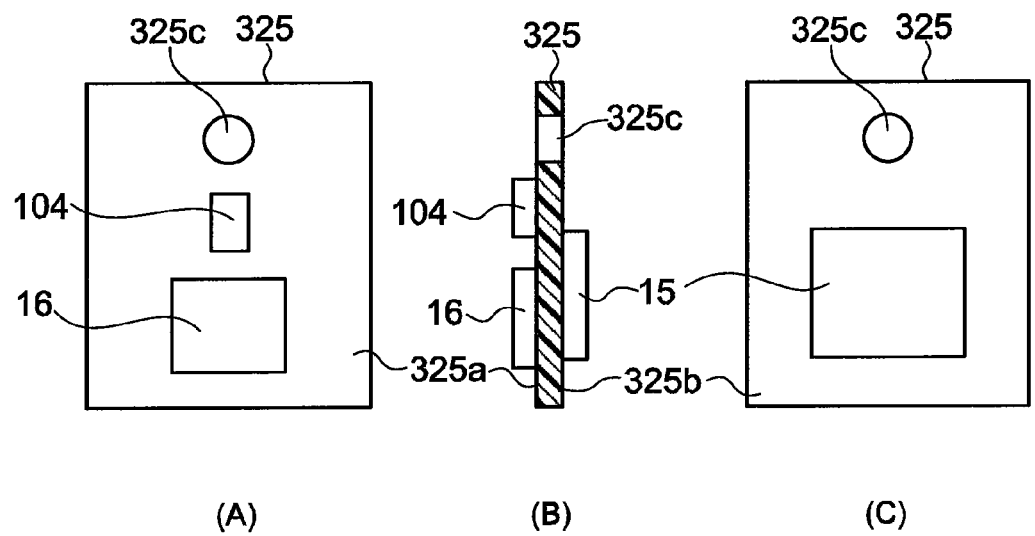
FIG. 38 Diagrams showing a sensor unit according to still another embodiment, the diagrams showing a configuration in which an A/D converter is mounted on a circuit board in addition to sensors.

FIGS. 38A to 38C are diagrams showing a sensor unit according to still another embodiment. The acceleration sensor unit 16 and the A/D converter 104 are mounted on a first surface 325a of a circuit board 325 of a sensor unit 317. The angular velocity sensor unit 15 is mounted on a second surface 325b. In this case, the MPU 19 is mounted on the main substrate 18. Also with such a structure, a possibility that minute output signals supplied to the MPU 19 from the sensors are affected by external electromagnetic wave noises or the like can be lowered.

Figure 39:
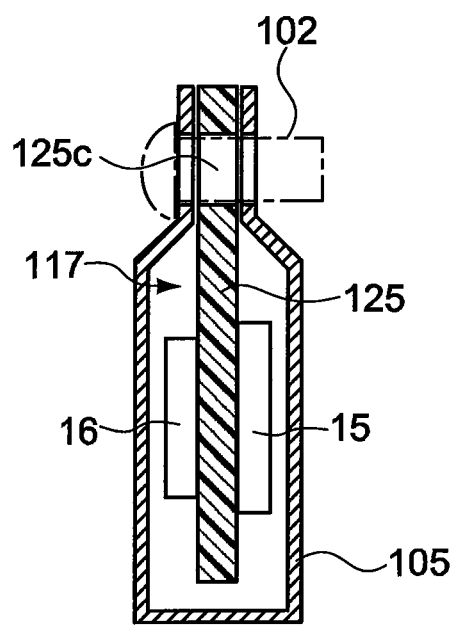
FIG. 39 A cross-sectional diagram showing a sensor unit according to still another embodiment, the diagram showing a configuration in which the sensor unit shown in FIG. 36 is covered by an electromagnetic shield member.

FIG. 39 shows a configuration in which the sensor unit 117 shown in FIG. 36 is covered by an electromagnetic shield member 105. The electromagnetic shield member 105 is connected to, for example, a ground portion of the sensor unit 117 by the connection member 102, solder, or the like. An example of a material of the electromagnetic shield member 105 is a conductive member such as aluminum, tin, and a conductive resin, but is not limited thereto.

With such a structure, for example, it is possible to prevent transmission radio waves generated by the transmission unit including at least one of the transmitting device 21 and the antenna 22 mounted on the main substrate 18 and external electromagnetic wave noises from adversely affecting the sensors. The adverse effect on the sensors refers to a fluctuation of a DC offset, for example.

It should be noted that the electromagnetic shield member 105 may be of a configuration that covers only the first surface 125a, a configuration that covers only the acceleration sensor unit 16, a configuration that covers only the second surface 125b, or a configuration that covers only the angular velocity sensor unit 15.

Without being limited to the sensor unit 117 shown in FIG. 36, it is also possible for the electromagnetic shield member 105 to be applied to the sensor unit 617 shown in FIGS. 34 and 35, the circuit board 225 shown in FIGS. 37A to 37C, or the circuit board 325 shown in FIGS. 38A to 38C. Alternatively, the electromagnetic shield member 105 may be applied to the following configuration shown in FIGS. 40 and 41.

Figure 40:
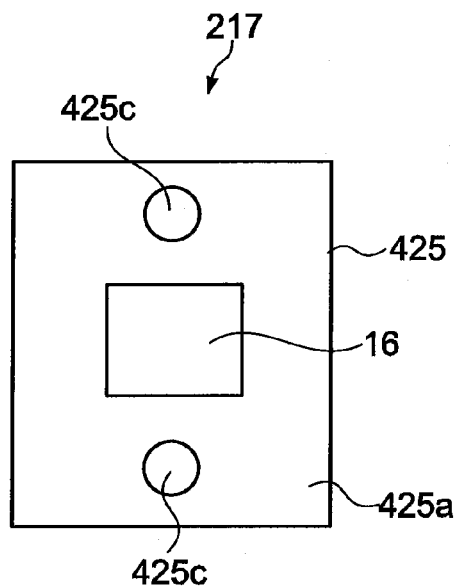
FIG. 40 A front view showing a sensor unit according to still another embodiment, the diagram showing a configuration in which the sensor unit is connected to a casing at two or more positions.
Figure 41:
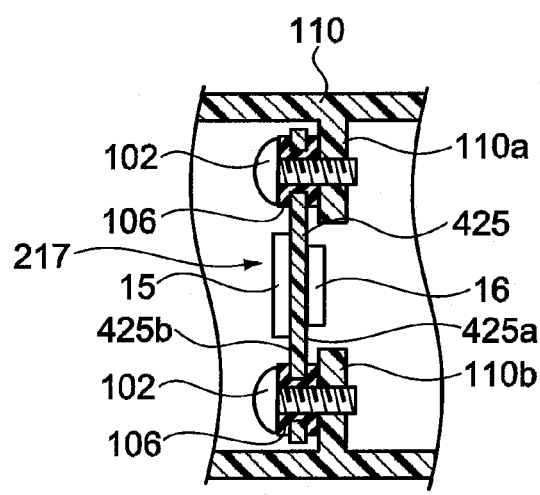
FIG. 41 A cross-sectional diagram of the sensor unit shown in FIG. 40 and a casing.

FIG. 40 is a front view of a sensor unit according to still another embodiment. FIG. 41 is a cross-sectional diagram of the sensor unit and a casing.

In this embodiment, a circuit board 425 includes connection holes 425c on both sides. At the two positions on both sides, a connection is made with protrusion portions 110a and 110b of the casing via the connection members 102. The protrusion portions 110a and 110b may be provided apart from each other on upper and lower sides, or may be provided over an entire circumference of an inner surface of a casing 110, that is, an entire circumference of a circumferential portion of the circuit board 425. Typically, although a straight line connecting centers of the two holes 425c passes a barycenter of a sensor unit 217, positions of the two holes 425c are not necessarily limited to such an arrangement.

Moreover, in this embodiment, the connection member 102 connects the circuit board 425 and the casing 110 via an elastic body 106. Typically, the elastic body 106 is a washer formed of rubber or a resin. The washer as the elastic body 106 is typically formed with a thickness of 0.3 to 1 mm, an outer diameter of 3 to 8 mm, and an inner diameter of 1 to 5 mm, though not limited to those sizes.

The elastic body used herein also refers to a gel body or a viscous body. Examples of a rubber material include an EPDM (Ethylene Propylene Diene Monomer), butyl rubber, and nitrile rubber, but are not limited thereto.

In this embodiment, rigidity of the circuit board 425 with respect to the casing 110 (unity of casing 110 and circuit board 425) can be enhanced. Therefore, a distortion of the circuit board 425 due to a moment in the circuit board 425 caused when the input apparatus is rotated is suppressed. Moreover, even when the circuit board 425 is fixed to the casing 110 at two positions thereof as described above, the elastic body 106 can absorb the stress applied to the circuit board 425 during fixation. Alternatively, the elastic body 106 can absorb the deformation when the user holds the casing 110 firmly and the casing 110 is thus deformed.

Further, since the elastic body 106 also functions to relieve a disturbance acceleration, a subsidiary effect that impact resistance improves can be obtained.

Instead of at two positions, the circuit board 425 may be connected to the casing 110 at three or more positions.

It should be noted that in this embodiment, the case where the acceleration sensor unit 16 and the angular velocity sensor unit 15 are respectively mounted on a first surface 425a and a second surface 425b of the circuit board 425 has been described. However, it is also possible for the circuit board 25 shown in FIGS. 34 and 35, the circuit board 225 shown in FIGS. 37A to 37C, or the circuit board 325 shown in FIGS. 38A to 38C to be connected to the casing 110 at at least two positions.

Alternatively, the connection member 102 of the circuit board 25 shown in FIGS. 34 and 35 may be connected to the casing 10 at one position via the elastic body 106. The same holds true for the circuit board 125 shown in FIG. 36, the circuit board 225 shown in FIGS. 37A to 37C, and the circuit board 325 shown in FIGS. 38A to 38C.

Figure 42:
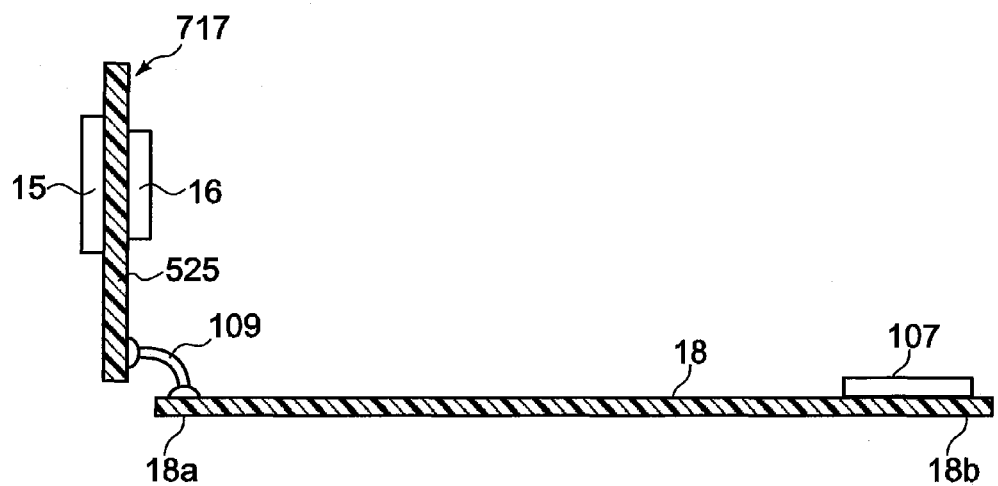
FIG. 42 A diagram showing a sensor unit and a main substrate according to still another embodiment.

FIG. 42 is a diagram showing a sensor unit and a main substrate according to sill another embodiment.

A sensor unit 717 and the main substrate 18 are fixed by a conductive wire for electrically connecting the two substrates. In other words, a circuit board 525 of the sensor unit 717 is connected to the main substrate 18 in a cantilever state using a conductive wire 109. As the conductive wire 109, a conductive wire having appropriate rigidity is used. The conductive wire 109 having appropriate rigidity is, for example, a tinned wire, a copper wire, and titanium wire, but is not limited thereto. Alternatively, a conductive wire such as a soft strand wire may be used instead of the conductive wire 109, and the conductive wire may be molded by a resin having rigidity.

As described above, since the sensor unit 717 is not connected to the casing, the sensor unit 717 is not affected by the deformation of the casing that is caused when the user holds the casing firmly.

In this embodiment, the circuit board 525 of the sensor unit 717 is formed thicker than the main substrate 18. Accordingly, rigidity of the circuit board 525 can be enhanced. Typically, a thickness of the circuit board 525 is 1.2 mm and a thickness of the main substrate 18 is 0.8 mm, but the thicknesses are not limited to those values.

The circuit board 525 is connected to one end portion (first end portion) 18*a* of the main substrate 18, and a transmission unit 107 including at least one of the transmitting device 21 and the antenna 22 is disposed on the other end portion (second end portion) 18*b* on an opposite side that is farther from the circuit board 525. In other words, the transmission unit 107 is disposed at a position distant from the sensor unit 717 as much as possible. Accordingly, the sensor unit 717 can be prevented from being adversely affected by transmission radio waves generated by the transmission unit 107 or external electromagnetic wave noises that enter via the transmission unit 107.

Among the features described in FIG. 42, the feature that the circuit board 525 is thicker than the main substrate 18 or the transmission unit 107 is disposed on the other end portion 18*b* of the main substrate 18 can also be applied to the above embodiments of FIGS. 34 to 41.

Figure 43:
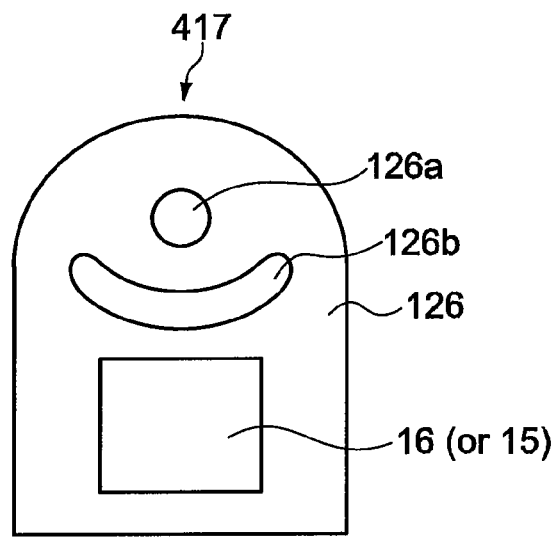
FIG. 43 A front view showing a sensor unit according to still another embodiment, the diagram showing a configuration in which an opening is provided to a circuit board.

FIG. 43 is a front view of a sensor unit according to still another embodiment.

A circuit board 126 of a sensor unit 417 includes, in addition to a hole 126*a* through which the connection member 102 (not shown in FIG. 43) for realizing the cantilever state of the sensor unit 417 with respect to a casing (not shown in FIG. 43) is inserted, another opening 126*b*. The opening 126*b* is formed between the hole 126*a* and the sensors such as the angular velocity sensor unit 15. In this example, the acceleration sensor unit 16 is disposed on a back surface side (not shown) of the circuit board 126 at a position opposite to the angular velocity sensor unit 15.

Due to the movement of the input apparatus in a state where the sensor unit 417 is connected to the casing by the connection member 102 via the hole 126*a*, a stress caused by the inertial force is applied to the circuit board 126. By providing the opening 126*b*, it is possible to prevent the stress from being transferred from the side of the circuit board 126 on which the connection member 102 is connected to the side thereof on which the sensors are provided as much as possible. Moreover, by providing the opening 126*b*, the weight of the circuit board 126 becomes lighter than that in the case where the opening 126*b* is not formed on the circuit board having the same size as the circuit board 126, with the result that the inertial force can be suppressed that much.

The opening 126*b* is formed to have an arc shape, but is not limited thereto. Like an opening 127*b* of a circuit board 127 shown in FIG. 44, the opening 126*b* may be formed to be horizontally long. Various other shapes are conceivable, and the number of openings may be plural.

The feature shown in FIG. 43 (or FIG. 44) that the opening 126*b* (or 127*b*) is formed can also be applied to the above embodiments described in FIGS. 34, 35, and 37 to 42. For example, when the feature that the opening is formed is applied to the configuration in which the sensor unit 217 is connected to the casing 110 at a plurality of positions (including three or more positions) as shown in FIG. 41, the following arrangement is possible as the arrangement of the openings, which is, for example, a configuration in which an opening is formed between at least one of the upper hole 425*c* through which the connection member 102 is inserted and the sensors, and the lower hole 425*c* through which the connection member 102 is inserted and the sensors.

Figure 44:
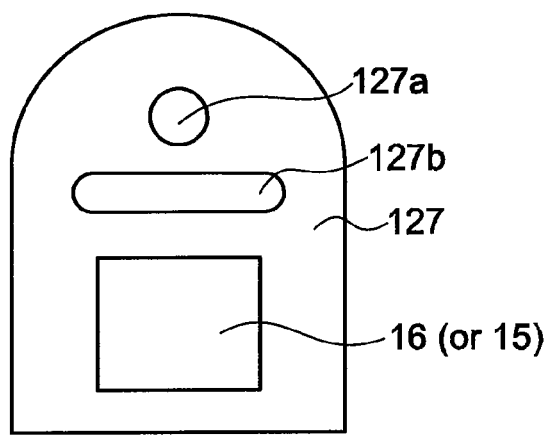
FIG. 44 A diagram showing a configuration in which a shape of an opening is different from that shown in FIG. 43.

It should be noted that the upper portion of each of the circuit boards 126 and 127 respectively shown in FIGS. 43 and 44 is formed with a curve based on a shape of the inner surface of the casing. However, the shape may be any shape.

Figure 45:
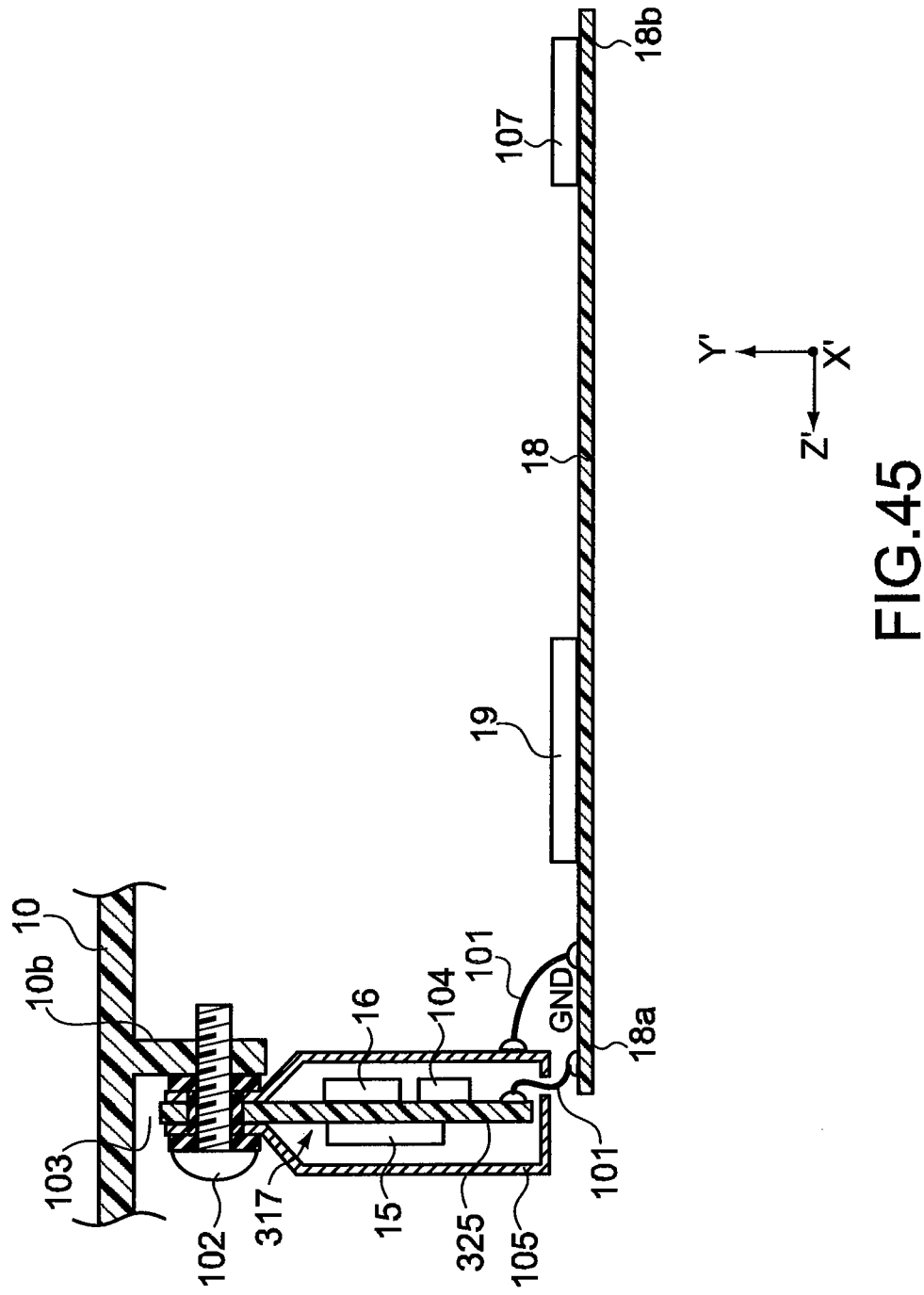
FIG. 45 A diagram showing a configuration in which several features of FIGS. 34 to 44 are combined.
Figure 46:
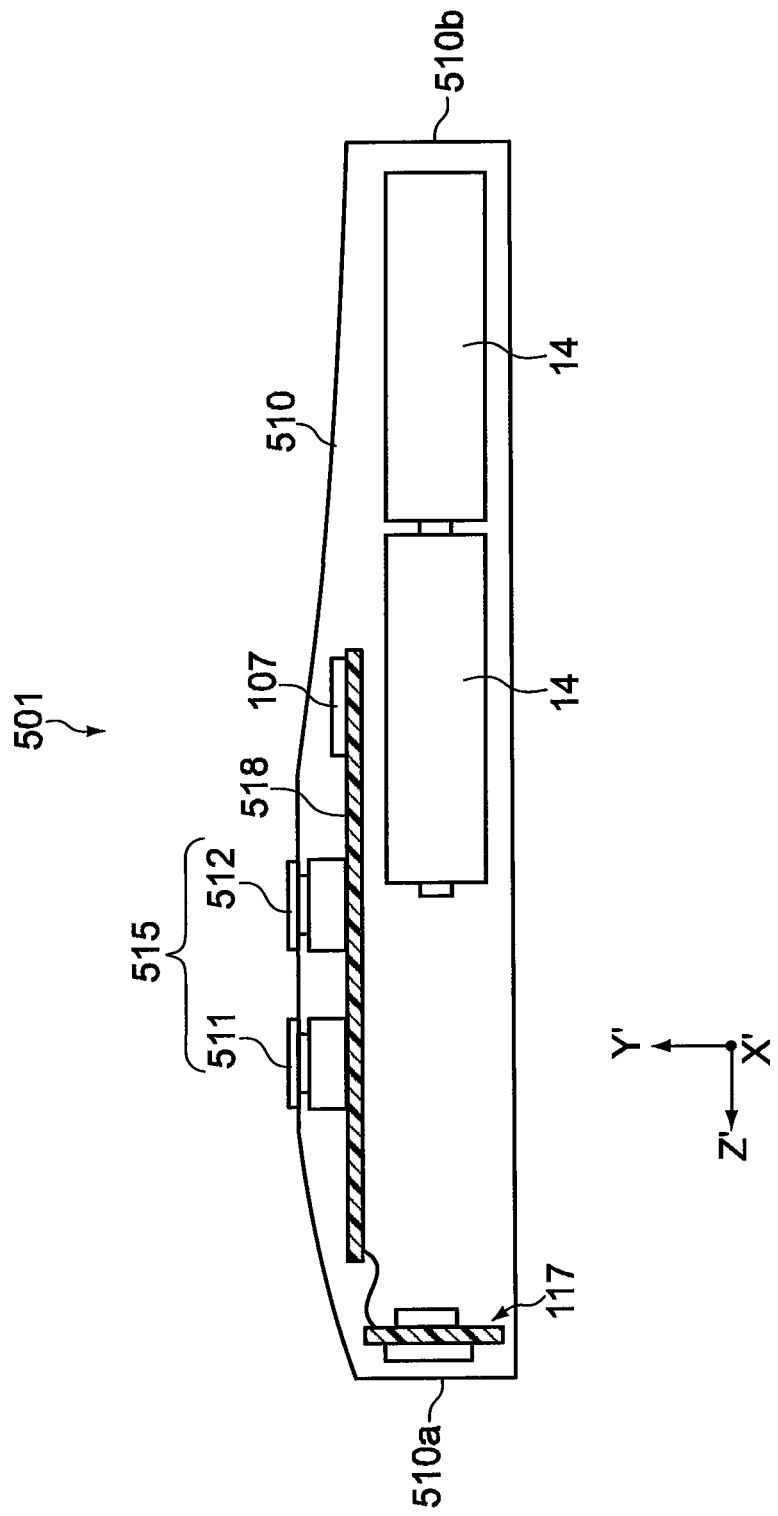
FIG. 46 A schematic diagram showing an input apparatus according to another embodiment, the input apparatus being a pen-type input apparatus.

FIG. 45 is a diagram showing a configuration in which several features of FIGS. 34 to 44 are combined.

To the casing 10, the sensor unit 317 covered by the electromagnetic shield member 105 is connected in the cantilever state by the connection member 102. The elastic body 106 is provided between the connection member 102 and the circuit board 325 (or electromagnetic shield member 105). The sensor unit 317 shown in FIGS. 38A to 38C is used, for example.

The MPU 19 and the transmission unit 107 are mounted on the main substrate 18, and the transmission unit 107 is disposed on the end portion 18*b* farther away from the sensor unit 317. The main substrate 18 and the circuit board 325 of the sensor unit 317 are electrically connected by the flexible conductive wire 101. Further, an opening 325*c* for suppressing a transfer of a stress is formed between a portion of the circuit board 325 connected with the casing 10 and the sensors.

It should be noted that as the configuration shown in FIG. 45, a configuration without the electromagnetic shield member 105 or the elastic body 106 is possible. Alternatively, a configuration in which the sensor unit 117 shown in FIGS. 36 is used instead of the sensor unit 317 is also possible.

In the sensor units described heretofore in FIGS. 34 to 44, a uniaxial angular velocity sensor as described in FIG. 28 may be used instead of the angular velocity sensor unit 15. Alternatively, a uniaxial or triaxial acceleration sensor/sensors as described in FIGS. 27, 30, 33, and the like may be used instead of the acceleration sensor unit 16. Alternatively, the geomagnetic sensor 226 as described in FIG. 33 may be included in the sensor units described in FIGS. 34 to 44.

Figure 47:
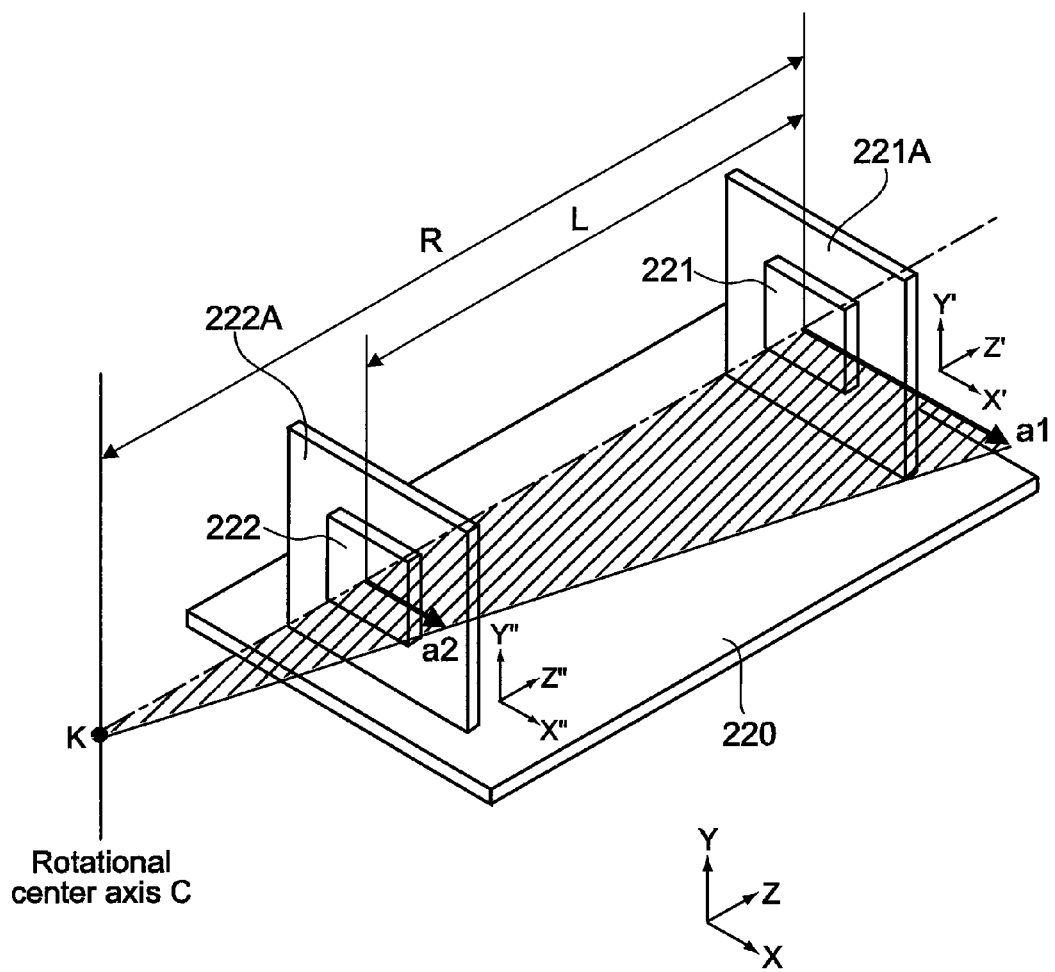
FIG. 47 A perspective diagram showing another embodiment of the sensor unit according to Pattern 5 shown in FIG. 29.

FIG. 47 is a perspective diagram showing a configuration of a sensor in which the two uniaxial acceleration sensors 221 and 222 shown in FIG. 29 are mounted on a common circuit board 220, for example. The two uniaxial acceleration sensors 221 and 222 are mounted on dedicated support substrates 221A and 222A, respectively, and mounted on the circuit board 220 via the support substrates 221A and 222A. The two uniaxial acceleration sensors 221 and 222 are apart by only the distance L. In this case, the movement of the input apparatus is converted only into the 1-dimensional movement (e.g., X-axis direction) of the pointer 2 on the screen 3. The detection axes of the uniaxial acceleration sensors 221 and 222 may be the Y' axis.

Figure 48:
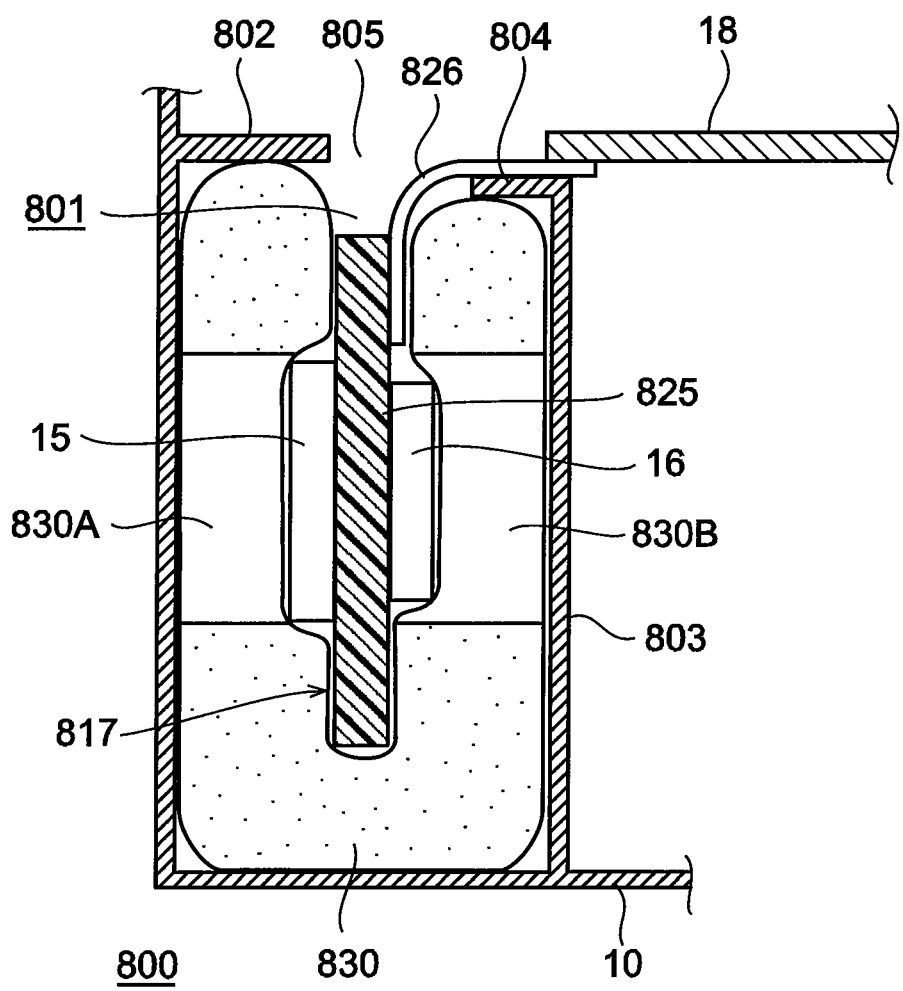
FIG. 48 A cross-sectional diagram showing main portions of an input apparatus according to another embodiment.

FIG. 48 is a cross-sectional diagram showing main portions of an input apparatus 800 according to another embodiment. Inside the casing 10, an accommodation portion 801 for accommodating a sensor module 817 on which the angular velocity sensor unit 15 and the acceleration sensor unit 16 are mounted is formed. The sensor module 817 is electrically and mechanically connected to the main substrate 18 as a support substrate via a flexible wiring substrate 826 as a connection means.

The accommodation portion 801 is capable of accommodating the entire sensor module 817 and is of a size with which a gap of a certain size or more is formed between the sensor module 817 and an inner wall surface of the accommodation portion 801 when the sensor module 817 is accommodated therein. In this embodiment, the accommodation portion 801 is defined by a plurality of ribs 802 and 803 erected on an inner wall of the casing 10. An opening 805 for incorporating the sensor module 817 inside the accommodation portion 801 is formed between the ribs 802 and 803. It should be noted that at an upper end portion of the rib 803 in FIG. 48, a bent portion 804 for supporting the flexible wiring substrate 826 is formed.

A buffer material 830 is provided inside the accommodation portion 801. In addition to preventing an external force (e.g., impact and stress) that acts on the casing 10 from being transferred to the sensor module 817, the buffer material 830 absorbs a distortion caused in the casing 10 to thus prevent a deformation of the sensor module 817. It should be noted that openings (relief portions) 830A and 830B for respectively accommodating the sensor units 15 and 16 of the sensor module 817 are provided to the buffer material 830. As the buffer material 830, a foam rubber of a urethane resin or the like, a sponge, glass wool, and the like can be used.

According to this embodiment, it becomes possible to effectively absorb the external force that acts on the casing 10 or the main substrate 18 by the buffer material 830 or the flexible wiring substrate 826, and suppress the transfer of the external force to the sensor module 817. Accordingly, because it is as if the sensor module 817 is floating inside the casing 10, stable acceleration detection and angular velocity detection become possible while removing effects from outside.

The structure of the sensor module 817 shown in FIG. 48 is a mere example, and the structures of the sensor modules described in the above embodiments may b employed for the sensor module 817.

Next, a sensor module according to another embodiment of the present invention will be described.

For example, in the sensor module 17 used in the control system 100 shown in FIGS. 1 to 8, the analog output signals from the angular velocity sensor unit 15 and the acceleration sensor unit 16 are input to the MPU 19 via an A/D converter (not shown). As a countermeasure for disturbance noises, the outputs of the sensor units 15 and 16 are applied with a DC (Direct Current) offset potential. A DC offset value is set as appropriate based on sensitivity characteristics of the sensor units, electrical characteristics of an apparatus incorporating the sensor units, and the like. Typically, the DC offset value is set to a value with which an output voltage of the sensor units falls within a processable voltage range of the A/D converter.

Figure 49:
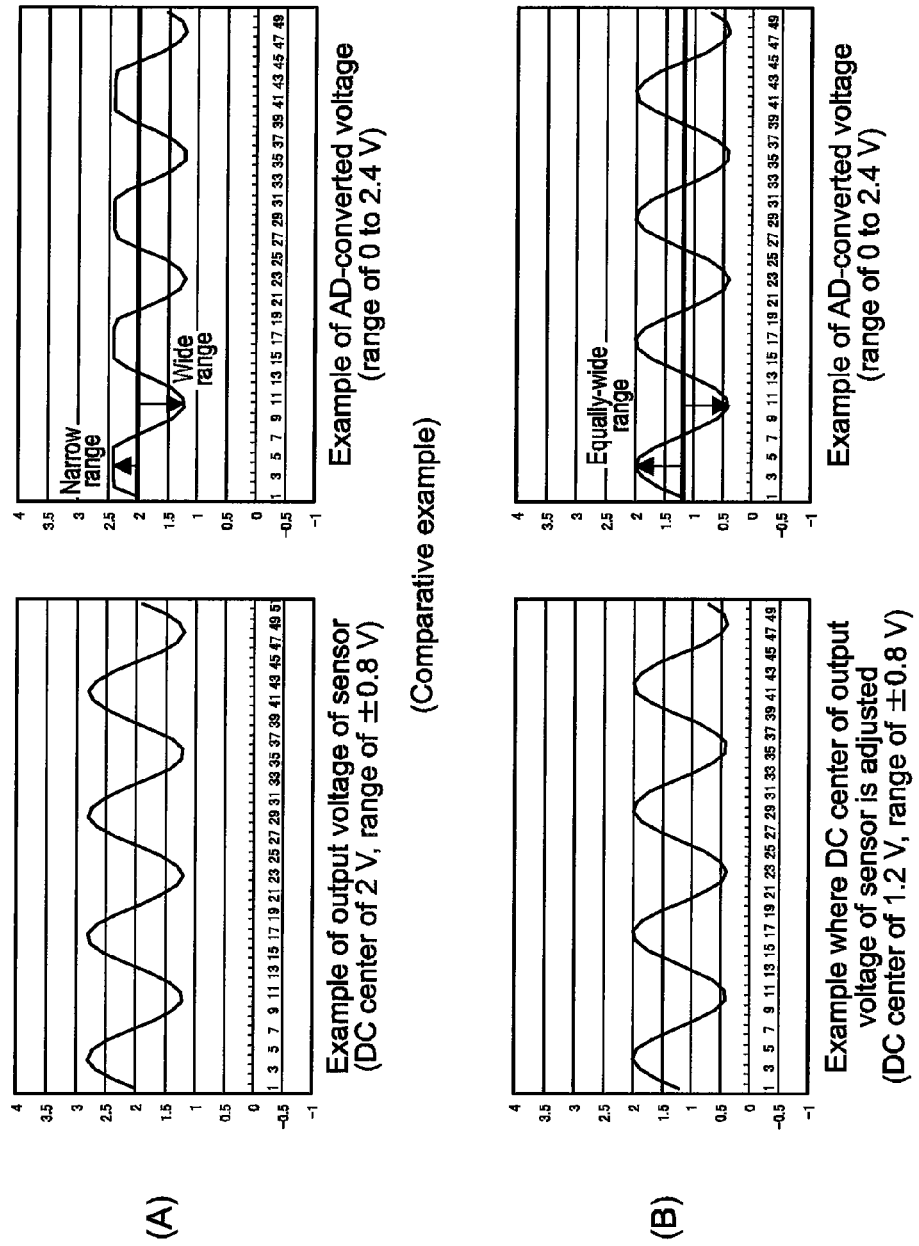
FIG. 49 Diagrams showing waveforms of digital signals obtained by A/D-converting sensor outputs.

However, depending on a type of the sensor used, output characteristics of the sensors may fluctuate before and after the mounting on the common substrate. Moreover, the output characteristics of the sensors also fluctuate due to an operation environment (e.g., temperature) of the sensors. A specific example of this case is shown in FIG. 49A. FIG. 49A shows a waveform example of a sensor output voltage and a waveform example of an A/D-converted voltage. In this example, the DC offset value of the sensor is set to 2 V, an output range is set to ±0.8 V, and an input range of the A/D converter is set to 0 to 2.4 V (center value of 1.2 V).

In the case of the example shown in FIG. 49A, a digitized voltage signal that has been A/D-converted is asymmetric on a +side and a −side. Therefore, a problem that the sensor output cannot be taken full advantage of occurs. For example, when used in a pointing device, an operation to a right-hand side can be followed at high velocity but an operation to a left-hand side cannot be followed.

By narrowing the range of the sensor (e.g., narrowing the sensor output range from ±0.8 V to ±0.4 V) to solve the problem above, the sensor output can be made to fall within the processable voltage range of the A/D converter, thus making it possible to prevent the A/D-converted voltage signal from becoming asymmetric. However, resolution performance of the A/D conversion is reduced to ½ and sufficient resolution therefore cannot be obtained, which is unfavorable.

In this regard, in this embodiment, the DC offset value of the sensor is controlled so that the sensor output voltage falls within the processable voltage range of the A/D converter, thus solving the problem above. Specifically, the DC offset value to be applied to the sensor is adjusted so that the output range of the sensor matches a set reference value (center value of input range) of the A/D converter. It should be noted that in contrast to the above example, it is also possible to adjust the center value of the input range of the A/D converter so that it matches the DC offset value of the sensor.

Figure 50:
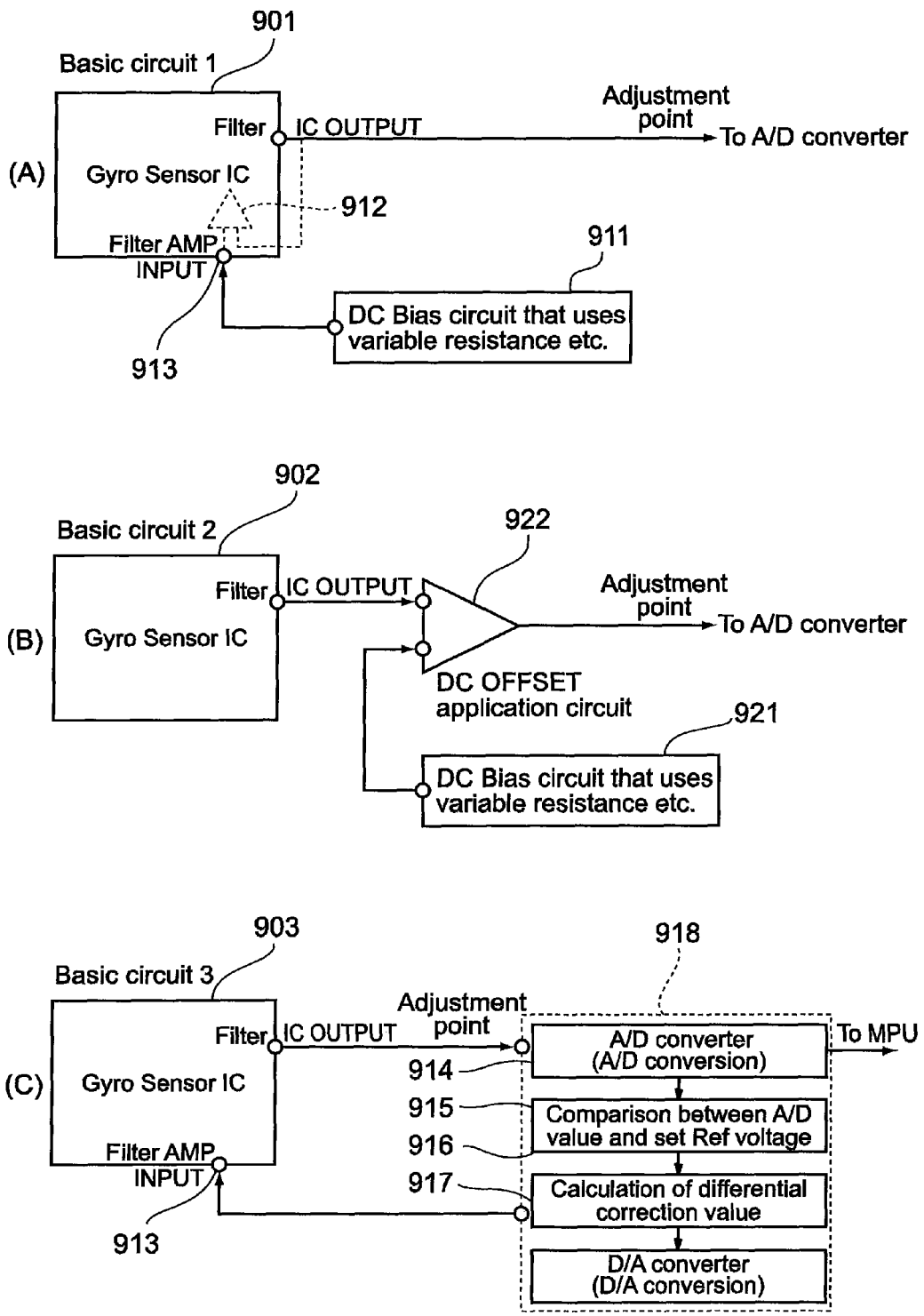
FIG. 50 Diagrams showing several examples of a circuit structure capable of adjusting a DC offset value of a sensor.

FIG. 49B shows a sensor output waveform of a sensor module including a circuit structure shown in FIG. 50 and an A/D-converted voltage waveform. In this example, the DC offset value of the sensor is set to the center value (1.2 V) of the input range of the A/D converter. It should be noted that the output range of the sensor is ±0.8 V, and the input range of the A/D converter is 0 to 2.4 V.

By adjusting the DC offset value as described above, a dynamic range of a signal detection system including the sensor unit and the A/D converter can be maximized. In addition, since a variance of the output offset value can be adjusted, it is possible to maximumly secure a symmetry property of the input signal and the output waveform and obtain a correlation between a sense of human beings and the movement of the cursor. In addition, the sensor output can be calibrated by adjusting the DC offset value to an arbitrary level (reference voltage of A/D converter (offset value)). Furthermore, it also becomes possible to restrict the movement of the cursor at a time of turning on the power.

Next, a specific circuit structure for adjusting the DC offset value of the sensor to the center value of the input range of the A/D converter will be described.

A circuit structure shown in FIG. 50A includes a drive IC 901 for the sensor unit (acceleration sensor unit and/or angular velocity sensor unit), a bias circuit (application means) 911 for applying a DC offset potential to the drive IC 901, and an operational amplifier (adjustment means) 912 incorporated in the drive IC 901. The operational amplifier 912 adjusts, based on an output voltage of the drive IC, the DC offset value applied to the drive IC 901 so that the output voltage of the drive IC 901 falls within a processable voltage range of the subsequent A/D converter. An adjustment point is, for example, a center value of the input range of the A/D converter. This structure is particularly favorable in a case where a sensor unit is constituted of the drive IC 901 including a gain adjustment input terminal 913.

A circuit structure shown in FIG. 50B includes a drive IC 902 for the sensor unit (acceleration sensor unit and/or angular velocity sensor unit), a bias circuit (application means)

921 for applying a DC offset potential to the drive IC 902, and an operational amplifier (adjustment means) 922 provided outside the drive IC 902. The operational amplifier 922 adjusts, based on an output voltage of the drive IC, the DC offset value applied to the drive IC 902 so that the output voltage of the drive IC 902 falls within a processable voltage range of the subsequent A/D converter. An adjustment point is, for example, a center value of the input range of the A/D converter.

A circuit structure shown in FIG. 50C includes a drive IC 903 for the sensor unit (acceleration sensor unit and/or angular velocity sensor unit) and an adjustment unit (application means, adjustment means) 918 for adjusting a DC offset value and applying it to the drive IC 903. The adjustment unit 918 includes an A/D converter 914 for converting an analog output signal of the drive IC 903 into a digital signal, a comparator 915 for comparing a DC center value of the digital output signal obtained by the conversion and an input range center value (set value) of the A/D converter 914, a computing unit 916 for calculating a correction value of a difference obtained by the comparator 915, and a D/A converter 917 for D/A-converting the correction value computed in the computing unit 916 and inputting it to the gain adjustment input terminal 913 of the drive IC.

When the input apparatus is in an operation-stop state, a value corresponding to a movement amount of the input apparatus input to the MPU (corresponding to MPU 19 of FIG. 3; the same holds true hereinafter) via the A/D converter 914 must be a reference value (e.g., value corresponding to 0 V). However, in actuality, the value may not become 0 due to the effect of a temperature drift. At this time, by outputting correction voltages generated by the comparator 915 and the computing unit 916 via the D/A converter 917 and superimposing them on the sensor output, the value from the A/D converter 914 becomes a reference at a certain time point. Specifically, a value output via the D/A converter 917 when the value from the A/D converter 914 has become the reference value becomes a drift correction value, and the effect of a drift can be eliminated by applying the correction value thereafter.

It should be noted that circuits other than the circuit structures shown in FIGS. 50A to 50C are applicable. Describing schematically, a difference between the output offset value and the reference value of the A/D converter is stored in advance in a nonvolatile memory such as an EEPROM, and the difference is read out to thus generate a correction value of the DC offset value. Moreover, if a temperature drift of the sensor is measured in advance and a coefficient thereof is stored in the EEPROM or the like, a calibration including the temperature drift can be carried out by merely adding a temperature detection component such as a thermistor.

The control system described heretofore is not limited to the above embodiments, and various modifications can be made.

As described above, it is possible to use an angle sensor such as the geomagnetic sensor 226 instead of the angular velocity sensor unit 15 for detecting angular velocity values. In this case, a dimension of an angle value detected by the angle sensor and that of the acceleration value detected by the acceleration sensor are combined, to thus calculate the radius gyration. For example, by subjecting the angle value to a third-order differentiation operation and subjecting the acceleration value to a first-order differentiation operation, the angular acceleration change rate and the acceleration change rate are calculated, and a ratio of the acceleration change rate to the angular acceleration change rate is calculated as the radius gyration.

At least one of the acceleration sensor unit 16 and the angular velocity sensor unit 15 may be constituted of an image sensor such as a CCD sensor and a CMOS sensor.

In the flowchart shown in FIG. 11, 19, 21, or 23, a part of the processing of the input apparatus 1 may be carried out by the control apparatus 40 or a part of the processing of the control apparatus 40 may be carried out by the input apparatus 1, while the input apparatus 1 and the control apparatus 40 are communicating with each other.

The input apparatus according to the above embodiments has transmitted the input information to the control apparatus wirelessly. However, the input information may be transmitted by wire.

In the above embodiments, the pointer 2 that moves on the screen in accordance with the movement of the input apparatus has been represented as an image of an arrow. However, the image of the pointer 2 is not limited to the arrow and may be a simple circle, square, or the like, or a character image or any other images.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:
1. An input apparatus comprising:
a casing;
a sensor section including sensors consisting of
a first acceleration detection section to detect a first acceleration value $a_x$ of the casing in a first direction x,
a first angle-related value detection section to detect a first angular velocity value $\omega_\psi$ as a value related to an angle of the casing about an axis in a second direction y different from the first direction x,
a second acceleration detection section to detect a second acceleration value $a_y$ of the casing in the second directions y, and
a second angle-related value detection section to detect a second angular velocity value $\omega_\theta$ as a value related to an angle about an axis in the first direction x; and
a calculation means for calculating a first velocity value $V_x$ of the casing in the first direction x based on the detected first acceleration value $a_x$ and the detected first angular velocity value $\omega_\psi$ detected, and for calculating a second velocity value $V_y$ of the casing in the second direction y based on the detected second acceleration value $a_y$ and the detected second angular velocity $\omega_\theta$ value detected according to the following relationships

$$V_x = a_x/\Delta\omega_\psi * \omega_\psi$$

$$V_y = a_y/\Delta\omega_\theta * \omega_\theta$$

wherein $\Delta\omega_\psi$ and $\Delta\omega_\theta$ are the respective first and second direction angular velocity values that have been subjected to a differentiation operation, and
wherein $a_x/\Delta\omega_\psi$ and $a_y/\Delta\omega_\theta$ respectively represent radius gyrations of the casing about the axes in the second and first directions respectively, the radius gyrations representing distances between respective first and second center axes of rotation whose positions change with time and the respective first and second acceleration detection sections.

2. The input apparatus according to claim 1,
wherein the calculation means calculates an angular acceleration change rate as a time change rate of an angular acceleration about the axis in the second direction based on the detected first angle-related value, calculates a value obtained by removing, from the first acceleration value, a low-frequency component containing at least a component value of a gravity acceleration, that acts on the first acceleration detection section, in the first direction, calculates an acceleration change rate as a time change rate of the value from which the low-frequency component has been removed, and calculates a ratio of the calculated acceleration change rate to the calculated angular acceleration change rate as the radius gyration.

3. An input apparatus to which operational information is input when a user moves the input apparatus three-dimensionally, the input apparatus comprising:
  a sensor section including sensors consisting of
    a first acceleration detection section to detect a first acceleration value of the casing in a first direction x,
    a first acceleration detection section to detect a first acceleration value $a_x$ of the casing in a first direction x,
    a first angle-related value detection section to detect a first angular velocity value $\omega_\psi$ as a value related to an angle of the casing about an axis in a second direction y different from the first direction x,
    a second acceleration detection section to detect a second acceleration value $a_y$ of the casing in the second direction y, and
    a second angle-related value detection section to detect a second angular velocity value $\omega_\theta$ a value related to an angle about an axis in the first direction x; and
  a distance calculation means for calculating a distance from an instant center of rotation of the input apparatus within a virtual plane including an axis along a first direction to the input apparatus, and for calculating, as the distance, a distance from the instant center of rotation of the input apparatus to the first acceleration detection section based on the first acceleration value and the first angle-related value; and
  a velocity calculation means for calculating a first velocity value $V_x$ of the casing in the first direction x based on the detected first acceleration value $a_x$ and the detected first angular velocity value $\omega_\psi$ detected, and for calculating a second velocity value $V_y$ of the casing in the second direction y based on the detected second acceleration value $a_y$ and the detected second angular velocity $\omega_\theta$ value detected according to the following relationships $$V_x = a_x / \Delta\omega_\psi * \omega_\psi$$

$$V_y = a_y / \Delta\omega_\theta * \omega_\theta$$

wherein $\Delta\omega_\psi$ and $\Delta\omega_\theta$ are the respective first and second direction angular velocity values that have been subjected to a differentiation operation.

4. The input apparatus according to claim 3,
wherein the distance calculation means calculates the distance based on an acceleration value in the first direction within the virtual plane, at two positions apart from each other by a predetermined distance.

5. A control apparatus for controlling display of a pointer displayed on a screen in accordance with information transmitted from an input apparatus including a casing, a sensor section including sensors consisting of a first acceleration detection section to detect a first acceleration value of the casing in a first direction x, a first angle-related value detection section to detect a first angular velocity value $\omega_\psi$ as a value related to an angle of the casing about an axis in a second direction y different from the first direction x, a second acceleration detection section to detect a second acceleration value $a_y$ of the casing in the second direction y, and a second angle-related value detection section to detect a second angular velocity value $\omega_\theta$ as a value related to an angle about an axis in the first direction x, and a transmission means for transmitting the information on the first acceleration value and the first angle-related value, the control apparatus comprising:
  a reception means for receiving the transmitted information on the first acceleration value and the first angle-related value;
  a calculation means for calculating a first velocity value $V_x$ of the casing in the first direction x based on the detected first acceleration value $a_x$ and the detected first angular velocity value $\omega_\psi$ detected, and for calculating a second velocity value $V_y$ of the casing in the second direction y based on the detected second acceleration value $a_y$ and the detected second angular velocity $\omega_\theta$ value detected according to the following relationships $$V_x = a_x / \Delta\omega_\psi * \omega_\psi$$

$$V_y = a_y / \Delta\omega_\theta * \omega_\theta$$

and
  a coordinate information generation means for generating coordinate information of the pointer on the screen, that corresponds to the calculated first velocity value,
  wherein $\Delta\omega_\psi$ and $\Delta\omega_\theta$ are the respective first and second direction angular velocity values that have been subjected to a differentiation operation, and
  wherein $a_x/\Delta\omega_\psi$ and $a_y/\Delta\omega_\theta$ respectively represent radius gyrations of the casing about the axes in the second and first directions respectively, the radius gyrations representing distances between respective first and second center axes of rotation whose positions change with time and the respective first and second acceleration detection sections.

6. A control system comprising:
an input apparatus including
  a casing,
  a sensor section including sensors consisting of
    a first acceleration detection section to detect a first acceleration value of the casing in a first direction x,
    a first angle-related value detection section to detect a first angular velocity value $a_x$ as a value related to an angle of the casing about an axis in a second direction y different from the first direction x,
    a second acceleration detection section to detect a second acceleration value $a_y$ of the casing in the second direction y, and
    a second angle-related value detection section to detect a second angular velocity value $\omega_\theta$ as a value related to an angle about an axis in the first direction x,
  a calculation means for calculating a first velocity value $V_x$ of the casing in the first direction x based on the detected first acceleration value $a_x$ and the detected first angular velocity value $\omega_\psi$ detected, and for calculating a second velocity value $V_y$ of the casing in the second direction y based on the detected second acceleration value $a_y$ and the detected second angular velocity $\omega_\theta$ value detected according to the following relationships $$V_x = a_x/\Delta\omega_\psi * \omega_\psi$$

$$V_y = a_y/\Delta\omega_\theta * \omega_\theta$$

and
a transmission means for transmitting information on the calculated first velocity value; and
a control apparatus including
a reception means for receiving the transmitted information on the first velocity value, and
a coordinate information generation means for generating coordinate information of a pointer on a screen, that corresponds to the received first velocity value,
wherein $\Delta\omega_\psi$ and $\Delta\omega_\theta$ are the respective first and second direction angular velocity values that have been subjected to a differentiation operation, and
wherein $a_x/\Delta\omega_\psi$ and $a_y/\Delta\omega_\theta$ respectively represent radius gyrations of the casing about the axes in the second and first directions respectively, the radius gyrations representing distances between respective first and second center axes of rotation whose positions change with time and the respective first and second acceleration detection sections.

7. A control system comprising:
an input apparatus including
a casing,
a sensor section including sensors consisting of
a first acceleration detection section to detect a first acceleration value $a_x$ of the casing in a first direction x,
a first angle-related value detection section to detect a first angular velocity value $\omega_\psi$ as a value related to an angle of the casing about an axis in a second direction y different from the first direction x,
a second acceleration detection section to detect a second acceleration value $a_y$ of the casing in the second direction y, and
a second angle-related value detection section to detect a second angular velocity value $\omega_\theta$ as a value related to an angle about an axis in the first direction x,
a transmission means for transmitting information on the first acceleration value and the first angle-related value; and
a control apparatus including
a reception means for receiving the transmitted information on the first acceleration value and the first angle-related value,
a calculation means for calculating a first velocity value $V_x$ of the casing in the first direction x based on the detected first acceleration value $a_x$ and the detected first angular velocity value $\omega_\psi$ detected, and for calculating a second velocity value $V_y$ of the casing in the second direction y based on the detected second acceleration value $a_y$ and the detected second angular velocity $\omega_\theta$ value detected according to the following relationships $$V_x = a_x/\Delta\omega_\psi * \omega_\psi$$

$$V_y = a_y/\Delta\omega_\theta * \omega_\theta$$

and
a coordinate information generation means for generating coordinate information of a pointer on a screen, that corresponds to the calculated first velocity value,
wherein $a_x/\Delta\omega_\psi$ and $a_y/\Delta\omega_\theta$ respectively represent radius gyrations of the casing about the axes in the second and first directions respectively, the radius gyrations representing distances between respective first and second center axes of rotation whose positions change with time and the respective first and second acceleration detection sections.

* * * * *